US006621772B2

(12) United States Patent
Asano et al.

(10) Patent No.: US 6,621,772 B2
(45) Date of Patent: Sep. 16, 2003

(54) RECORD MEDIUM AND REPRODUCING APPARATUS OF THE SAME FOR DETECTING AN OFFSET CORRECTION

(75) Inventors: Kenji Asano, Kakamigahara (JP); Noboru Mamiya, Motosu-gun (JP); Yoshiharu Uchihara, Ogaki (JP); Satoshi Sumi, Gifu (JP); Kenji Nakao, Gifu (JP); Hiroshi Watanabe, Anpachi-gun (JP); Toshiaki Hioki, Ogaki (JP); Yoshihiro Hori, Gifu (JP); Hisashi Matsuyama, Ogaki (JP); Kenji Torazawa, Ogaki (JP); Kenji Tanase, Motosu-gun (JP); Sayoko Tanaka, Anpachi-gun (JP); Yoshihisa Suzuki, Bisai (JP); Shigeki Hori, Ogaki (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/750,067

(22) Filed: Dec. 29, 2000

(65) Prior Publication Data
US 2001/0033532 A1 Oct. 25, 2001

Related U.S. Application Data

(62) Division of application No. 09/147,962, filed as application No. PCT/JP97/02442 on Jul. 14, 1997.

(30) Foreign Application Priority Data

| Oct. 21, 1996 | (JP) | ............................................. 8-278385 |
| Oct. 9, 1996 | (JP) | ............................................. 8-268893 |
| Sep. 26, 1996 | (JP) | ............................................. 8-255066 |
| Nov. 13, 1996 | (JP) | ............................................. 8-301426 |
| Jan. 17, 1997 | (JP) | ............................................. 9-6988 |
| Jan. 27, 1997 | (JP) | ............................................. 9-12790 |
| Mar. 11, 1997 | (JP) | ............................................. 9-56681 |
| Mar. 27, 1997 | (JP) | ............................................. 9-76199 |
| May 13, 1997 | (JP) | ............................................. 9-122584 |
| Feb. 7, 1997 | (JP) | ............................................. 9-25655 |
| Apr. 14, 1997 | (JP) | ............................................. 9-95700 |
| Apr. 23, 1997 | (JP) | ............................................. 9-106368 |
| Apr. 25, 1997 | (JP) | ............................................. 9-109436 |

(51) Int. Cl.[7] ............................................. G11B 7/00
(52) U.S. Cl. ............................... 369/44.26; 369/53.37; 369/47.22
(58) Field of Search ............................ 369/47.22, 47.2, 369/53.37, 47.11, 275.3, 44.26

(56) References Cited

U.S. PATENT DOCUMENTS 4,375,088 A    2/1983   de Haan et al. ............ 365/234

(List continued on next page.)

FOREIGN PATENT DOCUMENTS

EP        0 347 858        12/1989

(List continued on next page.)

OTHER PUBLICATIONS

European Search Report Dec. 27, 2000.

(List continued on next page.)

Primary Examiner—Aristotelis M. Psitos
(74) Attorney, Agent, or Firm—Armstrong, Westerman & Hattori, LLP

(57) ABSTRACT

A magneto-optical record medium and a reproducing apparatus for the same allow data reproduction having good characteristics by a simple structure. The magneto-optical record medium includes a plurality of first grooves (3) each having sidewalls, at least one of which is wobbled in accordance with address information; an address mark (21) formed by changing a width of a land located between second grooves connected to the first grooves; and third grooves wobbled cyclically, formed in a data portion magnetically storing data and connected to the second grooves. The reproducing apparatus reproduces the data from the magneto-optical record medium.

1 Claim, 73 Drawing Sheets

U.S. PATENT DOCUMENTS

| | | | | |
|---|---|---|---|---|
| 4,866,688 A | * | 9/1989 | Ohtake et al. | 369/44.13 |
| 5,023,856 A | | 6/1991 | Raaymakers et al. | |
| 5,185,732 A | | 2/1993 | Ogawa et al. | |
| 5,210,738 A | | 5/1993 | Iwata et al. | |
| 5,289,450 A | * | 2/1994 | Mizumoto et al. | 369/53.37 |
| 5,315,567 A | | 5/1994 | Fuji et al. | |
| 5,339,301 A | | 8/1994 | Raaymakers et al. | |
| 5,537,373 A | | 7/1996 | Horikiri | 369/44.13 |
| 5,602,823 A | | 2/1997 | Aoki et al. | |
| 5,615,205 A | | 3/1997 | Belser | |
| 5,715,217 A | | 2/1998 | Fuji | |
| 5,719,837 A | * | 2/1998 | Aramaki | 369/47.11 |
| 5,742,578 A | | 4/1998 | Kumai et al. | |
| 5,815,486 A | | 9/1998 | Kobayashi et al. | |
| 5,835,478 A | * | 11/1998 | Kobayashi et al. | 369/275.3 |
| 6,069,870 A | * | 5/2000 | Maeda et al. | 369/275.3 |

FOREIGN PATENT DOCUMENTS

| | | |
|---|---|---|
| EP | 0 786 767 A2 | 7/1997 |
| EP | 0 786 767 A3 | 12/1997 |
| JP | 2-68721 | 3/1990 |
| JP | 4-184729 | 7/1992 |
| JP | 5-314538 | 11/1993 |
| JP | 6-243468 | 9/1994 |
| JP | 7-73508 | 3/1995 |
| JP | 7-210873 | 8/1995 |
| JP | 7-311947 | * 11/1995 |

OTHER PUBLICATIONS

Supplementary Search Report from European Patent Office dated Dec. 23, 2002 in Application No. 97 930791.5–2210.

* cited by examiner

FIG.2A
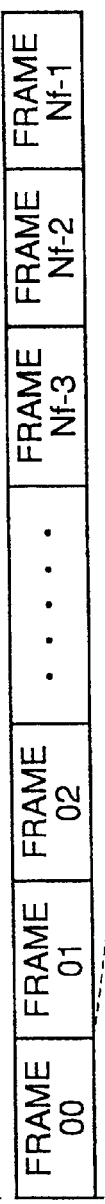
FIG.2B
FIG.2C
ADDRESS SEGMENT
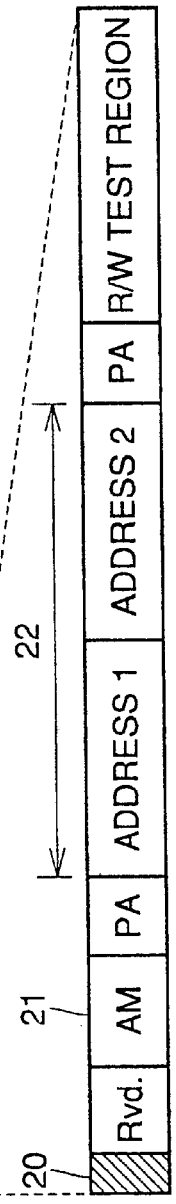
FIG.2D
DATA SEGMENT
FIG.2E
ADDRESS
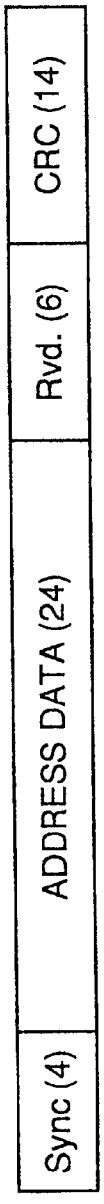

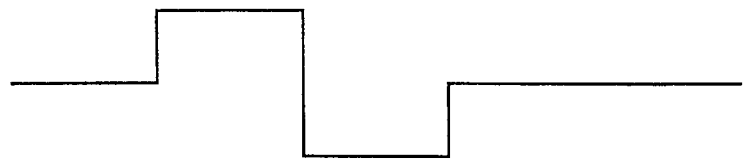
FIG.8A   AML1
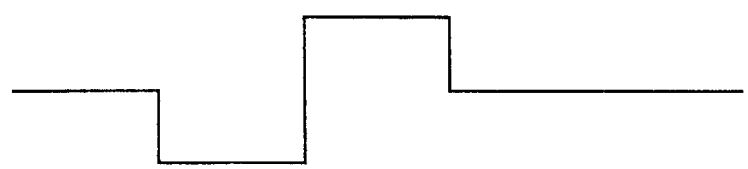
FIG.8B   AML2
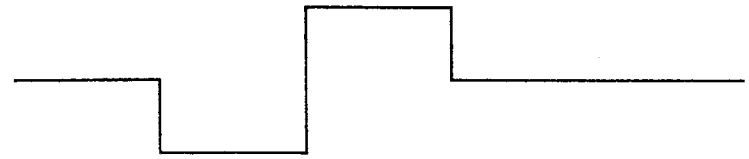
FIG.8C   AMG1
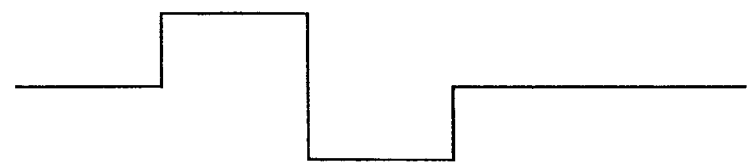
FIG.8D   AMG2

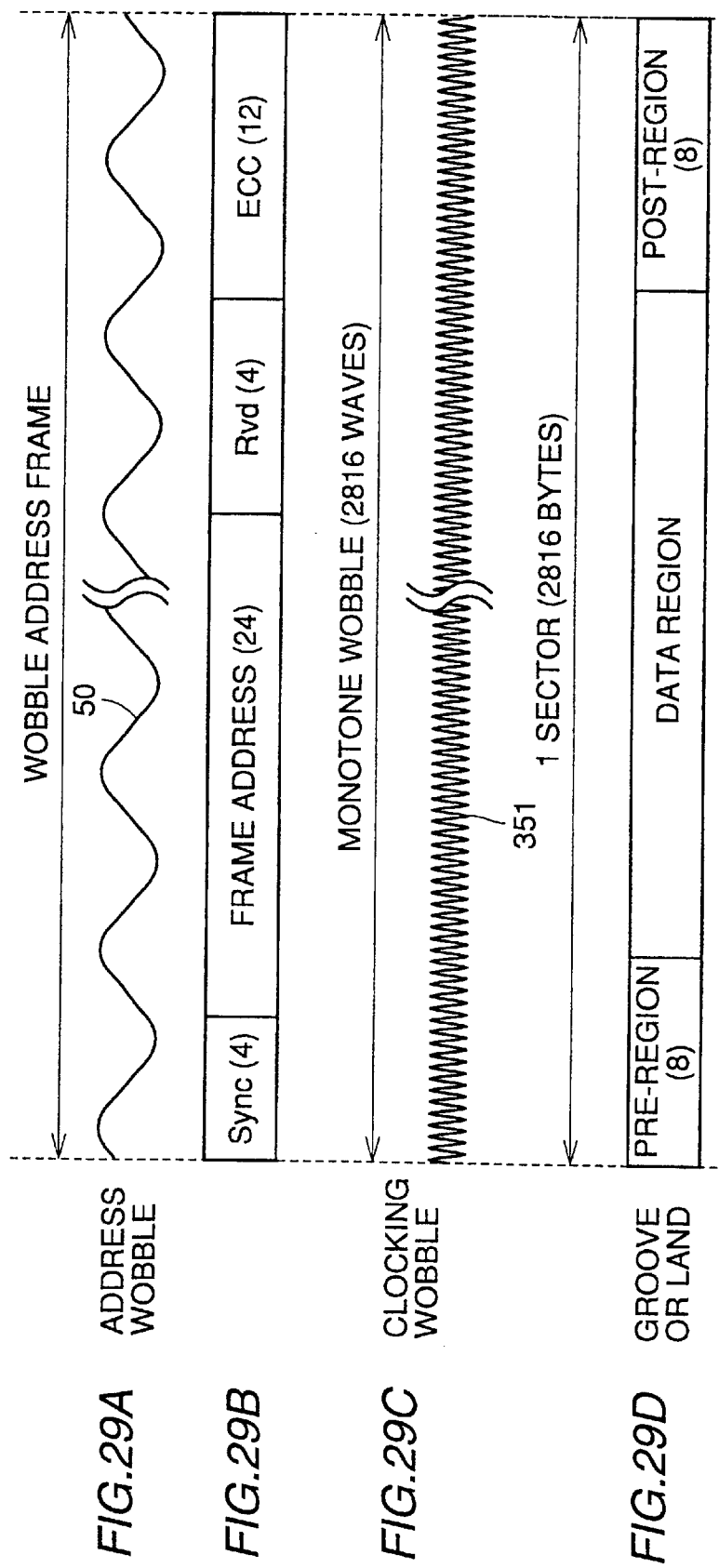

FIG.46A
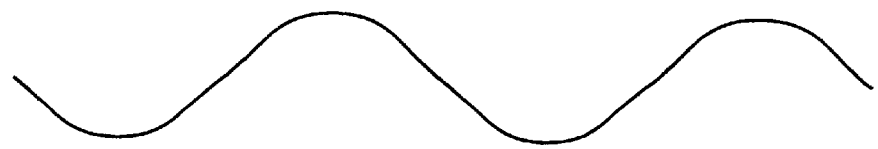
FIG.46B
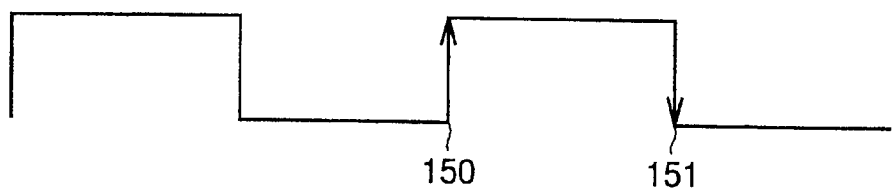
150    151

FIG.69A  Sg
FIG.69B  Sh
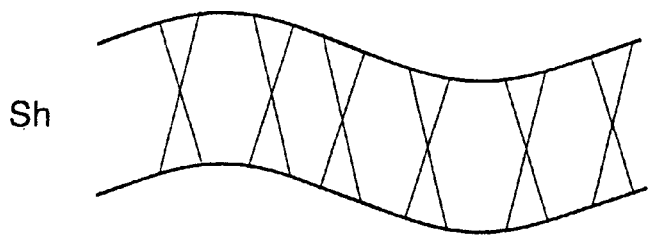
FIG.69C  Si
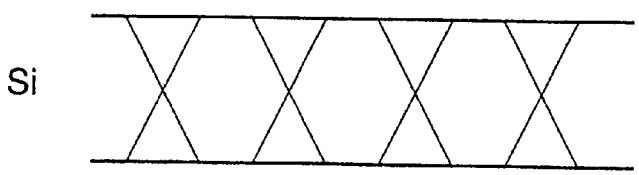
FIG.70
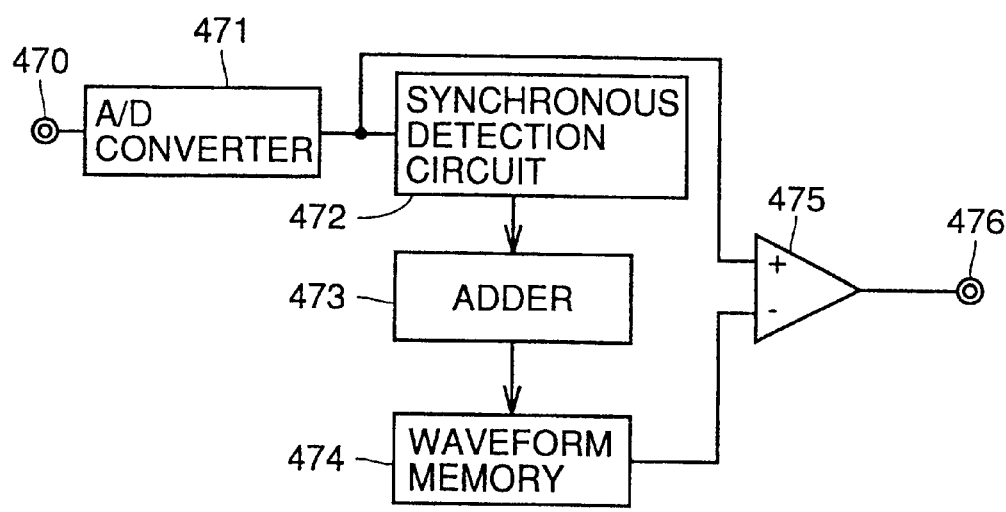

FIG.81A SA1 
FIG.81B SA2 

RECORD MEDIUM AND REPRODUCING APPARATUS OF THE SAME FOR DETECTING AN OFFSET CORRECTION

This application is a divisional of prior application Ser. No. 09/147,962 filed Mar. 24, 1999, which is a 371 of PCT/JP97/02442, filed Jul. 14, 1997.

TECHNICAL FIELD

The present invention relates to a magneto-optical record medium (which will be referred to merely as a "disk" hereinafter) allowing recording and reproducing of data, and also relates to a reproducing apparatus of the same.

BACKGROUND ART

Mini-disks are provided with grooves which correspond to waveforms of signals, produced by frequency modulation of carrier waves forming synchronous signals for rotation with address information. The grooves are utilizes for rotation control and detection of the address information. This method of recording and reproducing the information is generally referred to as a wobbling method.

It has also been proposed to employ the wobbling method in such a disk that grooves are formed similarly to the above and lands between the grooves are also used for recording.

FIG. 84 shows a structure of a disk reproducing apparatus in the prior art.

The disk reproducing apparatus shown in FIG. 84 reads out address information in the following manner. A laser beam emitted from a laser light source of an optical pickup (not shown) is divided by a diffraction grating into a main beam and side beams. When tracking control is performed to move the main beam on the center of the groove, the address information is read from push-pull signals obtained from the main beam. When the tracking control is performed to move the main beam on the center of the land, the address information recorded on the groove is read from the push-pull signals obtained from the side beam.

In the conventional disks, since data is recorded on the grooves and lands, the total length of tracks is twice as large as that of a structure in which data is recorded only on grooves. However, the address information is recorded on only the grooves. Therefore, an optical part such as a diffraction grating must be employed for dividing the laser beam, which is emitted from the laser beam source of the optical pickup, into three beams, i.e., the main beam and the two side beams as described above.

The so-called "three-beam method" in the prior art described above suffers from a problem that the power of the laser beam emitted from the laser beam source cannot be efficiently utilized.

DISCLOSURE OF THE INVENTION

An object of the invention is to provide a record medium, in which address information recorded by wobbling opposite sidewalls of a groove can be read out with a single laser beam in operations of recording and reproducing data with respect to not only the groove but also the land, as well as a reproducing apparatus for the same.

The object can be achieved by providing a record medium which includes an address identification portion including a land and a first groove, at least one of the land and the first groove having a variable width; and an address portion including a second groove having sidewalls wobbled in accordance with two items of address information per one data, having a constant width and connected to the first groove.

The object of the invention is also achieved by providing a reproducing apparatus for reproducing data on the above record medium, which includes a detecting circuit for irradiating the record medium with light and detecting reflected light; an address information reproducing circuit for reproducing address information in response to the reflected light detected by the detecting circuit; an address identification information reproducing circuit for reproducing the address identification information in response to the reflected light coming from the address identification portion and detected by the detecting circuit; and a select circuit for selecting one of two items of address information reproduced by the address information reproducing circuit in response to one item of the address identification information reproduced by the address identification information reproducing circuit.

As a major advantage of the invention, optical parts required in the reproducing apparatus can be reduced in number, and an intensity of a laser beam emitted to the record medium for data reproduction can be increased so that data reproduction can be achieved more reliably by the reproducing apparatus having a simpler structure than the prior art.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A–2E show a format of the disk shown in FIG. 1;

FIGS. 8A–8D show waveforms of address identification signals issued from a comparator included in the reproducing apparatus shown in FIG. 7;

FIGS. 29A–29D show a format of the disk according to the embodiment 7 of the invention;

FIGS. 46A and 46B show an operation of a wobble detecting circuit shown in FIG. 45;

FIGS. 69A–69C are waveform diagrams showing an operation of the circuit shown in FIG. 68;

FIG. 70 shows a structure of a leak-in removing circuit according to the embodiment 25;

FIGS. 81A, 81B and 82 show detection of address information recorded in the form of wobbles;

BEST MODE FOR CARRYING OUT THE INVENTION

Disks, recording/reproducing apparatus and others according to the invention will be described below with reference to the drawings. In figures, the same numbers and characteristics indicate the same or similar portions.

Embodiment 1

Figure 1:
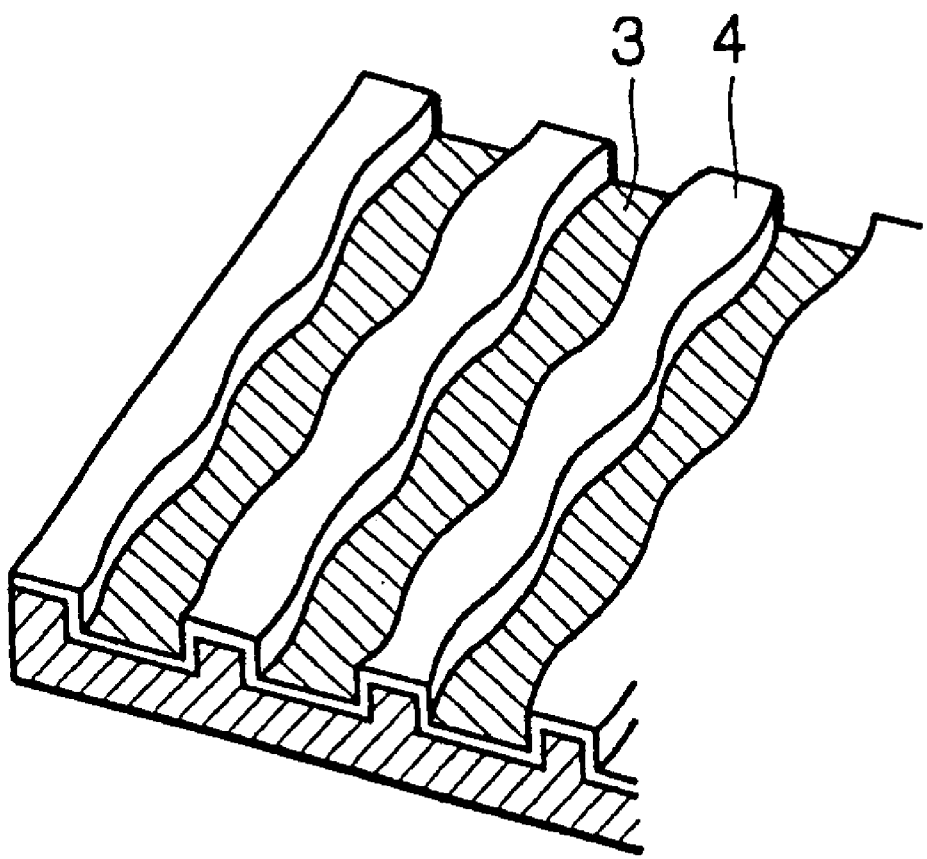
FIG. 1 is a perspective view showing a structure of a disk according to an embodiment 1 of the invention.

FIG. 1 is a perspective view showing a structure of a disk according to an embodiment 1 of the invention.

As shown in FIG. 1, the disk is provided at its surface with grooves 3 extending spirally from the inner periphery to the outer periphery of the disk. On a glass master of the disk, grooves 3 are formed in a mastering step by cutting the master in accordance with a wobble signal formed by frequency-modulation of a carrier wave of 1.1 MHz with a biphase signal of a frequency shift of ±50 kHz.

The frequency of the carrier wave depends on the number of addresses allocated to the whole disk, and is desirably set in a range from 200 kHz to 10 MHz.

The wobbles provided at the opposite sidewalls of groove 3 formed in this manner has an amplitude from 30 nm to 50 nm in the radial (tracking direction) of the disk. Groove 3 has a depth equal to $\frac{1}{6}$–$\frac{1}{12}$ of a laser wavelength so that crosstalk can be suppressed between neighboring tracks recorded on a land 4 and groove 3.

The pitch of lands 4 and grooves 3 is 0.55 μm. Each of the tracks on the lands and grooves on the disk is formed of 60 zones each having a doughnut-like form, and reproduction is performed by keeping a constant rotation speed for each zone, i.e., by CAV (Constant Average Velocity) control.

According to this control, therefore, the rotation speed of the disk is increased for radially inner zones, and is reduced for radially outer zones so that the linear velocity can be constant for all the zones.

FIGS. 2A–2E show a format of the disk shown in FIG. 1. As shown in FIG. 2A, each track includes frames of Nf in number. In the radially inner zones, the track traced during one rotation of the disk specifically includes 42 frames and, in the radially outer zones, the track traced during one rotation of the disk includes 101 frames. Each frame includes 26 segments as shown in FIG. 2B, and address information is recorded on only the address segment among them located at the leading position. Data is recorded on continuous 25 data segments following the address segment, and the sidewalls of the groove in the data segments are not wobbled.

As shown in FIGS. 2C and 2D, a fine clock mark 20 is recorded on the leading portion of each segment for rotation control of the disk. Fine clock mark 20 has an amplitude from about 30 nm to 50 nm in the radial direction of the disk similarly to the address information. Fine clock mark 20 allows production of a clock signal for data reading, whereby modulation of data not having a clock component can be achieved.

As shown in FIGS. 2C, the address segment also stores reserve information (Rvd), address mark (AM), preamble (PA), address 1, address 2, preamble (PA) and read/write (R/W) test information, which follow fine clock mark 20 and are successively arranged in this order. Addresses 1 and 2 represent the locations of data recorded on the groove and data recorded on the land, respectively. As shown in FIG. 2E, a synchronous pattern (Sync) of 4 bits, address data of 24 bits, reserve information (Rvd) of 6 bits and an error detection code (CRC: Cyclic Redundancy Code) of 14 bits are recorded in the leading and subsequent locations on each of addresses 1 and 2, respectively.

Depending on the disk capacity and the address setting manner, the number of bits is variable. On a portion following the address data, the disk may store, in the form of wobbles, information peculiar to the disk such as information which is available instead of the address mark or setting of laser power conditions for recording or reproducing data.

The method of coding address information is not restricted to the biphase coding, but may employ Manchester coding, NRZ coding or NRZI coding.

The data in each frame is formed of 25 data segments divided from each other as shown in FIG. 2B, but may not be divided into segments.

As shown in FIG. 2D, each data segment includes a pre-region following fine clock mark 20, data region and a post-region.

Figure 3:
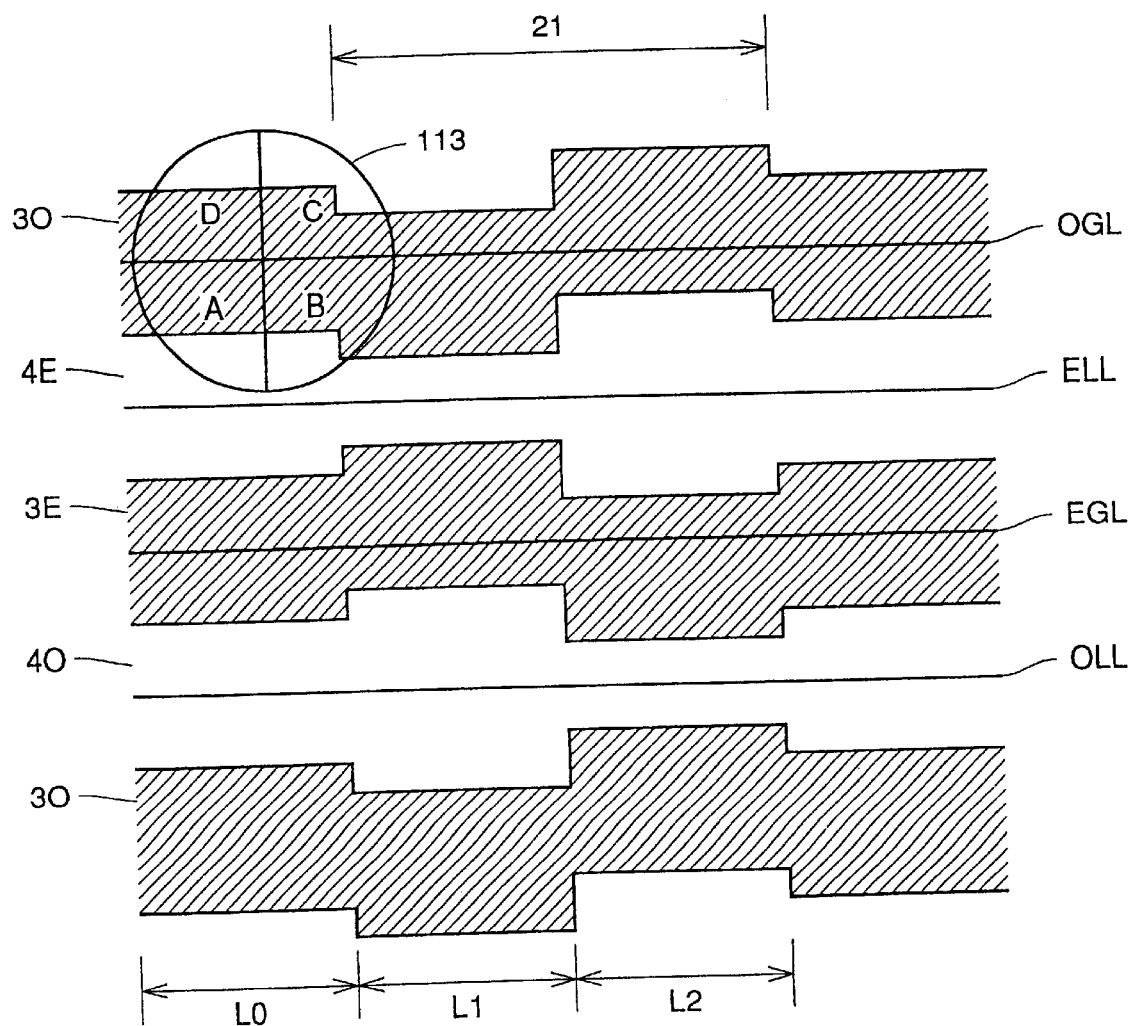
FIG. 3 shows a planar structure of the disk in a portion forming address marks shown in FIG. 2.

FIG. 3 shows a planar structure of a portion of the disk forming the address marks (AM) shown in FIG. 2C. As shown in FIG. 3, the address mark is recorded by forming an odd-numbered groove 3O and an even-number groove 3E, of which phases are opposite to each other. More specifically, groove 3O has a constant width, and has a center in a section L1, which is shifted downward in the figure by 0.1 μm from a reference defined by the center in a section L0, as well as a center in a section L2, which is shifted upward by 0.1 μm from the same reference. Groove 3E has the same width as groove 3O, and has a center in section L1, which is shifted upward by 0.1 μm from a reference defined by the center in section L0, as well as a center in section L2, which is shifted downward by 0.1 μm from the same reference. As a result of formation of grooves 3O and 3E, a land 4E located between grooves 3O and 3E has a width of 0.35 μm in section L1 and a width of 0.75 μm in section L2. Another land 4O located between grooves 3E and 3O has a width of 0.75 in section L1 and a width of 0.35 μm in section L2. These address marks are recorded for identifying the address, which corresponds to the data being recorded or reproduced, among addresses 1 and 2 shown in FIG. 2C, which are recorded on grooves 3O and 3E as well as lands 4E and 4O.

Figure 4:
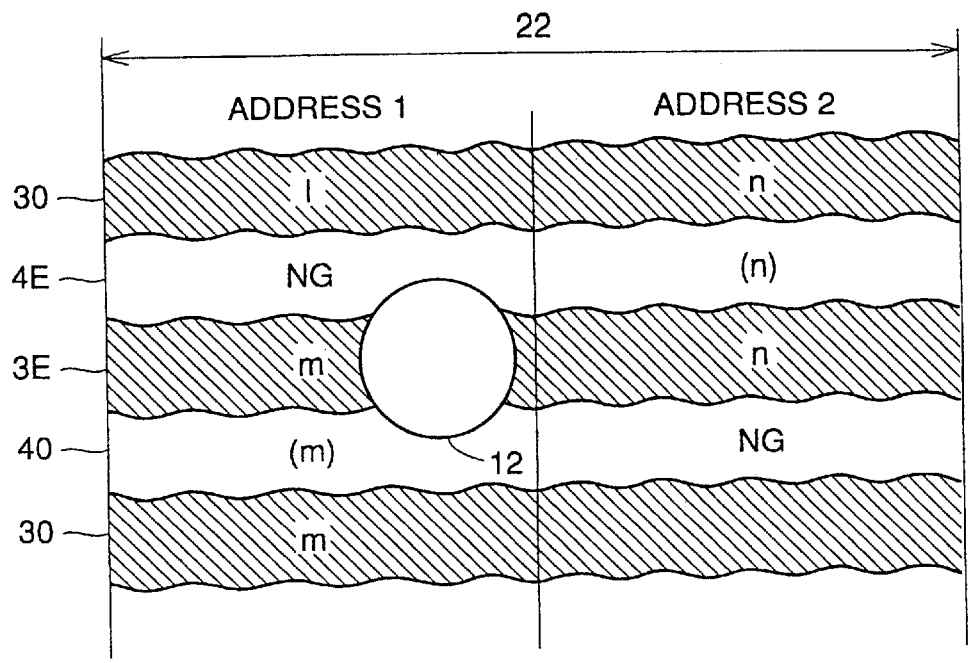
FIG. 4 shows scanning of grooves with a beam spot in the planar structure of an address portion shown in FIG. 2.
Figure 5:
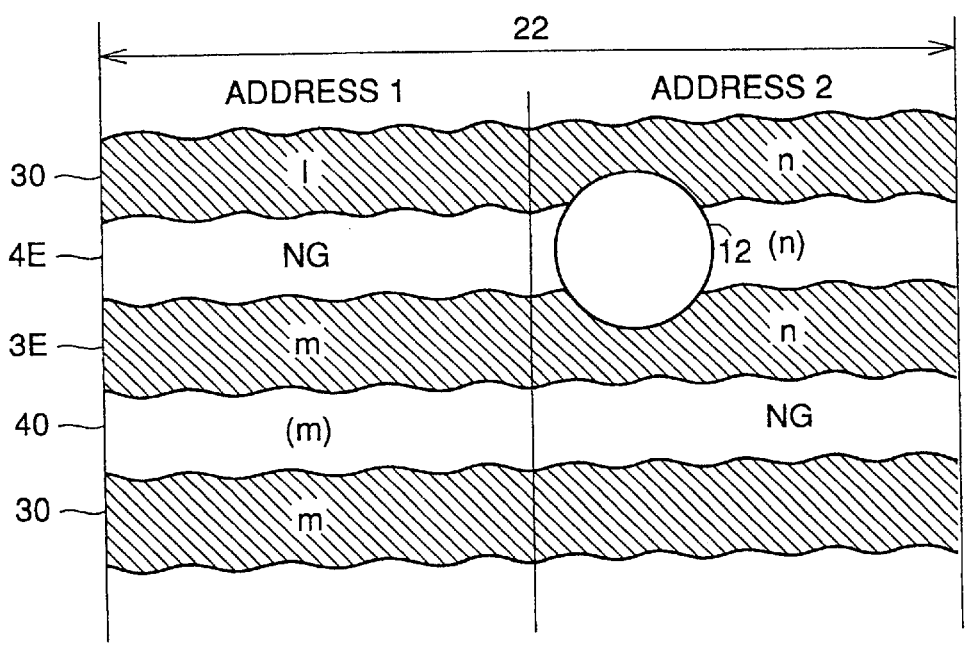
FIG. 5 shows scanning of lands with a beam spot in the planar structure of the address portion shown in FIG. 2.

FIGS. 4 and 5 show a planar structure of the disk bearing addresses 1 and 2 shown in FIG. 2C. As shown in FIGS. 4 and 5, grooves 3O and 3E have constant widths, respectively, and also have sidewalls wobbled correspondingly to address information l, m and n. Address information (n) and (m) are recorded on lands 4E and 4O by wobbling the opposite sidewalls of grooves 3O and 3E, respectively.

In the figure, "NG" represents that address information is not recorded.

Figure 6:
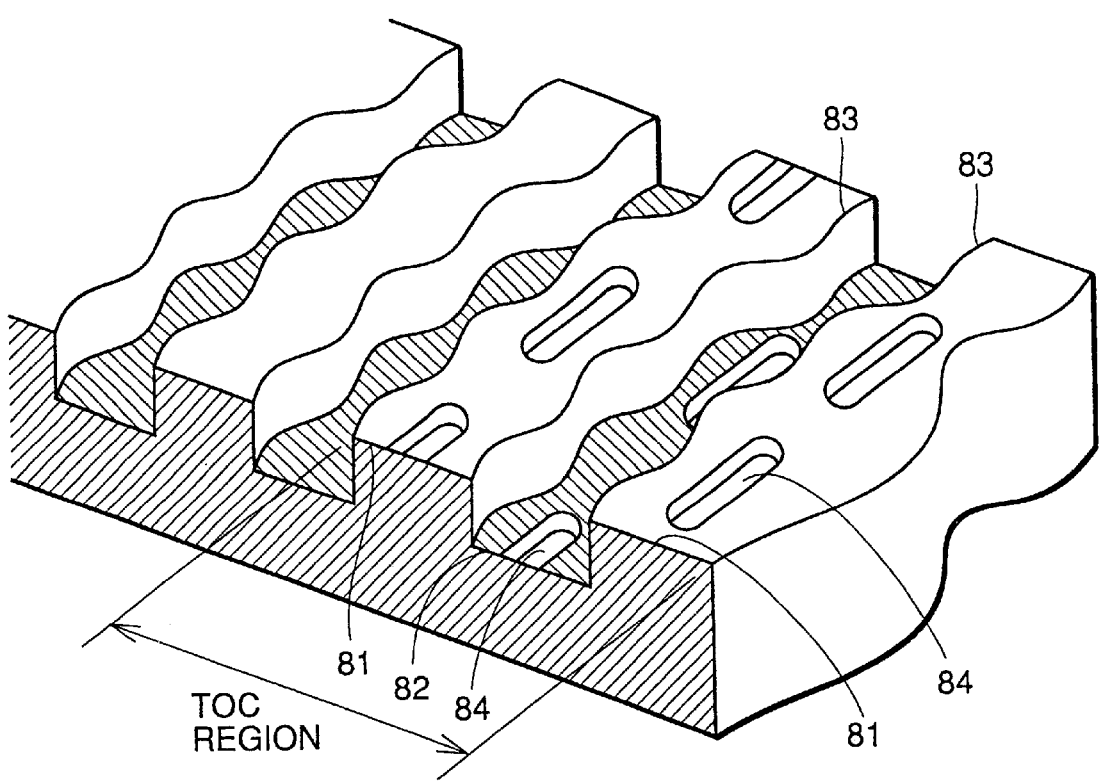
FIG. 6 is a perspective view showing a structure of a TOC region arranged at an outer peripheral portion of the disk according to the embodiment 1.

FIG. 6 is a perspective view showing a structure of a TOC (Table Of Contents) region formed on the outer peripheral portion of the disk.

As shown in FIG. 6, the TOC region bears information which relates to the laser power for data recording and the laser power for data reproducing, and is recorded as wobbles 83 formed on opposite sidewalls of a groove 82. The TOC region also bears other information such as a disk rotation speed recorded, in the form of pits 84, on a flat portion of groove 82 or land 81. Wobbles 83 formed on the opposite sidewalls of groove 82 have a frequency in a range from 200 kHz to 10 MHz, and the TOC region has a length of about 160 μm from the outer periphery of the disk.

The TOC information recorded in the forms of wobbles and pit series are reproduced by emitting a laser beam to them. Since the TOC information is recorded using both the wobbles and the pit series, the TOC information can be recorded at a higher density, and can be reproduced fast.

Figure 7:
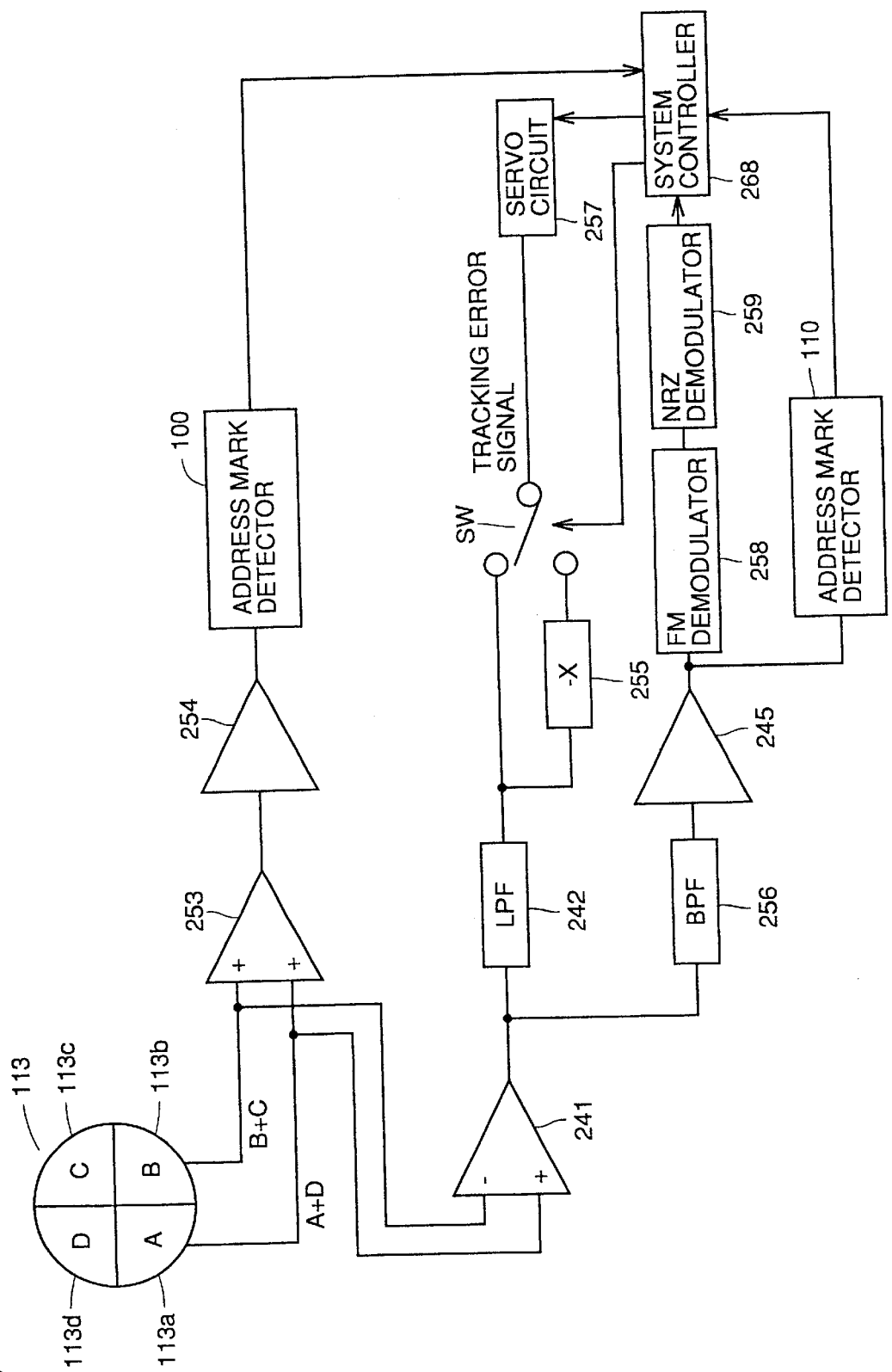
FIG. 7 shows a structure of a reproducing apparatus according to the embodiment 1.

FIG. 7 shows a structure of a reproducing apparatus according to the embodiment 1 of the invention. As shown in FIG. 7, the reproducing apparatus includes a photodetector 113 having a light receiving surface which is formed of four divided regions, amplifiers 241 and 253 connected photoreceptor 113, a comparator 254 connected to amplifier 253, an address mark detector 100 connected to comparator 254, a low-pass filter (LPF) 242 connected to amplifier 241, an inverter amplifier 255 connected to LPF 242, a switch SW selecting a tracking polarity, a band-pass filter (BPF) 256 connected to amplifier 241, a comparator 245 connected to band-pass filter 256 and an address mark detector 110 connected to comparator 245.

A laser beam which was emitted from a laser light source of an optical pickup and passed through a collimeter lens enters an objective lens through a beam splitter, and is focused on the disk to form a beam spot 12 shown in FIGS. 4 and 5.

Assuming that the laser oscillation wavelength λ is equal to 635 nm (allowable range: 620–650 nm, this is also true hereinafter) and the objective lens has a numerical aperture NA equal to 0.6 (allowable range: 0.55–0.65, this is also true hereinafter), the spot size of the focused laser beam is about 0.9 μm (allowable range: 0.80–1.0 μm, this is also true hereinafter). Reflected light coming from the beam spot is converted into an electric signal by photodetector 113. More specifically, a difference is obtained between a signal (A+D), which corresponds to the intensity of light detected on regions 113a and 113d of photodetector 113, and a signal (B+C), which corresponds to the intensity of light detected on regions 113b and 113c, and a push-pull signal is produced from the difference. Further, a tracking error signal is produced as an output of LPF 242. A focus error signal is produced by an astigmatism method by obtaining a difference between a signal (A+C) which corresponds to the light detected on regions 113a and 113c, and a signal (B+D) which corresponds to the light detected on regions 113b and 113d.

The tracking error signal and a signal produced from inverter amplifier 255 by inverting the tracking error signal are sent to inputs of switch SW, which selectively supplies one of these signals to a servo circuit 257.

Thereby, the tracking control is performed to move beam spot 12, e.g., on the center of groove 3E as shown in FIG. 4.

In this state, the push-pull signal issued from amplifier 241 enters BPF 256 so that comparator 245 issues a wobble signal.

BPF 256 has a band center frequency of 1.1 MHz, and removes noises from the signal to be sent to comparator 245. Comparator 245 shapes the waveform of the received signal to issue the wobble signal formed of a rectangular wave.

The rectangular wave signal issued from comparator 245 is sent to a frequency demodulator 258, which demodulates and sends biphase codes to an NRZ demodulator 259. NRZ demodulator 259 demodulates the biphase codes to produce an NRZ signal which is an address (ATIP). The address thus obtained is sent to a system controller 268.

When beam spot 12 follows the center of, e.g., groove 3E shown in FIG. 4, system controller 268 reads two items of address information m and n for one data.

Then, description will be given on an operation of selecting one of the two addresses read by system controller 268 for one data.

In the case where photodetector 113 scans groove 3O rightward along a center line OGL thereof as shown in FIG. 3, comparator 245 issues an address identification signal AMG1 shown in FIG. 8C, and address mark detector 110 supplies a signal selecting address 1 to system controller 268.

When photodetector 113 scans groove 3E rightward along a center line EGL thereof, comparator 245 issues an address identification signal AMG2 shown in FIG. 8D, and address mark detector 110 supplies a signal selecting address 2 to system controller 268.

In this manner, system controller 268 selects one item of address information, and identifies one address corresponding to one data recorded on groove 3O or 3E. In the case shown in FIG. 4, therefore, system controller 268 identifies address information n.

The operation has been described in connection with the case where system controller 268 instructs recording or reproducing of data on grooves 3O and 3E. Then, description will be given on the case where system controller 268 instructs recording or reproducing of data on lands 4O and 4E.

For example, when scanning is performed by moving beam spot 12 rightward on the center of land 4E as shown in FIG. 5, address information is not read out as address 1 (NG), but address information (n) is read out as address 2.

Amplifier 253 adds the signal (A+D) and signal (B+C), together and supplies the result to comparator 254 so that the variation in width of the land is detected as the variation in quantity of reflected light coming from the disk. In the case where photodetector 113 scans land 4E shown in FIG. 3 rightward along a center line ELL thereof, comparator 254 shown in FIG. 7 issues an address identification signal AML2 shown in FIG. 8B, and address mark detector 100 supplies a signal selecting address 2 to system controller 268.

When photodetector 113 scans land 4O shown in FIG. 3 rightward along a center line OLL thereof, comparator 254 shown in FIG. 7 issues address identification signal AML1 shown in FIG. 8A, and address detector 100 supplies a signal selecting address 1 to system controller 268.

In the case shown in FIG. 5, therefore, system controller 268 identifies address information (n) as one address for one data recorded on land 4E.

In the case where beam spot 12 is controlled to irradiate the center of land 4O or 4E, system controller 268 controls switch SW to supply the inverted tracking error signal to servo circuit 257.

Since the disk of the embodiment 1 has the foregoing structure, the embodiment may be specifically applied, in addition to the magneto-optical disk, a CD-WO (Compact Disk of Write-Once type), a phase-change disk or a so-called Mini-disk. The glass master for manufacturing the disk of the embodiment is formed in a mastering step by using a wobble signal, which is produced by frequency modulation of the carrier wave of 1.1 MHz with a biphase signal of a frequency shift of ±50 kHz. However, the grooves can be formed with a wobble signal formed of the biphase signal without effecting frequency modulation thereof.

In the foregoing description, the wobbles provided at grooves 3O and 3E have an amplitude from 30 nm to 50 nm in the radial direction of the disk, but the amplitude may be in a range from 10 nm to 50 nm.

Embodiment 2

Figure 9:
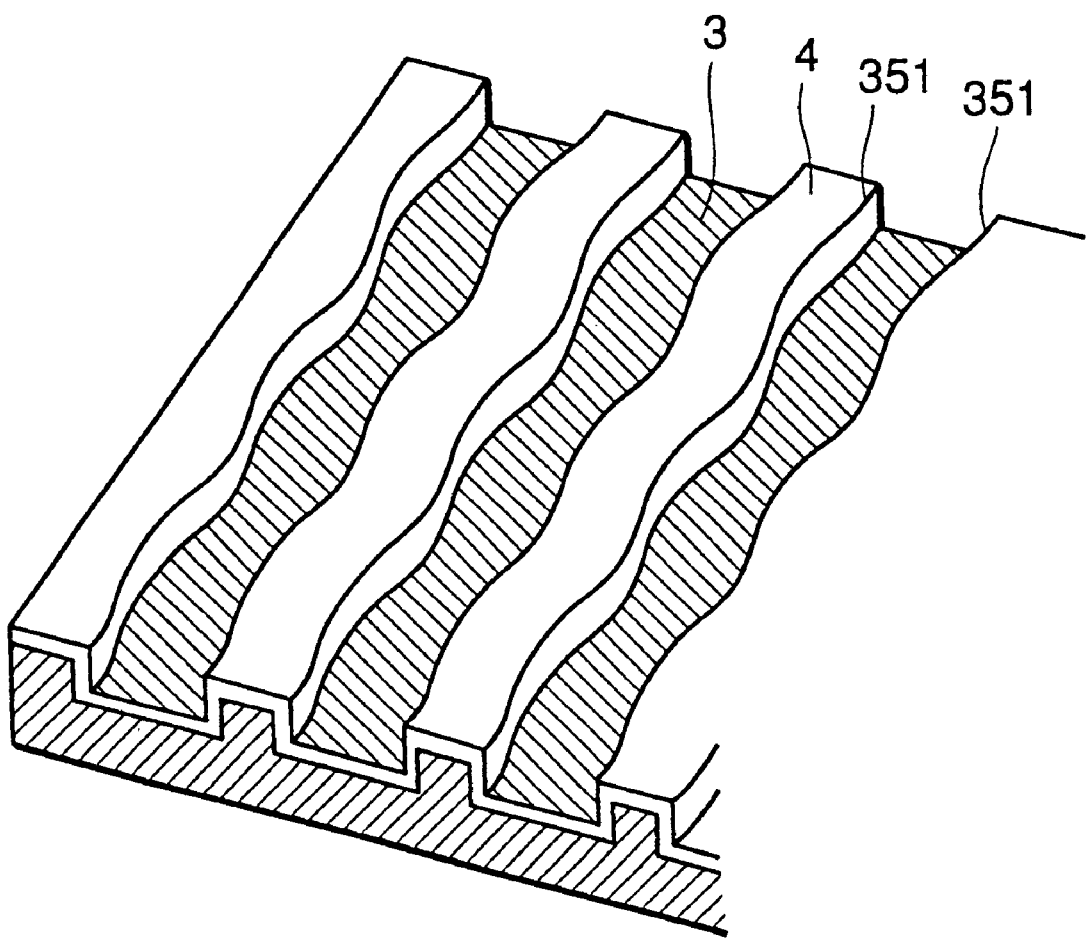
FIG. 9 is a perspective view of a structure of a data portion in a disk according to an embodiment 2 of the invention.

FIG. 9 is a perspective view showing a structure of a data recording portion (which will be referred to merely as a "data portion" hereinafter) on a disk according to an embodiment 2 of the invention. The disk according to the embodiment of the invention allows magnetic recording and reproducing of data on both land 4 and groove 3, as can also be done on the disk according to the embodiment 1, but differs from the disk according to the embodiment 1 in that the data portion of the disk is provided with grooves 3 for producing a synchronizing signal which is required for controlling rotation of the disk as well as recording and reproducing data. Groove 3 has a constant width and sidewalls which are cyclically wobbled. Wobbles 351 formed on the data portion are referred to as "clocking wobbles" hereinafter.

The frequency of clocking wobble 351 is set to 2 MHz equal to ⅛ of a bit clock frequency of 16 MHz of data to be recorded for allowing synchronization with the data to be recorded, but is desirably set in a range from about 200 kHz to about 10 MHz in view of frequency characteristics of a reproduction circuitry and facilities for forming grooves 3. The frequency of clocking wobble 351 may be in a range from 50 kHz to 10 MHz.

Clocking wobbles 351 formed on the opposite sidewalls of groove 3 has an amplitude from about 10 nm to about 50 nm in the radial direction of the disk.

Each of the tracks on lands 4 and grooves 3 on the disk is formed of 60 zones each having a doughnut-like form. The rotation speed is kept constant for each zone, and thus a so-called CAV control is performed. With increase in number of the zones, each of which is scanned at a constant rotation, the area for recording data on the disk can be utilized more efficiently.

Clocking wobbles 351, which are formed by wobbling the two sidewalls of grooves 3 neighboring to each other with land 4 therebetween, have the same waveforms throughout the length of each track of each groove 3 or land 4. In the 60 zones each scanned at a constant rotation speed, therefore, the wobbles of the same phases are arranged in a radial pattern.

Figure 10:
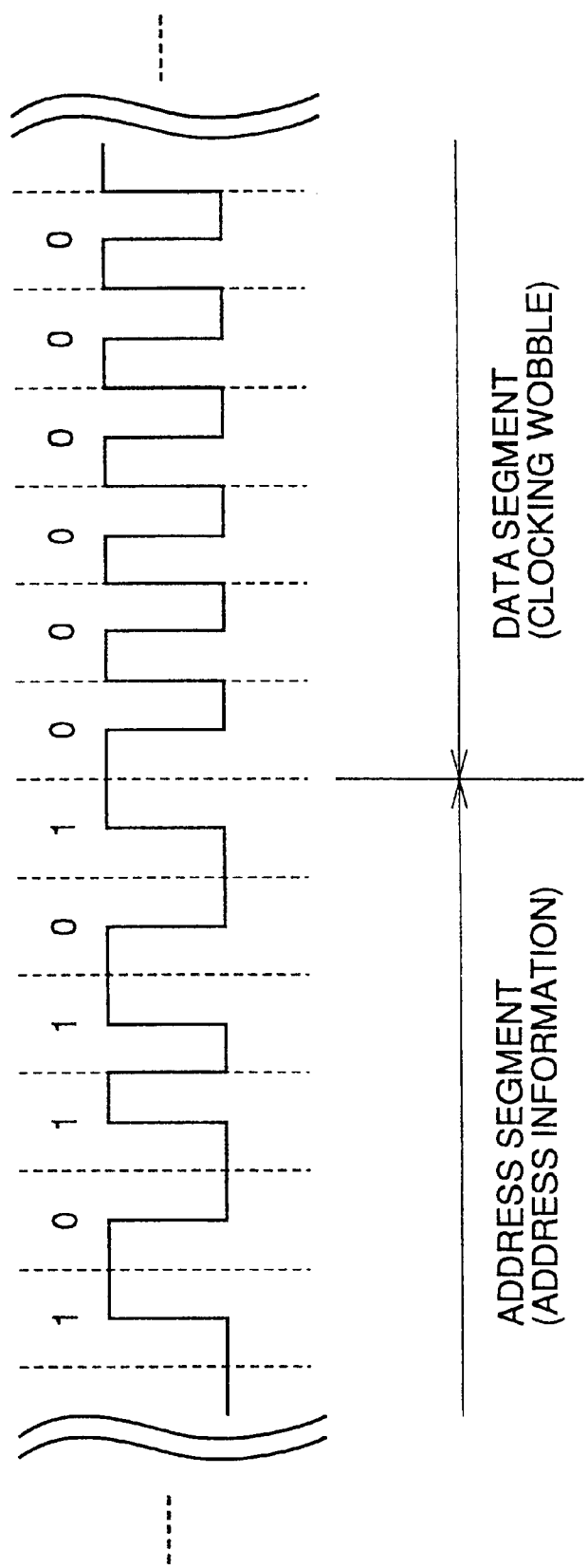
FIG. 10 shows an example of a binary signal for wobbling in the address and data portions.

FIG. 10 shows an example of a binary signal for wobbling in the address segment (address portion) and the data segment (data portion). As shown in FIG. 10, values of biphase data, all of which is 0 or 1, are consequently recorded on the portion of the disk providing the data segment according to the embodiment. Therefore, signals formed by biphase modulation of data of the address information are recorded in the form of wobbles on the portion providing the address segment, and signals formed by biphase modulation of data taking the values of 0 (or 1) are recorded in the form of wobbles on the portion providing the data segment.

Figure 11:
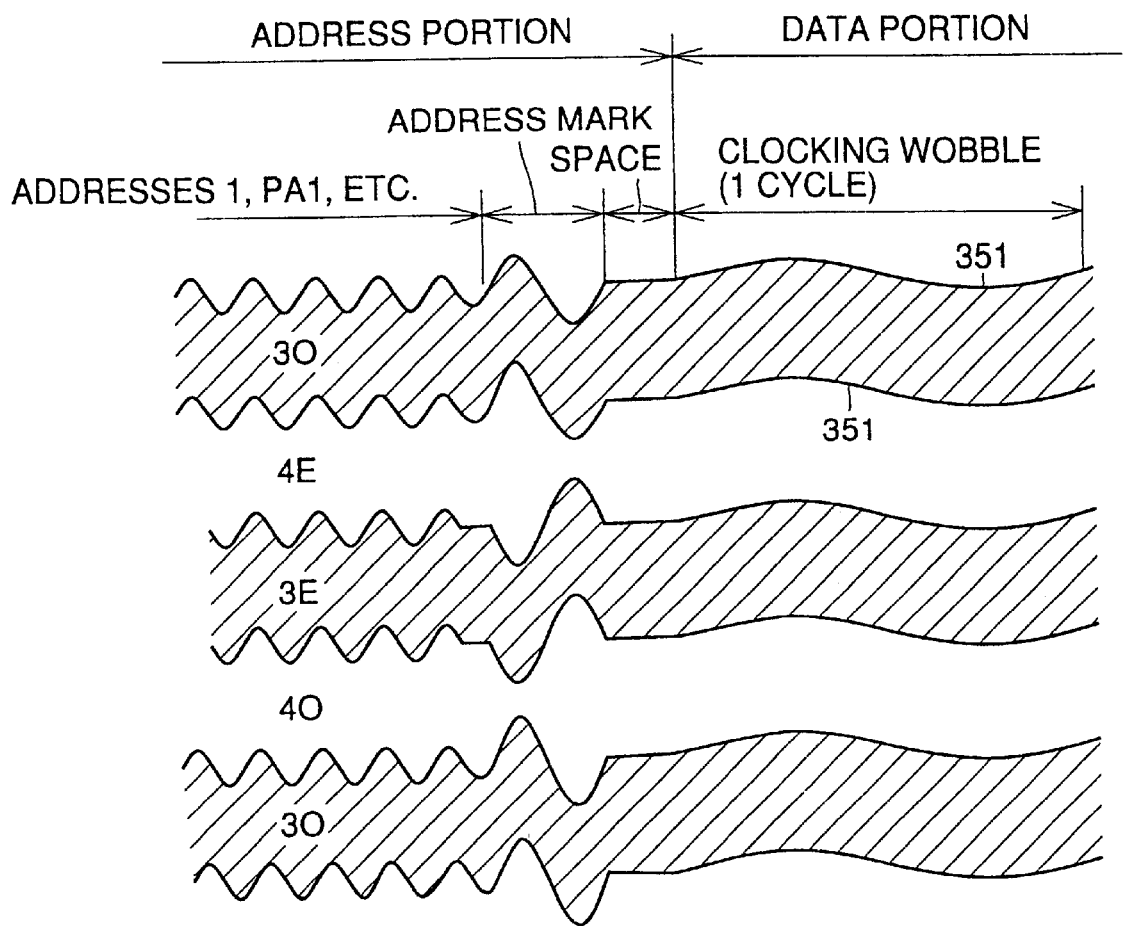
FIGS. 11 and 12 are plans showing a planar structure of the disk according to the embodiment 2 of the invention.

FIG. 11 shows a planar structure of the disk according to the embodiment 2 of the invention. As shown in FIG. 11, the disk is provided with grooves 3O and 3E having a constant width. In the address portion, the opposite sidewalls of each of grooves 3O and 3E are wobbled to have same phase in accordance with addresses 1, PA1 and others. Also, the neighboring sidewalls of grooves 3O and 3E are wobbled to have opposite phases in accordance with the address identification information. Further, the opposite side walls of each of grooves 3O and 3E form clocking wobbles 351 in the data portion following the address portion with a space therebetween.

Figure 12:
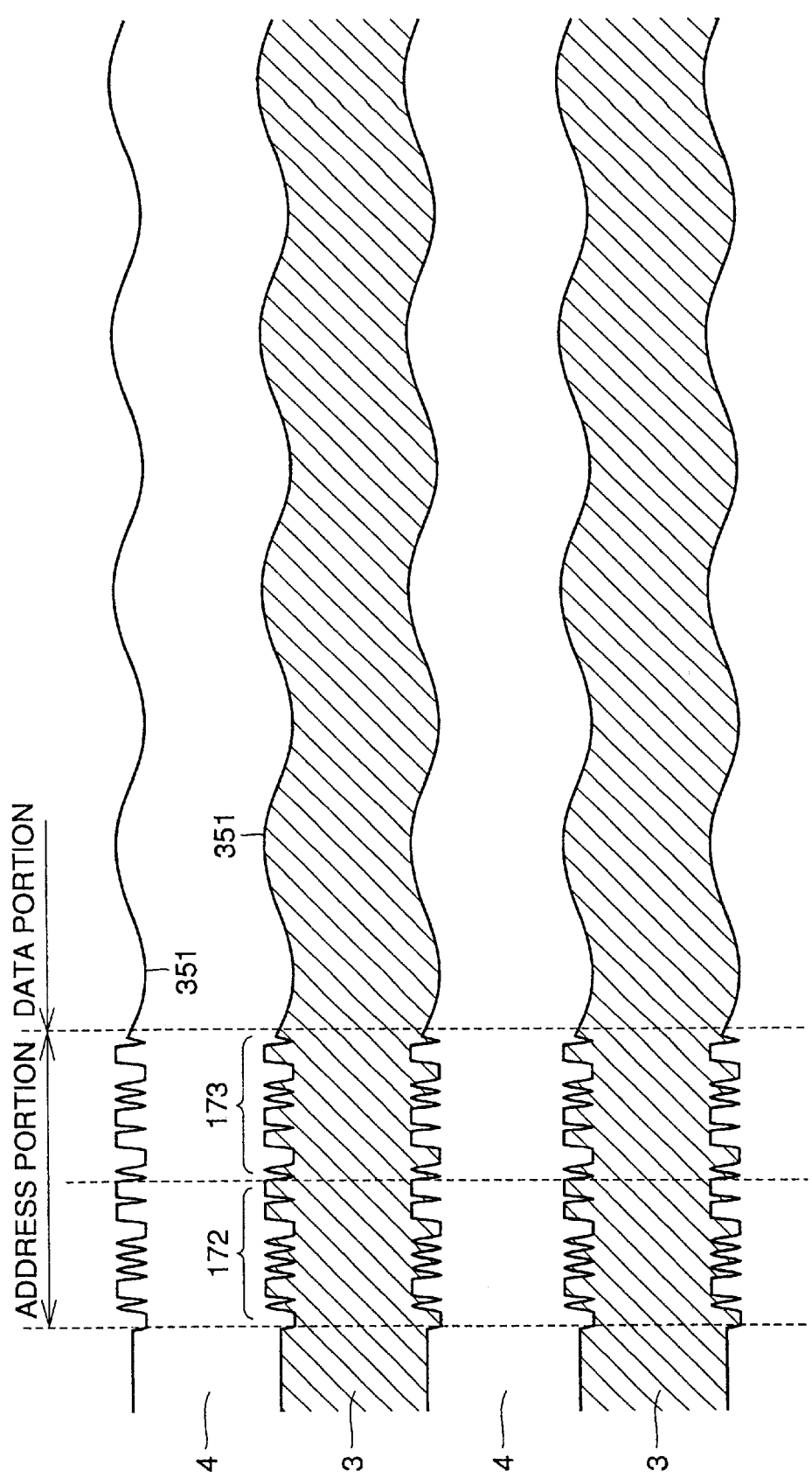

FIG. 12 shows more specifically the structure shown in FIG. 11, and shows a planar structure of the disk in which the address portion is provided with wobbles 172 corresponding to address 1 for the lands as well as wobbles 173 corresponding to address 2 for the grooves.

Addresses 1 and 2 are identified in accordance with address marks shown in FIG. 11. The manner of this identification is the same as that already described in connection with the embodiment 1.

Figure 13:
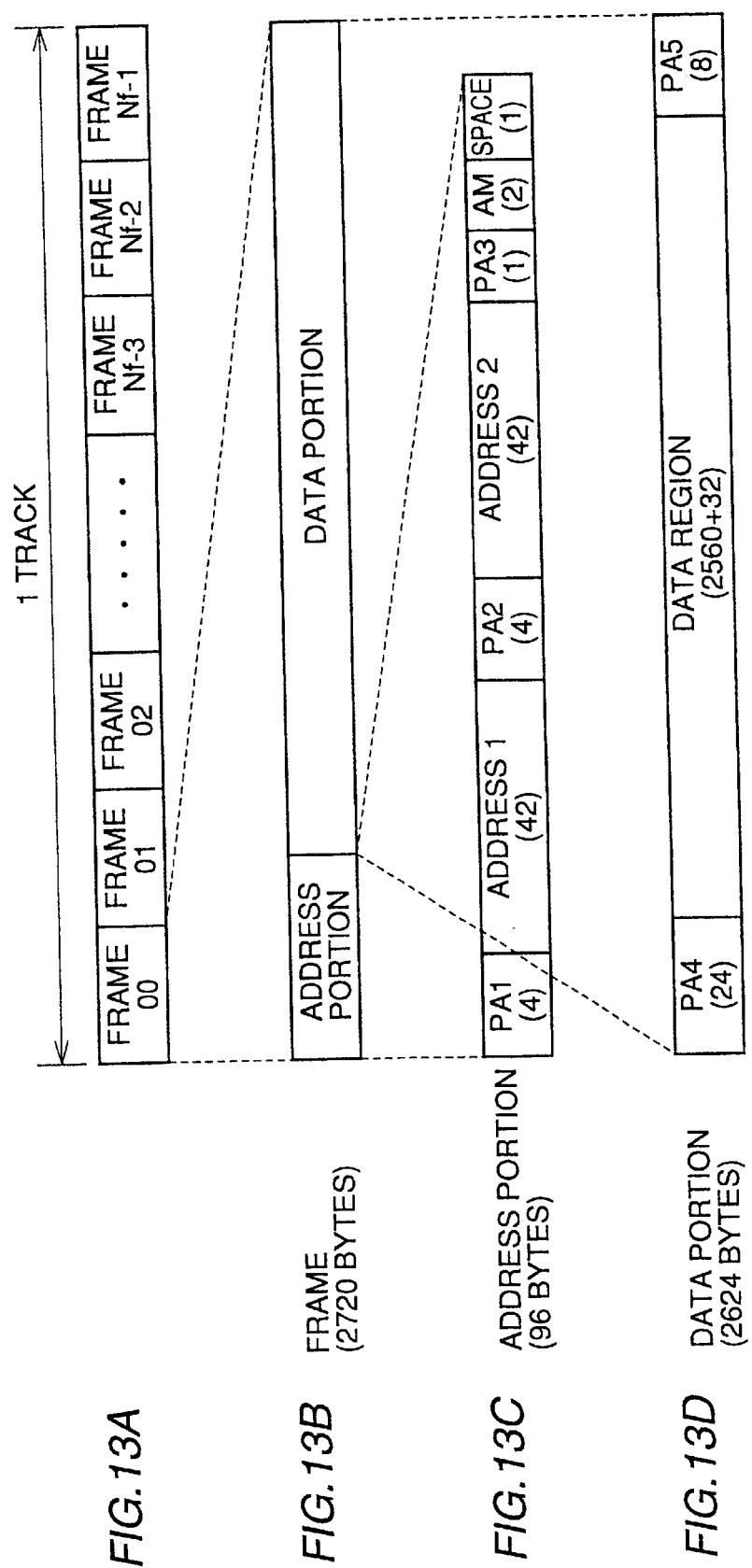
FIGS. 13A–13D show a disk format of the disk according to the embodiment 2 of the invention.

FIGS. 13A–13D show a format of the disk according to the embodiment. As shown in FIG. 13A, one track (one circle) of the disk is divided into frames of Nf in number. Each frame has a length of 2720 bytes as shown in FIG. 13B, and is divided into the address portion having a length of 96 bytes and the data portion having a length of 2624 bytes. Magneto-optical signals (data) are mainly recorded on and reproduced from the data portion using NZRI modulation or (1–7) modulation.

Assuming that the data is recorded with a bit density of 0.22 μm/bit, each frame has a length of 4.7872 μm. If the bit density is 0.20 μm/bit, each frame has a length of 4.352 mm. If the disk has a size of 12 cm equal to the compact disk (CD), the frame number Nf per track is from about 30 to about 87.

Assuming that the address portion shown in FIG. 13C has a length of 96 bytes, and the minimum wobble frequency in the address portion is "1 byte", the length of one frequency on the disk is in a range from 1.60 to 1.76 μm. Also, each of preambles (PA) 1 and 2 has a length of 4 bytes on the disk, each of addresses 1 and 2 has a length of 2 bytes, and each of preamble (PA) 3 and the space has a length of 1 byte.

In the data portion which has a length of 2624 bytes as shown in FIG. 13D, a preamble (PA) 4 has a length of 24 bytes, a data region has a length of 2592 bytes, and a preamble (PA) 5 has a length of 8 bytes. The data region having a length of 2592 byte includes a region of 2048 bytes in length allowing recording by a user, a region having a length of 32 bytes in which data for suppressing a DC component in a record signal is recorded, and a region in which data for error correction is recorded.

Assuming that one cycle of the clocking wobble, which is utilized for producing a synchronizing signal for recording and reproducing data, corresponds to a length of 16 bytes, the length of one clocking wobble on the disk is 28.16 μm if the bit density is 0.22 μm/bit, and is 25.6 μm if the bit density is 0.20 μm/bit. In this case, 164 clocking wobbles are present on the data portion in one frame.

Assuming that 60 frames are present in one track and the disk rotates at 1500 rpm, the frequency of the clocking wobble is 255 kHz. For recording and reproducing data by using the frequency of the clocking wobble, a PLL circuit produces a data synchronizing signal for data recording/reproducing.

For example, if NRZI is used as the data modulation method, the frequency of the data synchronizing signal is 32.64 MHz, and the dividing ratio of the PLL circuit is set to 1/128. The length of one wobble is not restricted to correspond to 16 bytes, but may correspond to a length of, e.g., 4, 8 or 20 bytes. In this case, the frequency of clocking wobble is different from 255 kHz, but it is required only to determine an appropriate value of the dividing ratio of the PLL circuit, which produces the data synchronizing signal. In the disk according to the embodiment 2, one cycle of the clocking wobble is in a range from 5 to 50 μm.

Figure 14:
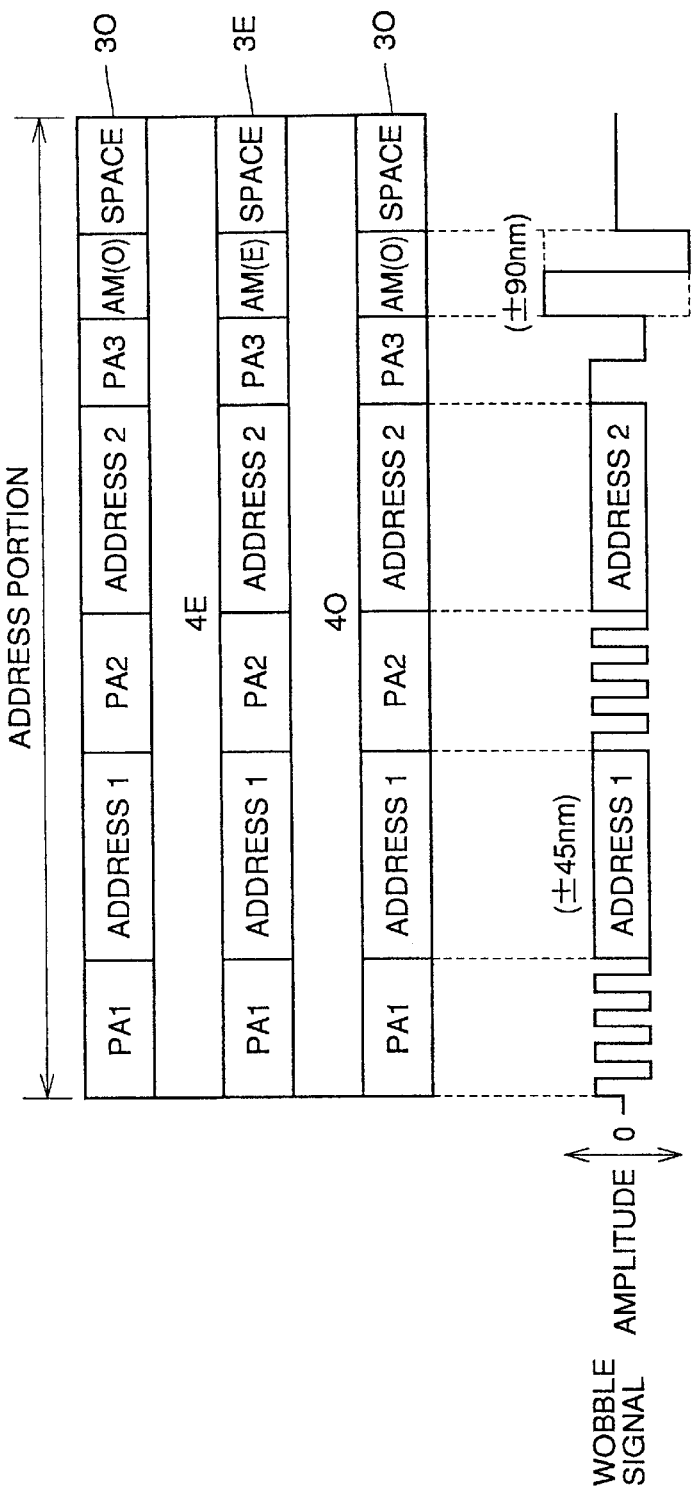
FIG. 14A shows a layout of the address portion on the disk shown in FIG. 13C.
FIG. 14B shows a wobble signal reproduced from the address portion.
FIG. 14C shows contents of the address information.

FIG. 14A shows a layout of the address portion on the disk shown in FIG. 13C. FIG. 14B shows the wobble signal reproduced from the address portion, and FIG. 14C shows contents of address information.

Each of addresses 1 and 2 stores information of 42 bits. As shown in FIG. 14C, each address includes a frame address which represents an order in one track and is formed of 8 bits, a track address which is formed of 16 bits and represents a serial number indicating a position or order of the track in the entire disk counted from the radially outermost or innermost track, a synchronizing signal (Sync) formed of 4 bits, and an error detection code (CRC) formed of 14 bits. On the format, therefore, one track can contain up to 256 frames, and the whole disk can have up to 65536 tracks.

PA1, PA2 and PA3 shown in FIG. 14A are used as preambles or postambles for accurately detecting addresses 1, addresses 2 and address marks (AM(O) and AM(E)). Wobbles used for recording these signals have substantially equal amplitudes.

More specifically, if a ratio in width between grooves 3O and 3E and lands 4O and 4E is approximately 1:1, and the pitch of grooves 3O and 3E is from 1.0 to 1.28 $\mu$m, the amplitude of the wobble must be from 15 to 150 nm. In particular, the amplitude is desirably in a range between 25 to 70 nm for keeping the signal-to-noise ratio of the wobble signal within a constant range and thereby accurately detecting the address marks.

The manners of recording the address mark and identifying the address in accordance with the address mark are the same as those already described in connection with the embodiment 1. However, for more reliable identification, the wobble serving as the address mark preferably has an amplitude in a range from 30 to 150 nm and, more preferably, in a range from 60 to 120 nm if the ratio in width between groove 3O or 3E and land 4O or 4E is approximately 1:1, and the pitch of grooves 3O and 3E is from 1.0 to 1.28 $\mu$m.

The bit error rate and margin of the address portion are improved to allow more precise reproduction if one wobble cycle is longer than 1.2 $\mu$m. However, the longer cycle reduces the format efficiency of the data. Therefore, the cycle length must be in a range from 1.2 to 5 $\mu$m. This is true with respect to not only the magneto-optical record medium but also a phase-change disk and recordable disk of a dye type or a metal type.

Figure 15:
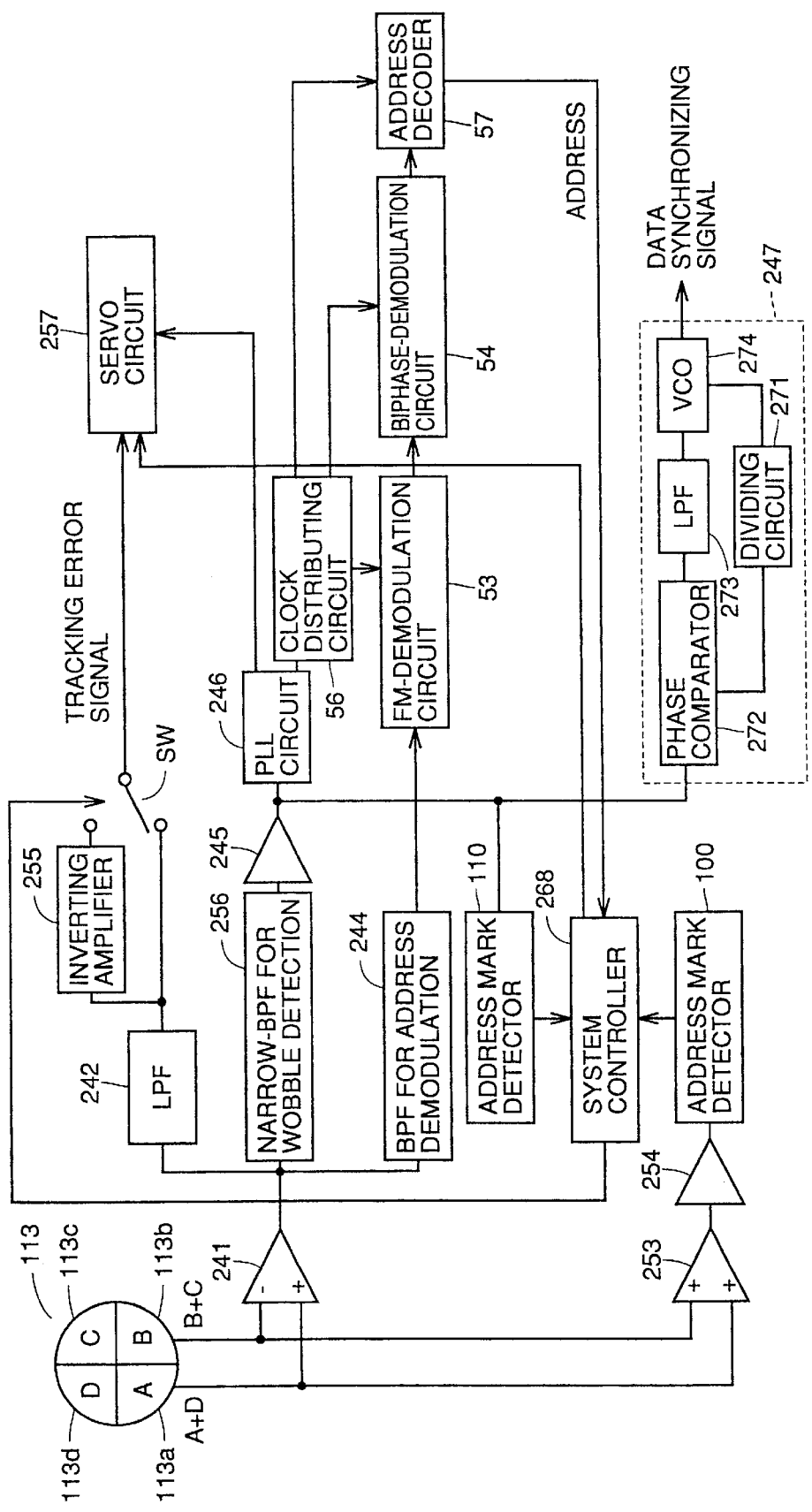
FIG. 15 is a block diagram showing a structure of the reproducing apparatus according to the embodiment 2 of the invention.

FIG. 15 shows a structure of a reproducing apparatus for reproducing the disk according to the embodiment 2. As shown in FIG. 15, the reproducing apparatus has a structure similar to that of the reproducing apparatus shown in FIG. 7, but differs from the apparatus in FIG. 7 in that the apparatus in FIG. 15 includes a band-pass filter 244 for address demodulation connected to amplifier 241, a frequency-demodulation circuit 53 connected to address demodulation band-pass filter 244, a biphase-demodulation circuit 54 connected to frequency-modulation circuit 53, an address decoder 57 connected to biphase-demodulation circuit 54, PLL circuits 246 and 247 connected to a comparator 245, and a clock distributing circuit 56. PLL circuit 247 includes a divider 271, a phase comparator 272, a low-pass filter (LPF) 273 and a voltage-controlled oscillator (VCO) 274.

An operation of the reproducing apparatus will now be described below. Amplifier 241 receives signals (A+D) produced from reflected light detected on regions 113a and 113d of photodetector 113 and signals (B+C) produced from reflected light detected on regions 113b and 113c, and issues a signal [(A+D)−(B+C)] representing the difference between them to LPF 242, narrow-band-pass filter 256 and address demodulation band-pass filter 244.

Figure 16:
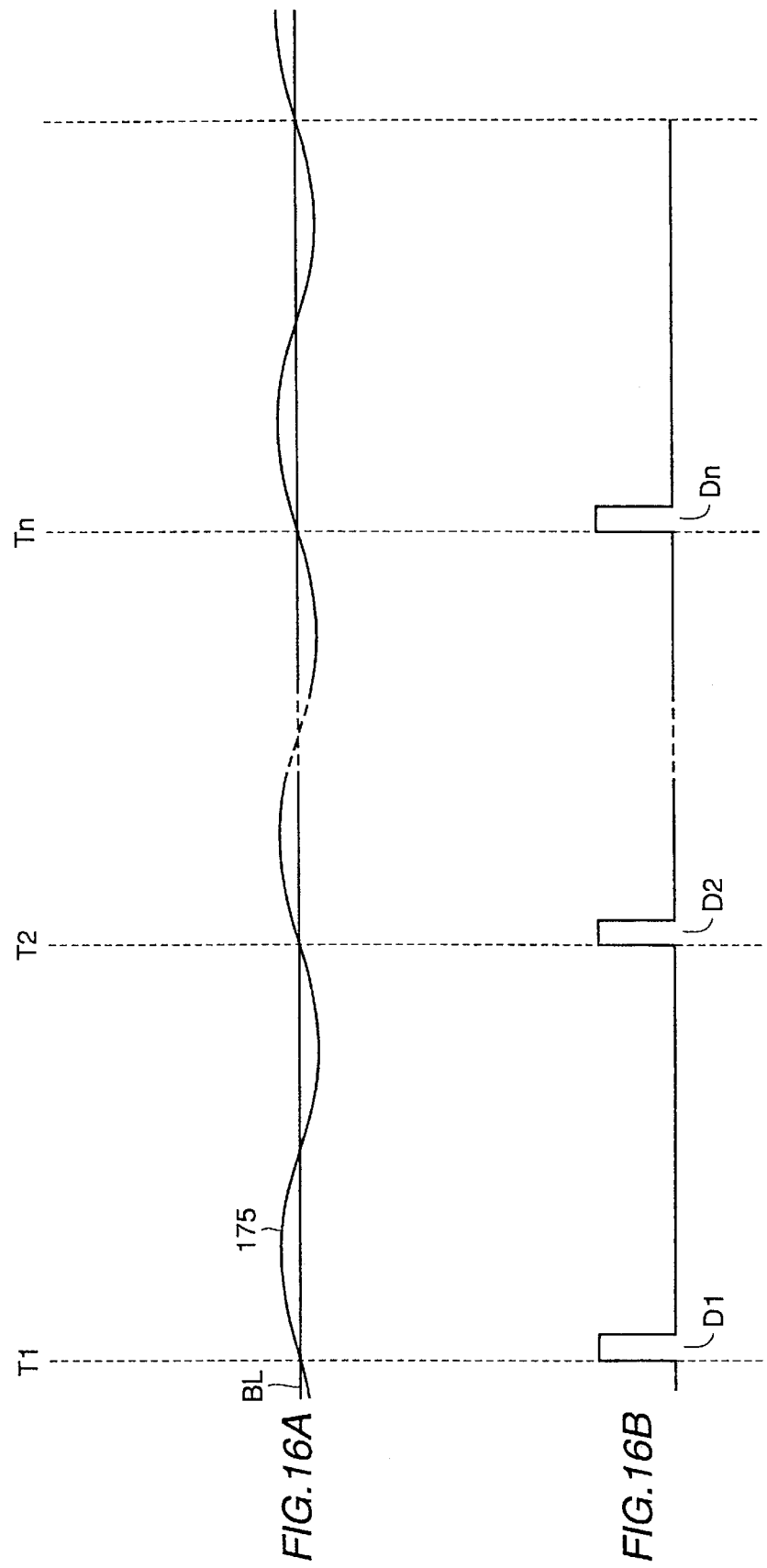
FIGS. 16A and 16B show synchronous signals produced by the reproducing apparatus shown in FIG. 15.

Narrow-band-pass filter 256 for wobble detection cuts off high and low frequency components in signal [(A+D)−(B+C)] supplied thereto, and a waveform 174 which is provided by clocking wobble 351 formed on the data portion and is shown in FIG. 16A is supplied to comparator 245. Comparator 245 converts received waveform 175 into a binary form, and supplies to PLL circuits 246 and 247 a binary signal determining points of time T1, T2 and Tn at which waveform 175 intersects upwardly a base axis BL. Each of PLL circuits 246 and 247 produces a synchronizing signals D1, D2 and Dn shown in FIG. 16B in response to the signal sent from comparator 245. The synchronizing signals D1, D2 and D3 produced by PLL circuit 246 is supplied to servo circuit 257 for rotation control of the disk, and is also supplied through clock distributing circuit 56 to frequency-demodulation circuit 53, biphase-demodulation circuit 54 and address decoder 57. The synchronizing signal produced by PLL circuit 247 is supplied as a data synchronizing signal to the signal demodulating circuit.

In the disk according to the embodiment of the invention, one cycle of clocking wobble 351 is in a range from 20 to 30 $\mu$m.

Figure 17:
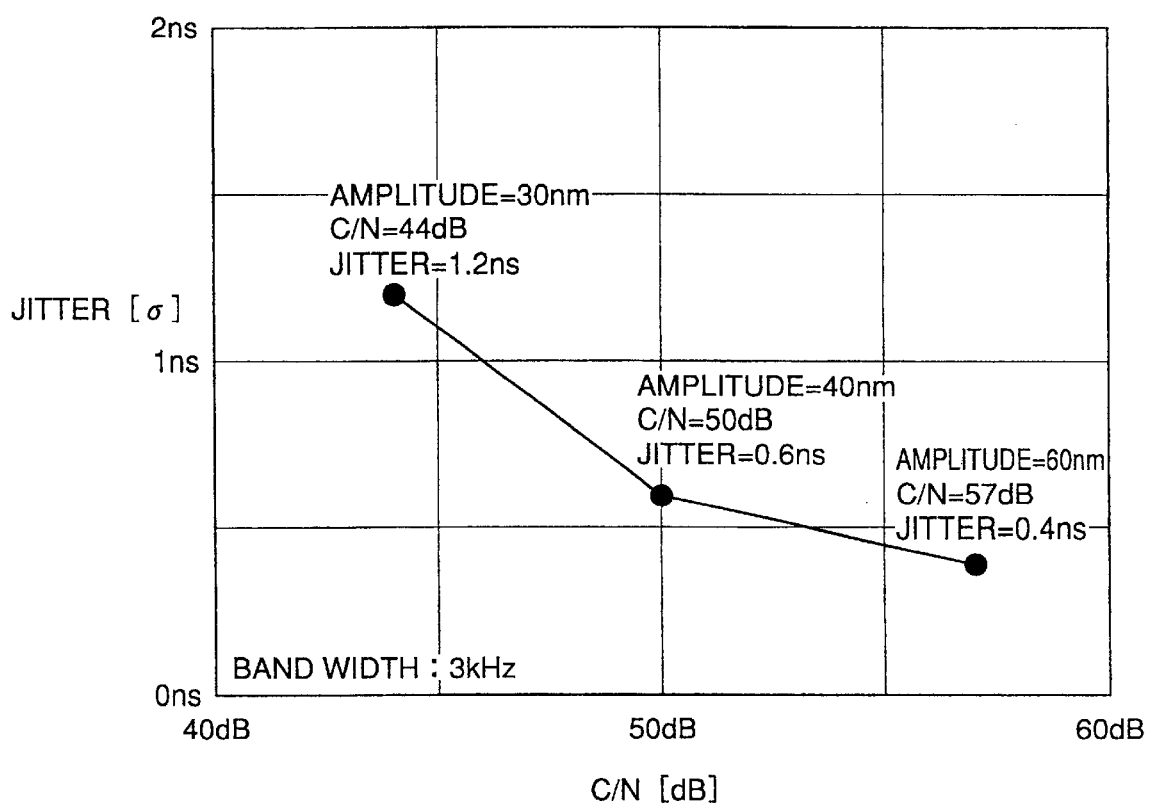
FIGS. 17, 18 and 19 are graphs showing reproduction characteristics of the reproducing apparatus shown in FIG. 15.

FIG. 17 is a graph showing changes in value of C/N ratio and jitter of the reproduced signal with respect to changes in amplitude in the case where one cycle of clocking wobble 351 is 20 $\mu$m. During data reproduction, the frequency (band width) which changes around the center defined by the frequency of clocking wobble 351 is 3 kHz. As the amplitude increases, the C/N ratio of the reproduced signal is improved and the jitter decreases, as shown in FIG. 17. Although this graph shows a relationship obtained with clocking wobble 351 of which one cycle is 20 $\mu$m, a similar relationship can be obtained when one cycle is 25 $\mu$m or 30 $\mu$m.

FIG. 17 shows that a larger amplitude of clocking wobble 351 can improve the data reproduction characteristics to a higher extent. In the case of magneto-optical record medium, however, the wobble signal leaks in the reproduced data to a higher extent and thereby adversely affects the data if the amplitude of clocking wobble 351 is large.

Figure 18:
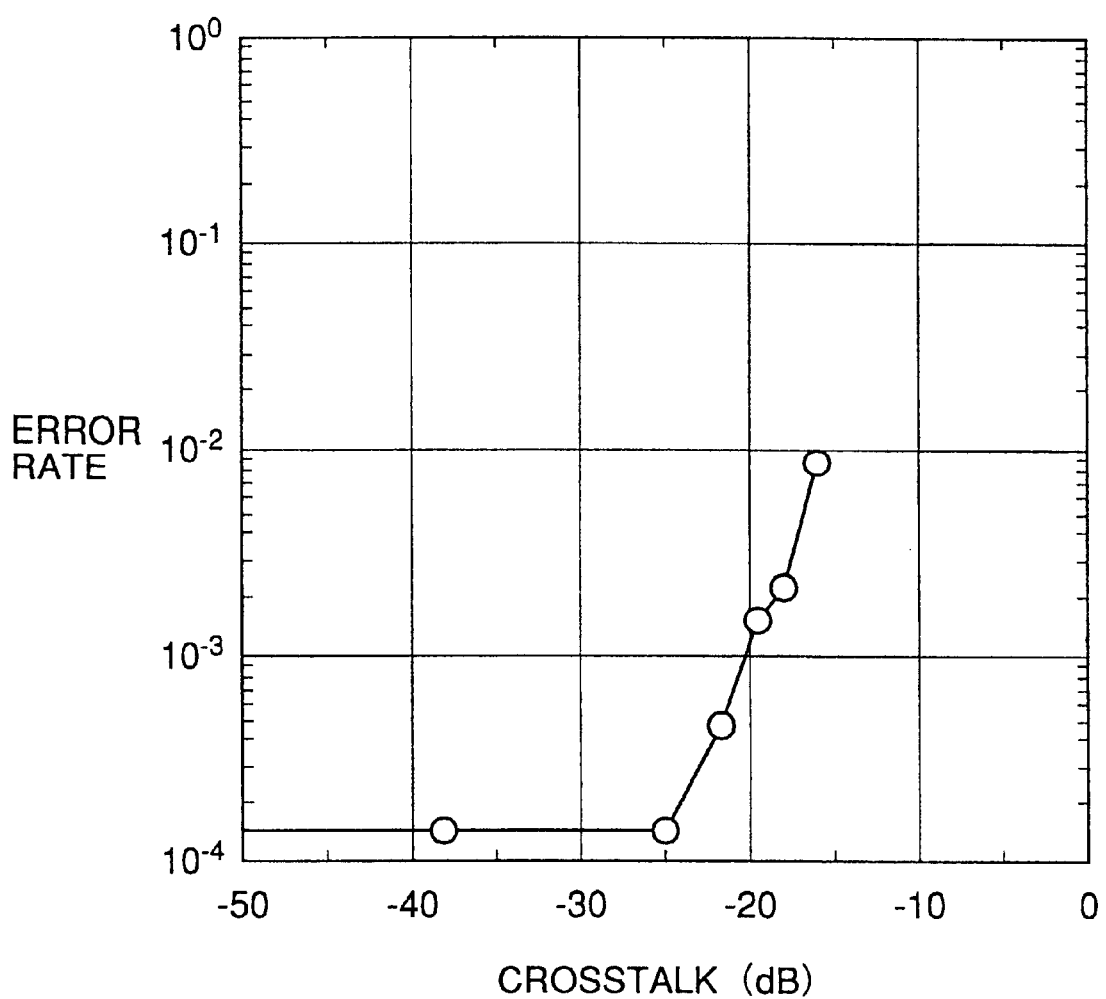

FIG. 18 is a graph showing a result obtained by measuring a relationship between the crosstalk between the wobble signals and the bit error rate of the reproduced data signal. The "crosstalk" represents a ratio in intensity of the signal reproduced from the reflected light coming from, e.g., groove 3 with respect to the signal which is reproduced for reading out data recorded on land 4.

From FIG. 18, it can be understood that the crosstalk must be −25 dB or less for obtaining good bit error rate characteristics.

Figure 19:
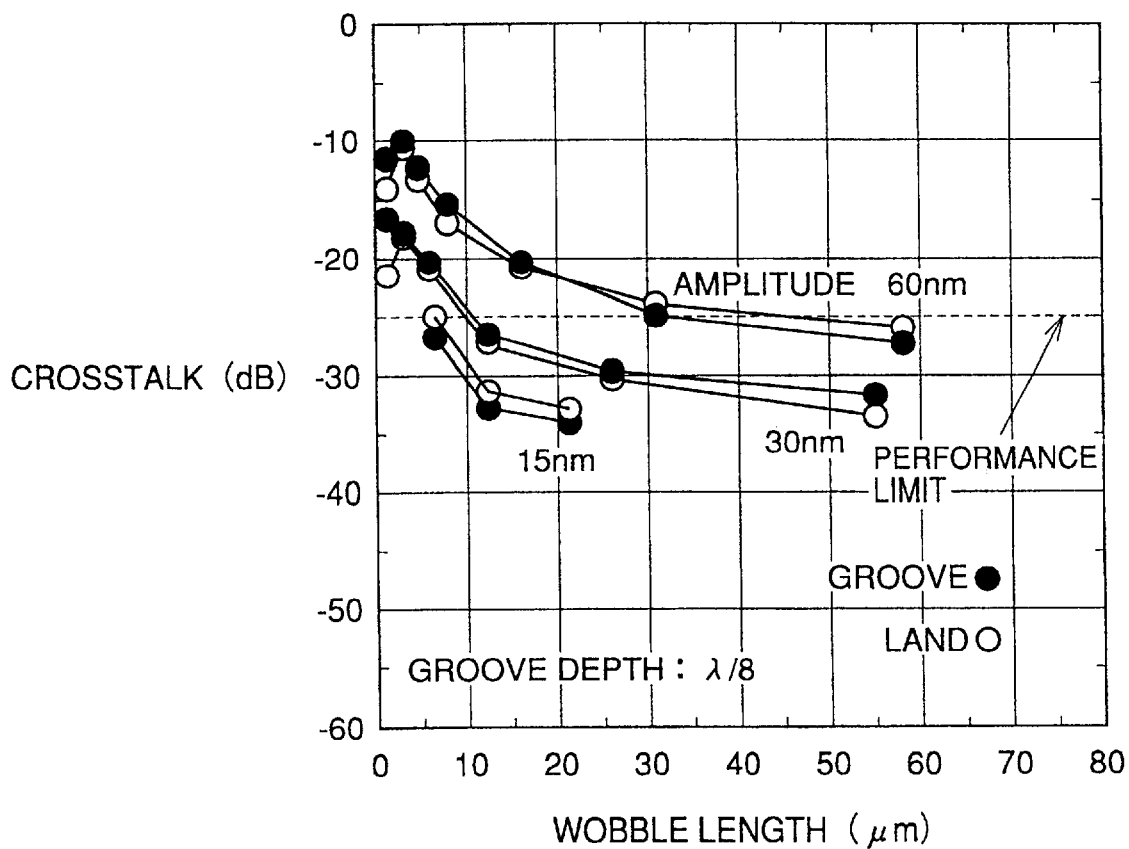

FIG. 19 is a graph showing changes in crosstalk with respect to changes in length of the amplitude and one cycle (wobble length) of clocking wobble 351. If the ratio in width between the groove and the land is approximately is 1:1 and the pitch of grooves is from 1.0 to 1.28 $\mu$m, the amplitude of clocking wobble 351 must be from 10 to 60 nm for precisely reproducing the data recorded on the disk, and particularly it is desired that the amplitude is from 10 to 40 nm if the bit density is from 0.15 to 0.24 $\mu$m/bit and the wobble length is from 10 to 32 $\mu$m.

In the phase-change disk or the recordable disk of a dye type or a metal type, it is desired that the wobble length is in a range from 5 to 50 $\mu$m, and the amplitude is in a range from 10 to 60 nm.

Clocking wobble 351 described above effectively functions as a reference for controlling rotation of the disk and producing the synchronizing signal for data record/reproduction. Also, clocking wobble 351 can be used as a data modulating method without a clock component. More specifically, when recording data, rotation of the disk is controlled such that synchronization may be maintained between the clock signal synchronized with the data and the clock signal reproduced from clocking wobble 351 on the disk. When reproducing data, the reproduced data can be read out in synchronization with the clock signal reproduced from clocking wobble 351 on the disk or an externally supplied clock signal.

According to the disk of the embodiment 2, even when beam spot 12 is controlled to follow the center of land 4, the push-pull signal obtained by irradiation with beam spot 12 can be obtained by reproducing the wobble signal corresponding to the waveforms which are formed on the opposite sidewalls of groove 3, as can be done when beam spot 12 is controlled to follow the center of groove 3. As a result, by emitting one laser beam, both the rotation control of the disk and the detection of address information can be performed on each of groove 3 and land 4.

The formation of clocking wobble 351 on the disk causes another problem in the data reproduction. More specifically, clocking wobble 351 affects the polarizing direction of the reflected light of the laser beam, which is emitted for data reproduction, so that magnetically recorded data cannot be reproduced precisely.

Figure 20:
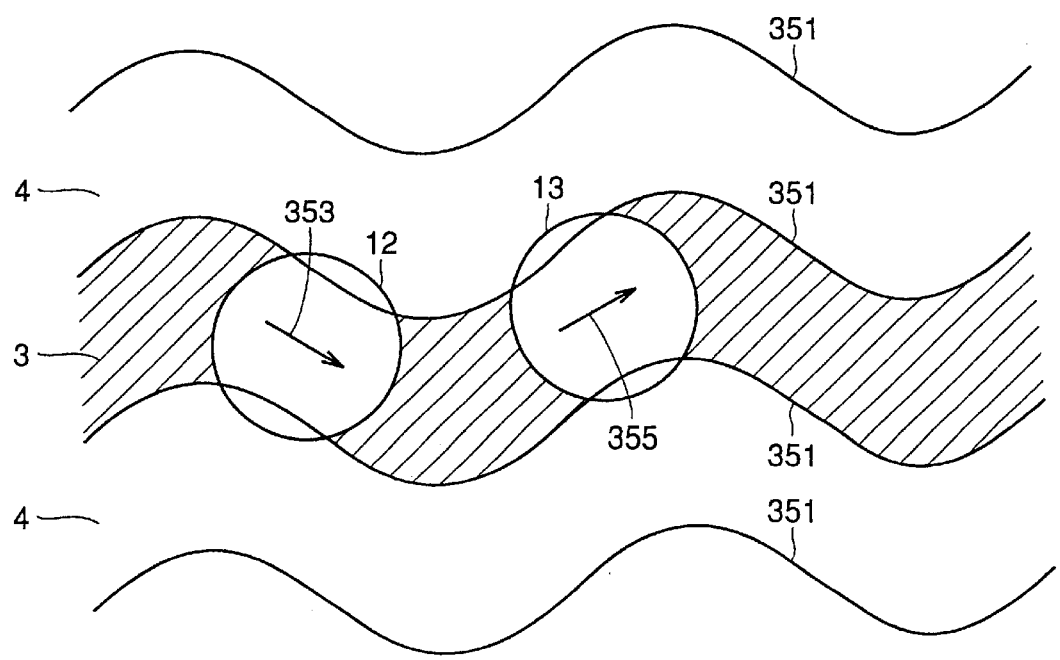
FIG. 20 shows data reproduction from a portion provided with clocking wobbles.

FIG. 20 shows data reproduction from a portion provided with clocking wobble 351. As shown in FIG. 20, clocking wobbles 351 formed on the opposite sidewalls of groove 3 have the same phase. Therefore, when beam spot 12 is located on groove 3, the reflected light does not contain a polarized wave to be originally produced by magnetization of data, but contains a polarized wave component in a direction indicated by an arrow 353, i.e., the direction of groove 3 determined by clocking wobbles 351 which are formed on the opposite sidewalls of groove 3, respectively. Similarly, the reflected light coming from beam spot 13 has a polarized wave component in a direction indicated by an arrow 355 representing the direction of groove 3 at the position of beam spot 13.

Therefore, the polarized wave component due to an influence of clocking wobbles 351 is superimposed on the reproduced signal of the originally recorded data due to the formation of clocking wobbles 351 on the disk as shown in FIG. 20. Accordingly, the data reproduction characteristics are impaired, and consequently the recorded data cannot be reproduced precisely.

This problem occurs also in such a case that clocking wobble 351 is formed only on one of the sidewalls of groove 3. A rate of the polarized wave component due to the influence by clocking wobble 351 to the data reproduction signal will be defined as a "leak-in quantity" hereinafter.

Figure 21:
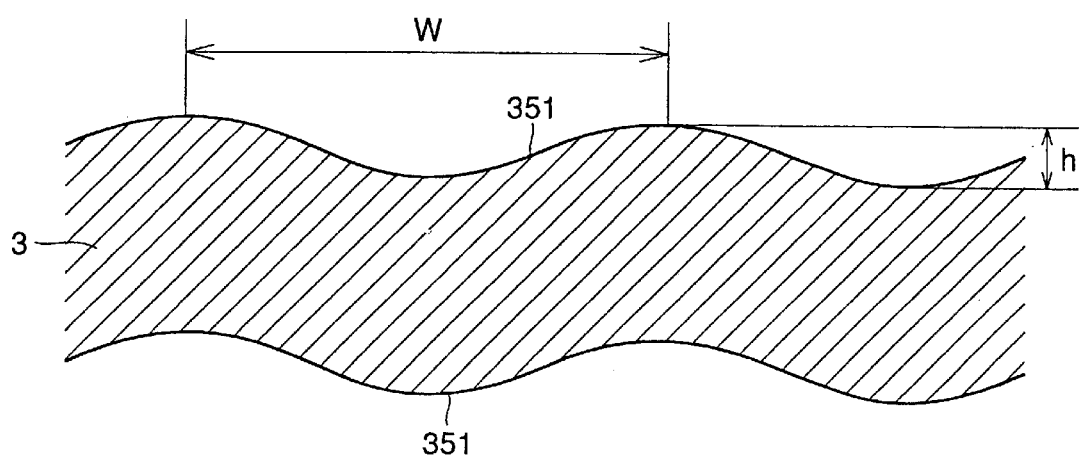
FIG. 21 is a plan showing a structure of clocking wobbles.

FIG. 21 is a plan showing a structure of clocking wobbles 351 formed on the opposite sidewalls of groove 3. As shown in FIG. 21, clocking wobbles 351 have the waveforms, which have the same phase, a wavelength W and an amplitude of h/2 (where "h" will be referred to also as a "wobble amplitude" hereinafter).

Wavelength W and amplitude h/2 of clocking wobble 351 are determined to provide the leak-in quantity not exceeding −25 dB and the bit error rate not exceeding $1 \times 10^{-4}$.

The following table 1 represents the leak-in quantity corresponding to wavelength W changed in a range from 0.5 to 10 μm and wobble amplitude h changed in a range from 3 to 50 nm.

TABLE 1

| Leak-In Quantity (dB) | | Wobble Length (μm) | | | | | | | |
|---|---|---|---|---|---|---|---|---|---|
| | | 0.5 | 0.8 | 1.2 | 1.6 | 1.88 | 2.08 | 3 | 5 | 10 |
| Wobble Amp. (nm) | 3 | −40 | −40 | −40 | −38 | −39 | −40 | −40 | −40 | −42 |
| | 5 | −40 | −40 | −39 | −37 | −35 | −35 | −40 | −40 | −41 |
| | 7 | −39 | −39 | −38 | −35 | −32 | −33 | −37 | −37 | −41 |
| | 10 | −39 | −38 | −35 | −30 | −30 | −30 | −32 | −33 | −35 |
| | 14 | −35 | −35 | −30 | −29 | −28 | −28 | −29 | −30 | −34 |
| | 20 | −30 | −28 | −26 | −26 | −25 | −26 | −28 | −27 | −34 |
| | 25 | −28 | −26 | −23 | −22 | −20 | −20 | −20 | −25 | −32 |
| | 35 | −18 | −20 | −20 | −13 | −10 | −15 | −16 | −20 | −26 |
| | 50 | | | | | | | | −15 | −20 |

As shown in Table 1, the leak-in quantity within surrounding line does not exceed −25 dB. Thus, the leak-in quantity does not exceed −25 dB within a range of wavelength W of 0.5–10 μm and wobble amplitude h of 3–20 nm, a range of wavelength W of 0.5–0.8 μm or 5–10 μm and wobble amplitude h of 25 nm and a range of wavelength W of 10 μm and wobble amplitude h of 35 nm.

The following Table 2 shows the bit error rate corresponding to wavelength W changed in a range from 0.5 to 10 μm and wobble amplitude h changed in a range from 3 to 50 nm. In this case, the dividing ratio of PLL circuit 246 is set to 1/3–1/64, and the synchronizing signal length is from 0.15–0.26 μm.

TABLE 2

| Error Rate | | Wobble Length (μm) | | | | | | | | |
|---|---|---|---|---|---|---|---|---|---|---|
| | | 0.5 | 0.8 | 1.2 | 1.6 | 1.88 | 2.08 | 3 | 5 | 10 |
| Wobble Amp. (nm) | 3 | 1.0e-3 | 2.5e-3 | 2.0e-3 | 1.7e-3 | 1.3e-3 | 2.1e-3 | 1.7e-3 | 2.1e-3 | 3.2e-2 |
| | 5 | 1.5e-3 | 5.5e-5 | 1.0e-5 | 6.3e-6 | 5.3e-6 | 4.7e-6 | 6.9e-6 | 8.5e-6 | 5.1e-5 |
| | 7 | 5.6e-4 | 7.5e-6 | 7.5e-6 | 5.6e-6 | 8.6e-6 | 5.6e-6 | 7.1e-6 | 8.6e-6 | 9.7e-6 |
| | 10 | 8.6e-4 | 5.6e-6 | 9.6e-6 | 5.5e-6 | 4.5e-6 | 5.0e-6 | 6.7e-6 | 7.5e-6 | 8.6e-6 |
| | 14 | 9.6e-4 | 6.7e-6 | 8.0e-6 | 5.4e-6 | 5.5e-6 | 6.3e-6 | 5.5e-6 | 6.3e-6 | 7.8e-6 |
| | 20 | 5.3e-4 | 2.0e-5 | 4.3e-5 | 6.0e-5 | 8.0e-5 | 7.0e-5 | 1.2e-5 | 1.3e-5 | 8.8e-6 |
| | 25 | 3.2e-4 | 8.5e-5 | 4.7e-4 | 5.3e-3 | 3.1e-4 | 3.7e-4 | 5.3e-4 | 9.7e-5 | 9.6e-6 |
| | 35 | 1.2e-3 | 3.5e-3 | 8.0e-3 | 1.0e-2 | 2.5e-2 | 8.6e-3 | 6.5e-3 | 6.7e-3 | 8.3e-5 |
| | 50 | | | | | | | | 3.2e-2 | 3.2e-3 |

As shown in FIG. 2, the bit error rate does not exceed $1 \times 10^{-4}$ within a surrounding line. More specifically, the bit error rate does not exceed $1 \times 10^{-4}$ within a range of wavelength W of 0.8–10 μm and wobble amplitude h of 5–20 nm, of wavelength W of 0.8 and wobble amplitude h of 25 nm, of wavelength of 5–10 μm and wobble amplitude h of 25 nm, and of wavelength W of 10 μm and wobble amplitude h of 35 nm.

It can be understood from Tables 1 and 2 that wobble amplitude h exceeding 25 nm increases the leak-in quantity and impairs the bit error rate, and wobble amplitude h lower than 5 nm deteriorates the characteristics of the synchronizing signal obtained from the reproduced signal, and therefore impairs the bit error rate. Accordingly, wavelength W is preferably in a range from 1.2 to 5.0 μm and more preferably in a range from 1.6 to 3.0 μm.

From Tables 1 and 2, the sizes of clocking wobble 351, which can achieve the leak-in quantity not exceeding −25 dB and the bit error rate not exceeding $1 \times 10^{-4}$, fall within a range of wavelength W of 0.8–10 μm and wobble amplitude h of 5–20 nm, a range of wavelength W of 0.8 and 5–10 μm and wobble amplitude h of 25 nm, or a range of wavelength W of 10 μm and wobble amplitude h of 35 nm. These values of wavelength W and wobble amplitude h can be also be applied to the case where clocking wobble 351 is formed on only one of the sidewalls of groove 3.

In mediums such as an ISO (International Standard Organization) 90 mm magneto-optical record medium, an address signal may be recorded in the form of pits on the disk. In such mediums, the pit length is extremely short so that miscounting of tracks may occurs, e.g., during fast access. According to the disk of the embodiment 2, however, not only the address information but also the information for producing the synchronizing signal of data are all recorded as wobbles without using a pit. Therefore, data reproduction can be reliably performed even during fast access and others.

In some kinds of conventional Mini-disks, wobbles are formed using signals prepared by effecting frequency modulation on signals produced by biphase modulation of address signals. In this case, however, the C/N ratio of the carrier signal lowers, and the band width increases due to the fact that the address signal is recorded using the frequency-modulated signal. Therefore, it is difficult to produce the synchronizing signals, which is used for data recording and reproducing, from the carrier signals.

Conversely, in the reproducing apparatus for reproducing data from the disk according to the embodiment 2, the band of band-pass filter 256 for obtaining the wobble signal is required only to be the band required for input to PLL circuits 246 and 247 so that band-pass filter 256 can be of a narrow-band type. Accordingly, the actual signal-to-noise ratio is good even if clocking wobble 351 has a small amplitude and the C/N ratio is somewhat bad. Therefore, signals containing less jitter can be supplied to PLL circuits 246 and 247, and the synchronizing signal for recording and reproducing data can be produced precisely. Since the address information and the data are recorded in different locations on the disk, respectively, it is possible to avoid an adverse effect which the address information may exert on the reproduced data and the access performance.

Embodiment 3

Figure 22:
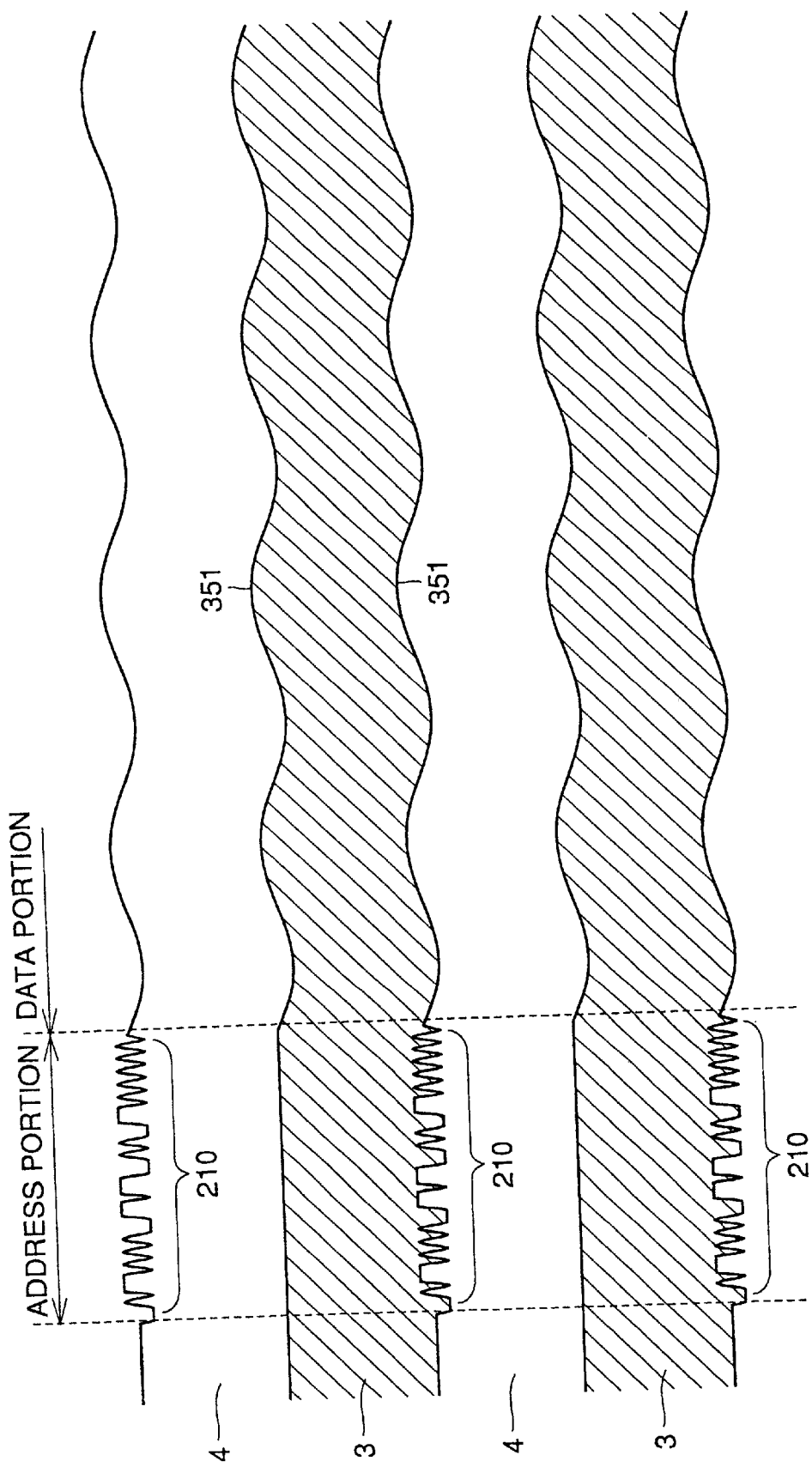
FIG. 22 is a plan showing a structure of a disk according o an embodiment 3 of the invention.

FIG. 22 shows a planar structure of a disk according to an embodiment 3. As shown in FIG. 22, this disk includes wobbles 210 which are formed in address portions for lands 4 and groove 3, and also includes clocking wobbles 351 formed on the opposite sidewalls of grooves 3 in the data portion neighboring to the address portion. In this structure, wobble 210 is prepared by modulation with a single item of address information, has a wavelength shorter than that of clocking wobble 351, and is formed on only one of the sidewalls of groove 3.

Wobble 210 serves as both the address for land 4 and the address for groove 3.

In the address portion, clocking wobble 351 is formed on neither of the sidewalls of groove 3.

For the disk described above, the reproducing apparatus shown in FIG. 15 is used for reproduction. During reproduction, information is reproduced from wobbles 210 with a laser beam and thereby the address of land 4 or groove 3 is detected. Thereafter, information on clocking wobbles 351 in the data portion as well as data are reproduced with the laser beam, and the synchronizing signal of data is produced from the detected wobble waveforms.

FIGS. 23A–23D show a format of the disk according to this embodiment. As shown in FIGS. 23A–23D, this format is similar to that shown in FIGS. 13A–13D, but differs therefrom in that one frame has a length of 2688 bytes, and includes the address portion having a length of 64 bytes and the data portion having a length of 2624 bytes.

Data is recorded and reproduced in the form of magneto-optical signals, of which data portions are subjected to the NRZI modulation or (1–7) modulation. If the recorded data has a bit density of 0.22 μm/bit, one frame has a length of 4.73088 mm. If the bit density is 0.20 μm/bit, one frame has a length of 4.3008 mm. Therefore, if the disk has the size of 12 cm equal to that of the compact disk (CD), the frame number Nf per track is from about 30 to about 87.

Figure 23:
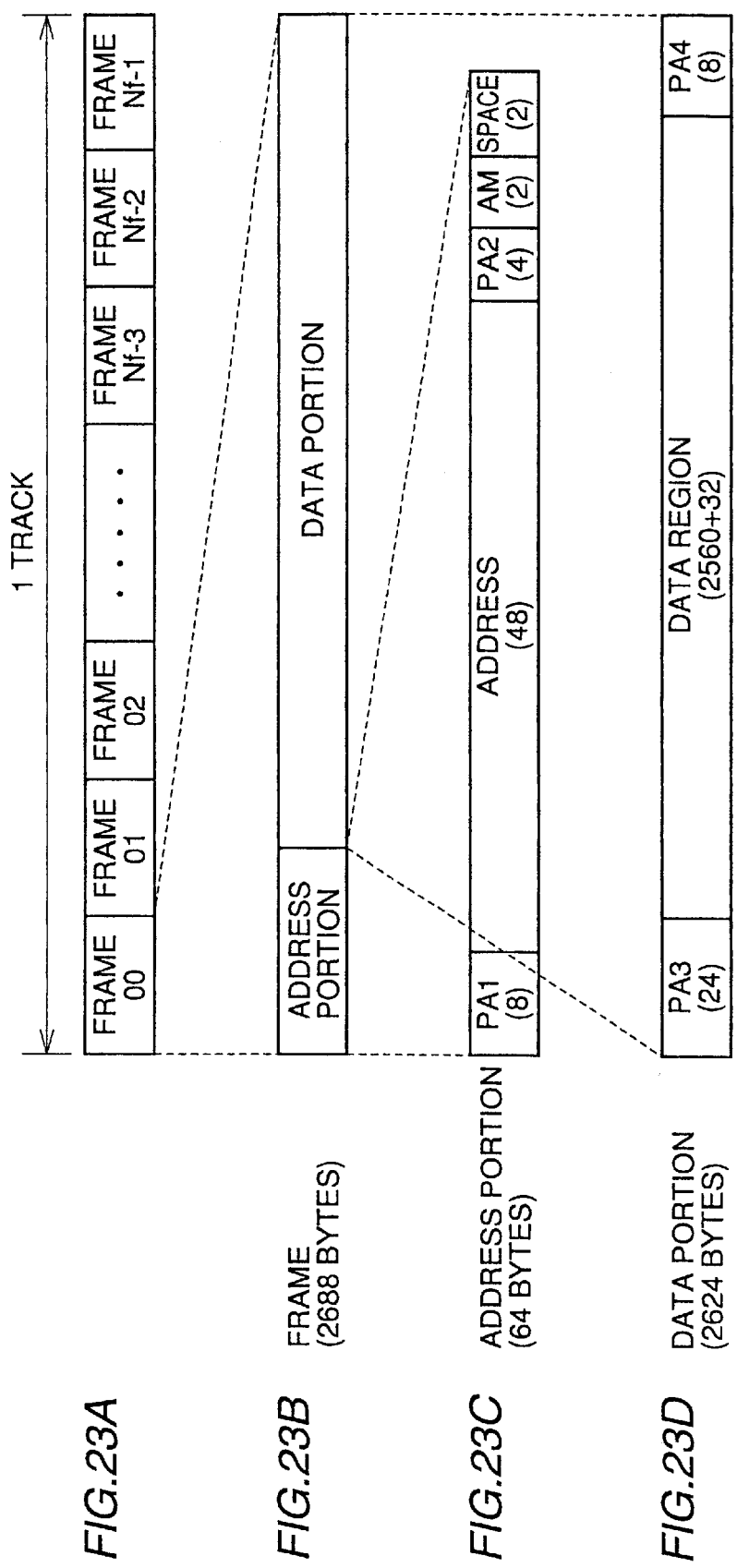
FIGS. 23A–23D show a format of the disk according to the embodiment 3.

Assuming that the address portion has a length of 64 bytes as shown in FIG. 23C, and that minimum one wobble cycle of the address portion is 1 byte, the length of one wobble cycle on the disk is in a range from 1.60 to 1.76 μm. In the address portion, PA1 has a length of 8 bytes on the disk, the address has a length of 48 bytes, the address mark (AM) has a length of 2 bytes, PA2 has a length of 4 bytes, and the space has a length of 2 bytes. In this case, PA1 has an actual data length of 8 bits, and PA2 has an actual data length of 4 bits. Also, the address, the address mark and the space have actual data lengths 48 bits, 2 bits and 2 bits.

As shown in FIG. 23D, the data portion has a length of 2624 bytes, and includes a PA3 of 24 bytes in length, a data region of 2592 bytes in length and a PA4 of 8 bytes in length.

In the above structure, 2592 bytes of the data region includes 2048 bytes forming a region allowing recording by a user, 32 bytes serving as data for suppressing a DC component of the recorded signal, data for error correction and others. If a length of 16 bytes is given to one cycle of clocking wobbles used for producing the synchronizing signal for data recording and reproducing, one wobble on the disk has a length of 28.16 μm if the bit density is 0.22 μm/bit, and has a length of 25.6 μm if the bit density is 0.20 μm/bit. As a result, 164 wobbles are present in the data portion of one frame. Therefore, the frequency of wobble is 252 kHz if 60 frames are present in one track and the disk rotates at 1500 rpm. By using this frequency of wobble, the PLL circuit produces a data synchronizing signal for recording and reproducing data. If NRZI modulation is used for data modulation, the data synchronizing signal is set to 32.256 MHz, and the dividing ratio in the PLL circuit is set to 1/128. The length of one wobble is not restricted to 16 bytes, and may be set, e.g., to 4, 8 or 20 bytes. In this case, the frequency of wobble is different from the foregoing value of 252 kHz, and the dividing ratio set in the PLL circuit also differs from the foregoing value. In the disk according to this embodiment, the cycle length of the clocking wobble is set within a range from 5–50 μm.

The amplitude of the clocking wobble is preferably large in view of the signal-to-noise ratio of the reproduced wobble signal. However, in the case of the magneto-optical medium, the wobble signal leaks into the reproduced data as shown in FIGS. 18 and 19, resulting in an adverse effect. If the ratio in width between the groove and the land is approximately 1:1 and the pitch of grooves is 1.0–1.28 μm, the amplitude of clock wobble is set to 10–60 nm for precise data reproduction. Particularly, if the bit density is 0.15–0.24 μm/bit, and the one wobble length is 10–32 μm, the amplitude of wobble is set to 10–40 nm.

Meanwhile, in a phase-change disk or a recordable optical disk of a dye type or a metal type, it is desired that the one wobble length is 5–50 μm, and the amplitude is in a range from 10 to 60 nm.

Figure 24:
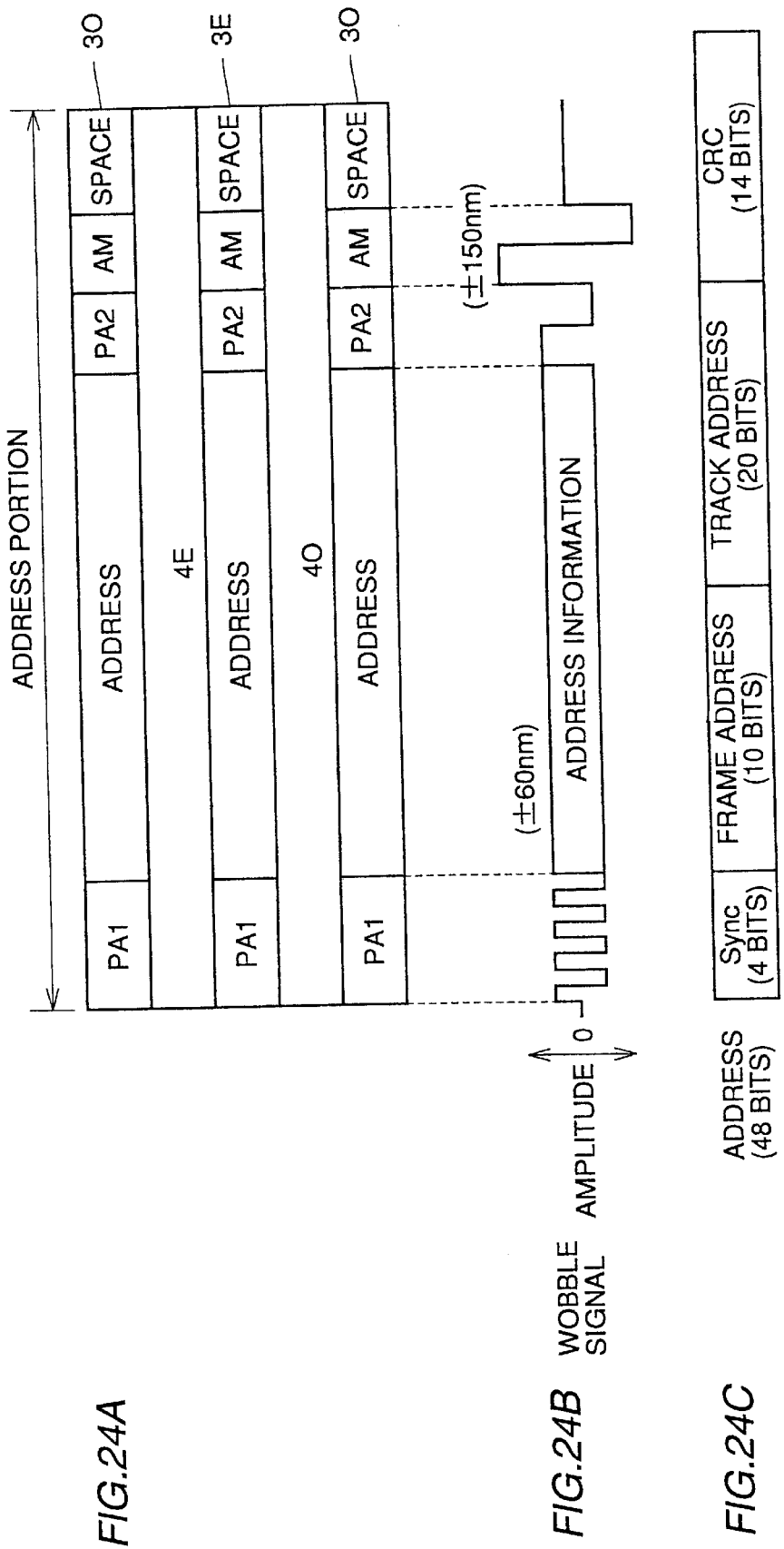
FIG. 24A shows a layout of an address portion on the disk shown in FIG. 23C.
FIG. 24B shows a wobble signal reproduced from the address portion.
FIG. 24C shows contents of the address.

FIG. 24A shows a layout of the address portion of the disk according to the embodiment, FIG. 24B shows a wobble signal obtained from the address portion, and FIG. 24C shows contents of the address. As shown in FIG. 24C, the address is information consisting of 48 bits, and includes a frame address indicating the order in one track, a track address indicating the order or position in the entire disk counted from the radially outermost or innermost track.

Since the frame address is information of 10 bits, one track can contain up to 1024 frames from the viewpoint of the format. Since the track address is information of 20 bits, the whole disk can contain up to 1048576 tracks from the viewpoint of the format.

The coding method of the address information uses biphase coding, Manchester coding, NRZ coding or NRZI coding.

Since only one of the opposite sidewalls of each of grooves 3O and 3E is wobbled with one item of address information, the one item of address information is commonly used for data reproduction from neighboring two tracks, e.g., on groove 3E and land 4E.

PA1 and PA2 are used as the preamble and postamble for accurately detecting the address and address mark (AM).

Amplitudes of the wobbles formed for recording signals of them are substantially equal to each other. If the ratio in width between groove 3O or 3E and land 4E or 4O is 1:1, and the pitch of grooves 3O and 3E is from 1.0 to 1.28, the amplitude of wobble must be from 15 to 150 nm. In particular, it is desirably from 25 to 90 nm for ensuring an intended signal-to-noise ratio of the wobble signal and for accurately detecting the address mark.

The address mark (AM) is used for determining whether the reproduced address corresponds to the data recorded on land 4E (or 4O) or data recorded or groove 3O (or 3E), and is also used for indicating start of the data recording/reproducing. For reliable determination, the amplitude of wobble must be from 30 to 200 nm if the ratio in width between groove 3O or 3E and land 4E or 4O is approximately 1:1, and the pitch of grooves 3O and 3E is from 1.0 to 1.28 μm. It is particularly preferable that the amplitude is in a range from 60 to 150 nm.

One wobble cycle of 1.2 μm or more can improve the bit error rate and margin of the address portion, and therefore can achieve precise reproduction. If this cycle is long, the format efficiency of data lowers. Therefore, the cycle length must be in a range from 1.2 to 5 μm. This is not restricted to the magneto-optical medium, but is true also with respect to phase-change disks and recordable optical disks of a dye type and a metal type.

According to the disk of the embodiment 3, as described above, only one of the sidewalls of each of grooves 3O and 3E is wobbled in accordance with one item of address information. Therefore, the efficiency of the format can be further improved.

Embodiment 4

Figure 25:
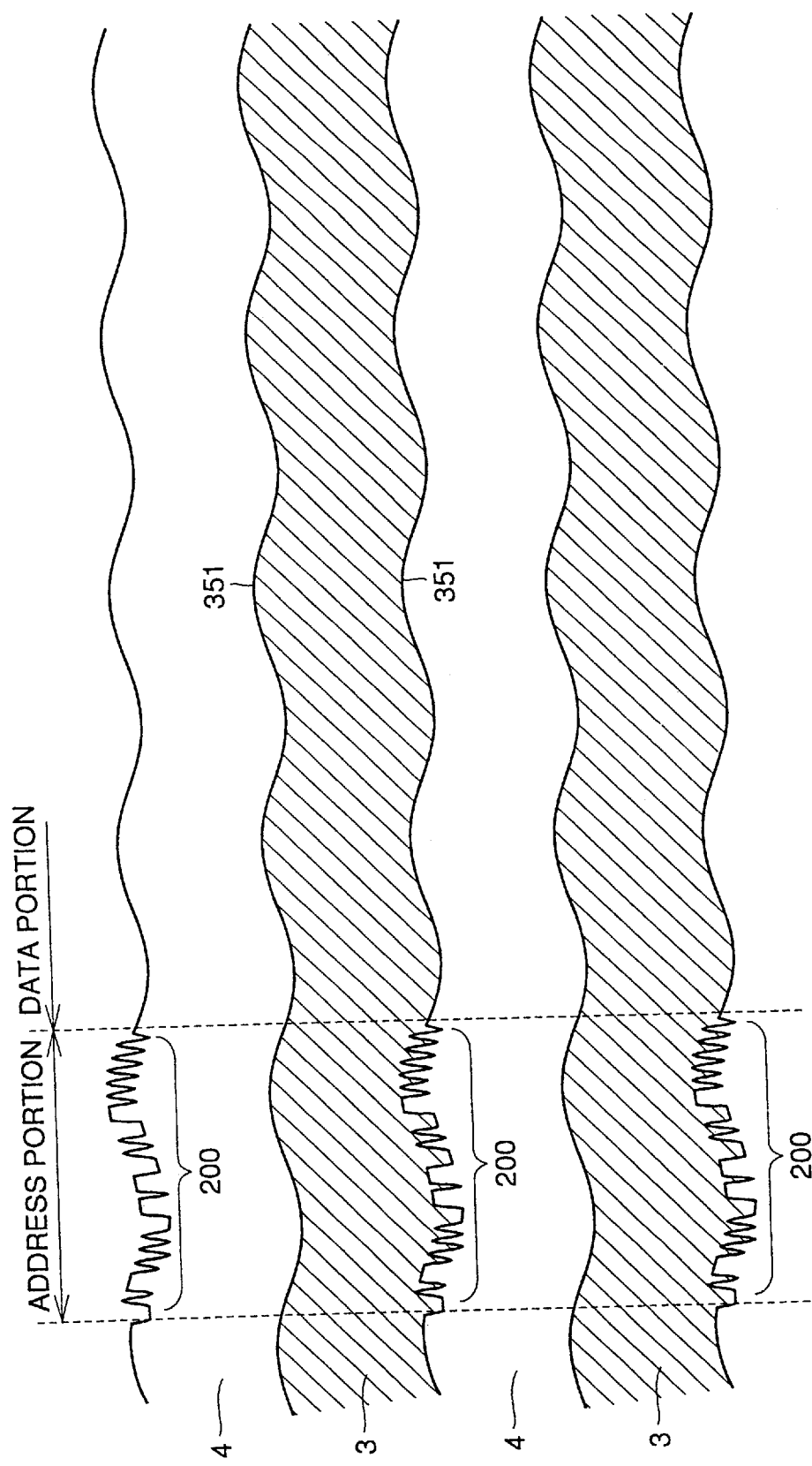
FIG. 25 is a plan showing a structure of a disk according to an embodiment 4 of the invention.

FIG. 25 shows a planar structure of a disk according to an embodiment 5. In the address portion of the disk shown in FIG. 25, one of the opposite sidewalls of groove 3 is wobbled such that a wobble 200 modulated with one item of address information is superimposed onto clocking wobble 351.

In this disk, information is reproduced from wobble 200 with a laser beam, and the detected address is used as addresses for land 4 and groove 3 on the opposite sides of wobble 200. In this disk, the synchronizing signal of the data to be reproduced is produced from clocking wobble 351 formed on the data portion by the reproducing apparatus of the embodiment 2 shown in FIG. 15.

Embodiment 5

Figure 26:
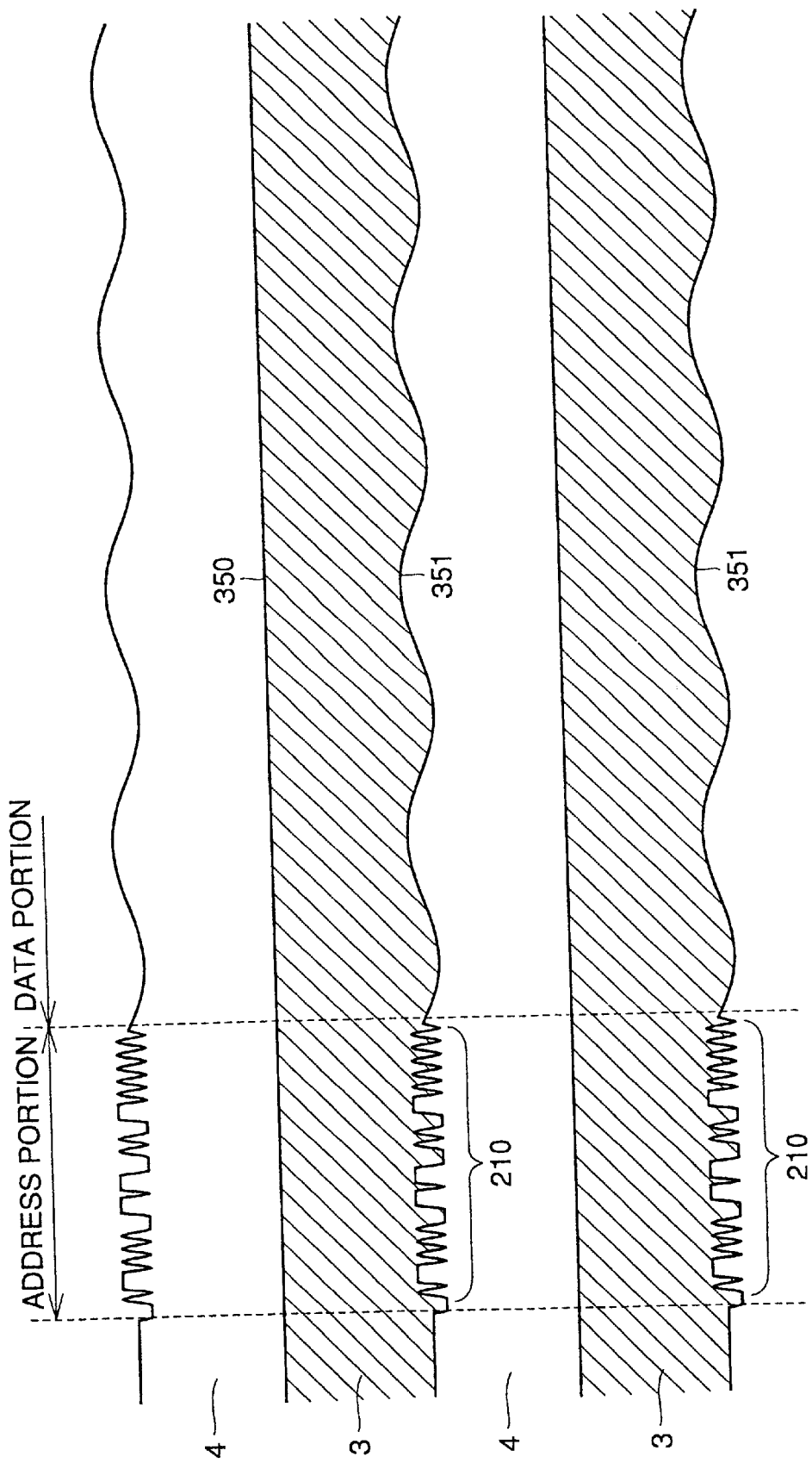
FIG. 26 is a plan showing a structure of a disk according to an embodiment 5 of the invention.

FIG. 26 shows a planar structure of a disk according to an embodiment 5 of the invention. As shown in FIG. 26, the disk is provided with grooves 3 each having such a structure that clocking wobble 351 in the data portion is formed only on one of the sidewalls and, in the address portion, wobble 210 continuing to clocking wobble 351 is formed based on only one item of address information. The other sidewall 350 of groove 3 is wobbled in neither the address portion nor the data portion.

The data reproduction from the above disk is likewise performed by the reproducing apparatus shown in FIG. 15, and the data synchronizing signal is produced from clocking wobble 351 formed on the data portion.

Embodiment 6

Figure 27:
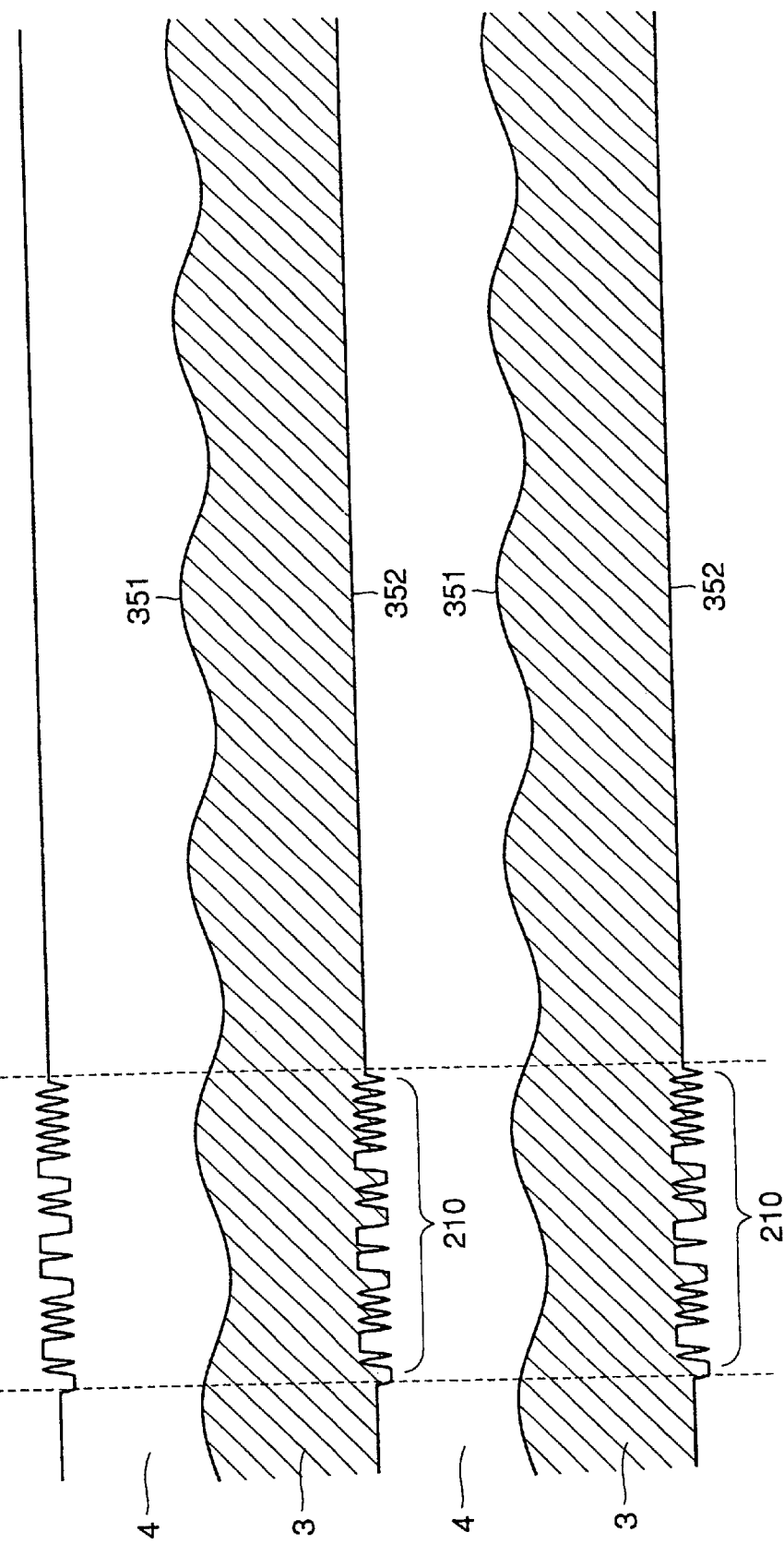
FIG. 27 is a plan showing a structure of a disk according to an embodiment 6 of the invention.

FIG. 27 shows a planar structure of a disk according to an embodiment 6 of the invention. As shown in FIG. 27, the disk is provided with grooves 3 each having such a structure that clocking wobble 351 is formed on one of the sidewalls in both the address portion and the data portion, and wobble 210 based on one item of address information is formed on the other sidewall in only the address portion.

Accordingly, the sidewall which is provided with wobble 210 based on the address information is not provided with a wobble in the data portion.

The data reproduction from the above disk is likewise performed by the reproducing apparatus shown in FIG. 15, and the data synchronizing signal is produced from clocking wobble 351 formed on the data portion.

Embodiment 7

Figure 28:
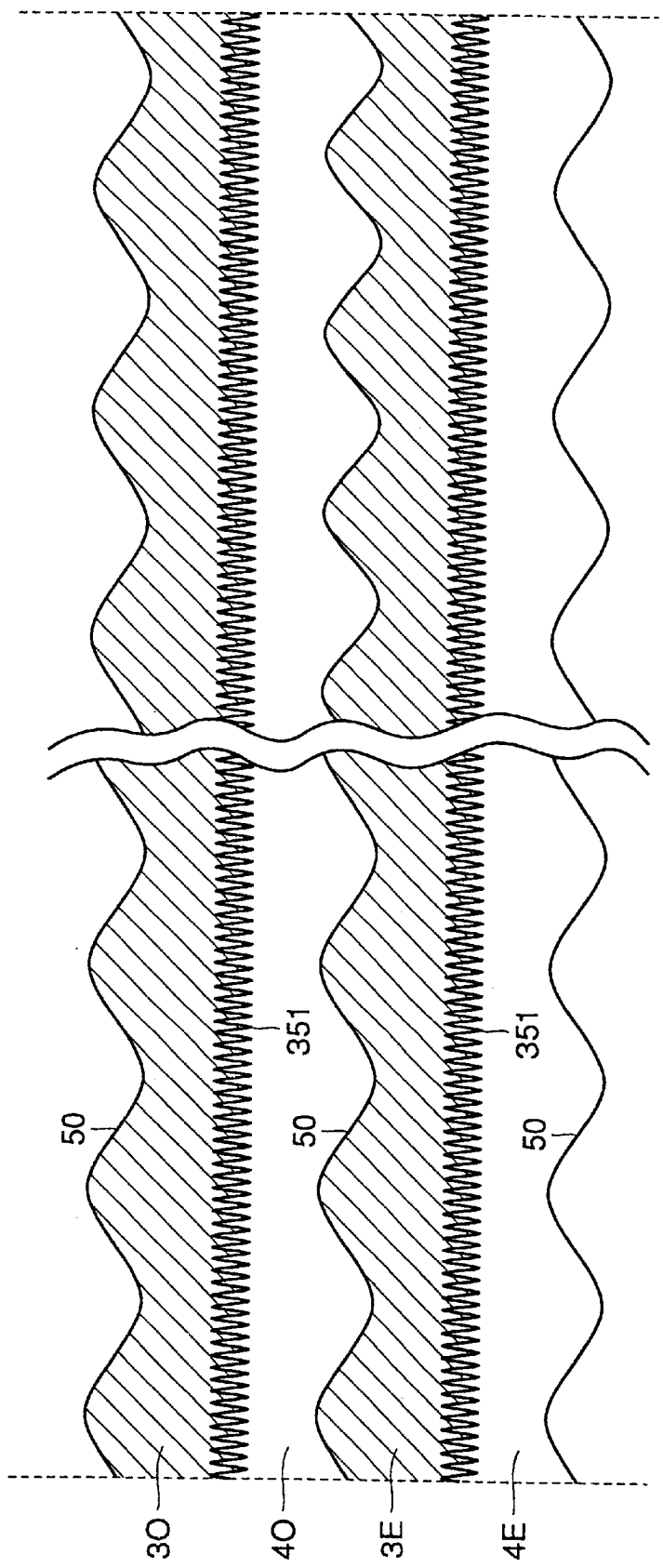
FIG. 28 is a plan showing a structure of a disk according to an embodiment 7 of the invention.

FIG. 28 shows a planar structure of a disk according to an embodiment 7 of the invention. As shown in FIG. 28, the disk includes grooves 3O and 3E each having such a structure that one of the sidewalls is provided with a wobble 50 formed by frequency modulation of address information, and the other sidewall is provided with clocking wobble 351.

Assuming that the data reproduction rate is 24 MHz, clocking wobble 351 has a frequency of 3 MHz, and wobble 50 has a frequency from 281.25 to 375 kHz.

In the disk according to the embodiment, wobble 50 and clocking wobble 351 are formed on the opposite sidewalls of each of grooves 3O and 3E over the entire region.

FIGS. 29A–29D show a format of the disk according to the embodiment. As shown in FIG. 29B, the address information in one sector includes a synchronizing pattern (Sync) of 4 bits, a frame address of 24 bits, a reserve region (Rvd) of 4 bits and an error correction code (ECC) of 12 bits. Since one sector includes a data region of 2 kB in length, the above address information of 44 bits represents the address for the data of 2 kB.

Clocking wobbles 351 are formed at a rate of one in number per one byte of data, and therefore are 2816 in number per one sector as shown in FIGS. 29C and 29D. Clocking wobble 351 is used as a reference for producing the data synchronizing signal which is utilized for recording and reproducing data.

Figures 30A, 30B, 30C:
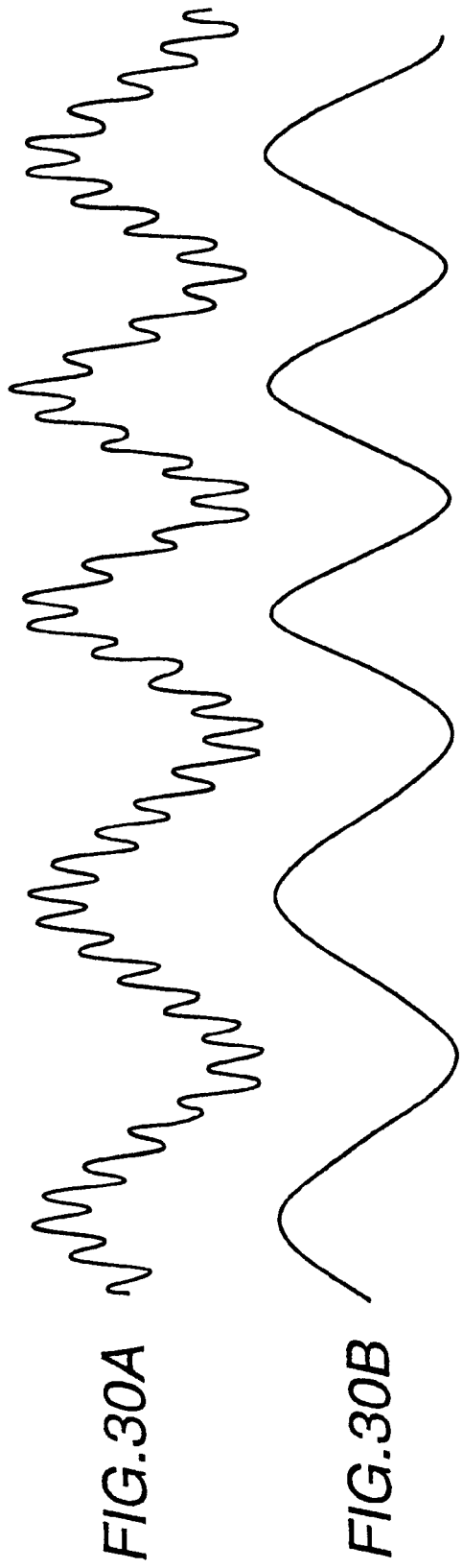
FIGS. 30A–30C are waveform diagrams showing reproduction from the disk according to the embodiment 7.

Description will now be given on reproduction of data from the disk according to this embodiment with reference to FIGS. 30A–30C. Data is reproduced from this disk by the reproducing apparatus shown in FIG. 15. In the case where groove 3O shown in FIG. 28 is scanned with a laser beam, a push-pull signal having a waveform shown in FIG. 30A is obtained. Since wobble 50 is formed on one sidewall of groove 3O and clocking wobble 351 is formed on the other sidewall, signals obtained from both the wobbles are superimposed on each other so that the waveform shown in FIG. 30A is obtained.

When land 4O shown in FIG. 28 is scanned with a laser beam, the push-pull signal shown in FIG. 30A is likewise obtained. This is true with respect to the cases where groove 3E and land 4E are scanned with a laser beam.

The signal shown in FIG. 30A is supplied to narrow-band-pass filter 256 for wobble detection shown in FIG. 15 and band-pass filter 244 for address demodulation. Narrow-band-pass filter 256 for wobble detection extracts only a high frequency component corresponding to clocking wobble 351 from the received push-pull signal, and supplies a signal shown in FIG. 30C to comparator 245. Comparator 245 converts the supplied signal into a binary form, and supplies the binary signal thus converted to PLL circuits 246 and 247.

PLL circuit 246 produces a clock signal in accordance with rising timing of the received binary signal, and supplies the clock signal to servo circuit 257 controlling rotation of the disk and clock distributing circuit 56.

PLL circuit 247 issues a data synchronizing signal to the signal decoding circuit in response to the received binary signal.

Band-pass filter 244 for address demodulation extracts only a low frequency component from the received push-pull signal, and supplies the signal corresponding to wobble 50 and shown in FIG. 30B to frequency-modulation circuit 53. Frequency-modulation circuit 53 performs frequency modulation of the received signal shown in FIG. 30B in synchronization with the clock signal supplied from clock distributing circuit 56, and supplies the frequency-modulated signal to biphase-demodulation circuit 54. Biphase-demodulation circuit 54 biphase-demodulates the signal supplied thereto in synchronization with the clock signal supplied from clock distributing circuit 56. Address decoder 57 issues the address to system controller 268 in synchronization with the clock signal supplied from clock distributing circuit 56.

According to the disk of the embodiment described above, the data synchronizing signal can be precisely produced from clocking wobble 351 which is formed on one of the sidewalls of each of grooves 3O and 3E, and it is possible to produce the data reproduction signal with less leak-in due to the wobbles.

Embodiment 8

An actual disk has generally warped to a small or some extent. When reproducing data from such a warped disk, a laser beam emitted from a semiconductor laser and reflected on a data record surface is focused on a slightly shifted position in a photodetector 113. This results in an offset in the data reproduction signal. This embodiment will now be discussed with respect to a reproducing apparatus which can correct such an offset. This offset is caused by the fact that the laser beam is not emitted to the center of land 4 or groove 3.

As already described and shown in FIGS. 2C and 2D, fine clock mark 20 is recorded on a leading position of each of the address segment and data segment. By detecting fine clock mark 20, the offset of the data reproduction signal is corrected. Although fine clock mark 20 shown in FIG. 2D is recorded on the leading position in segment, it may be recorded within the data region.

Figure 31:
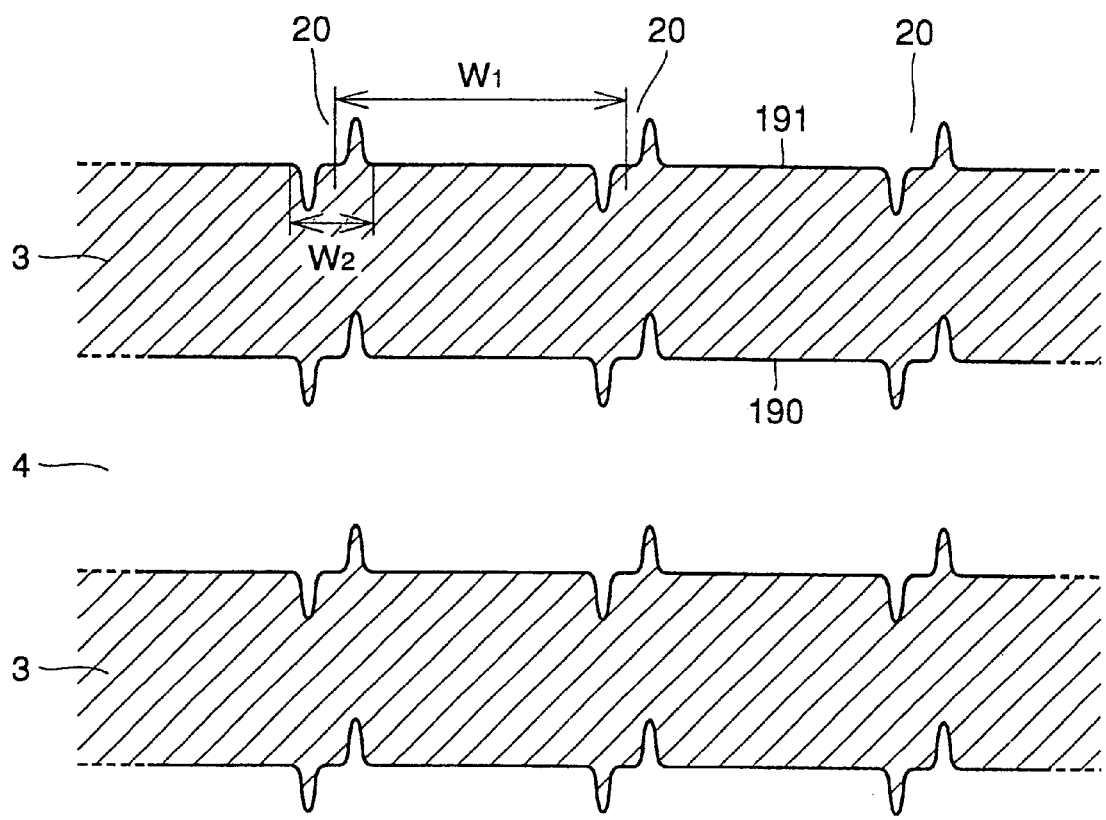
FIG. 31 is a plan showing a structure of a disk according to an embodiment 8 of the invention.

FIG. 31 shows a planar structure of the disk according to this embodiment, in which the data portion magnetically storing data is provided with grooves 3, and fine clock marks 20 spaced by a predetermined distance $W_1$ from each other are formed on each of the opposite sidewalls of each groove 3. Predetermined distance $W_1$ shown in FIG. 31 is in a range from 50 to 300 $\mu$m, and a length $W_2$ of the region bearing fine clock mark 20 satisfies a relationship of $1/300 < W_2/W_1 < 1/50$.

Fine clock mark 20 is formed in the step of forming a master of the disk.

Figure 32A:
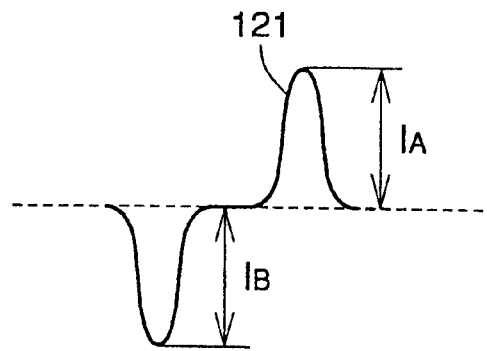
FIGS. 32A–32C show a principle of offset correction performed by detecting a fine clock mark.
Figure 32B:
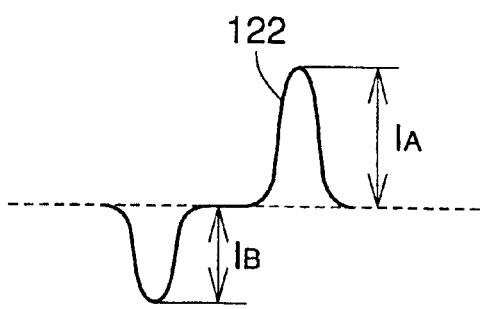
Figure 32C:
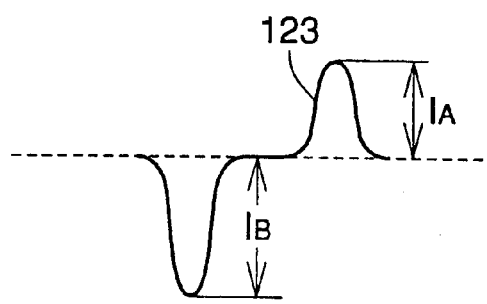

FIGS. 32A–32C show a principle of offset correction performed by detecting fine clock mark 20.

Fine clock mark 20 is detected when a laser beam is applied to land 4 or groove 3. When laser beam is applied to the center of land 4 or groove 3, a detection waveform 121 having equal amplitudes (intensities) $I_A$ and $I_B$ is obtained as shown in FIG. 32A. However, when the laser beam is applied to a position shifted from the center of land 4 or groove 3, a detection waveform 122 of $I_A > I_B$ or a detection waveform 123 of $I_A < I_B$ is produced as shown in FIG. 32B or 32C. Accordingly, by obtaining a difference between detected intensities $I_A$ and $I_B$, it is possible to detect a shift of the spot of the emitted laser beam from the center of land 4 or groove 3, i.e., the offset occurring in the data reproduction signal.

Figure 33:
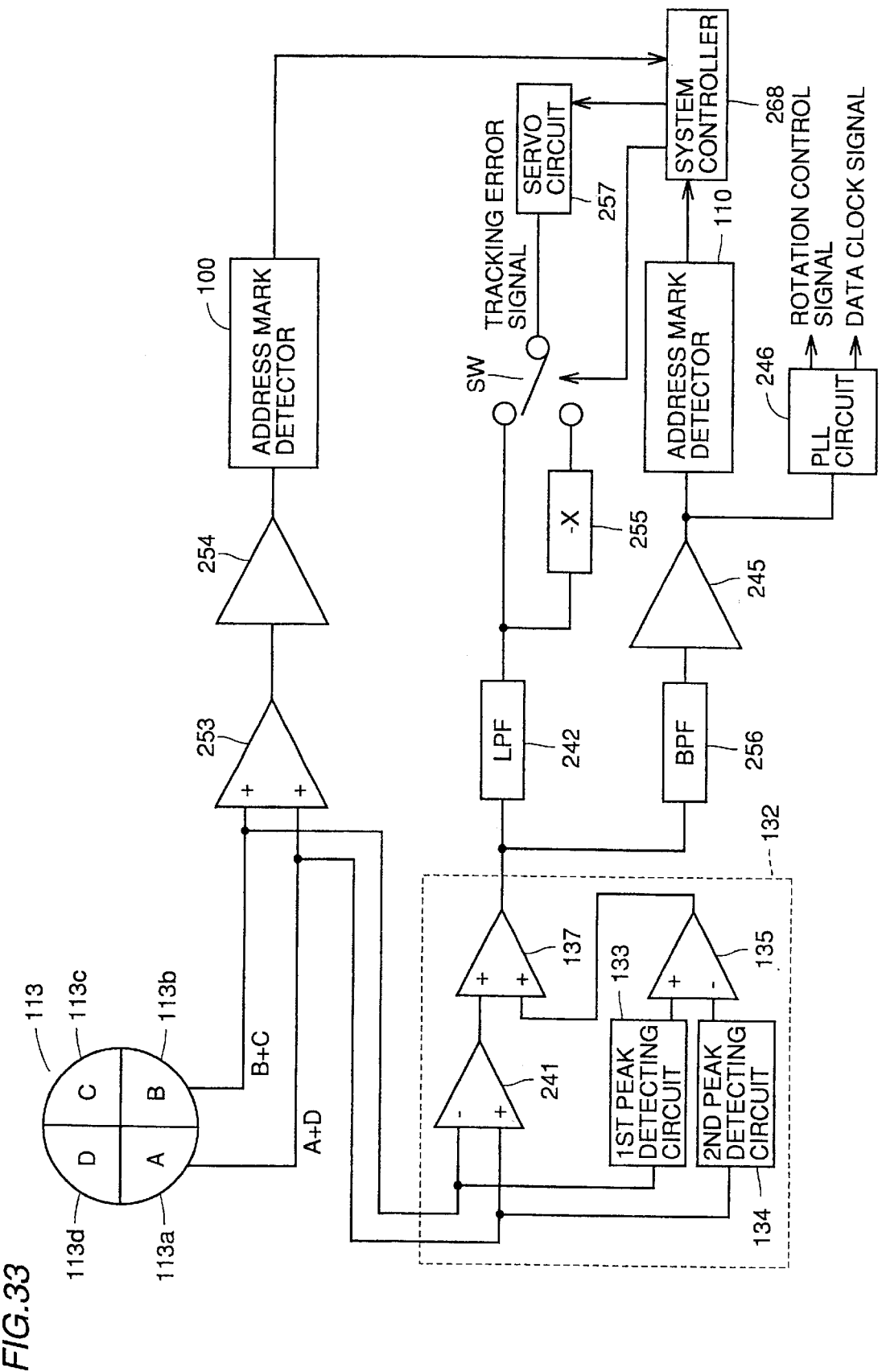
FIG. 33 shows a structure of a reproducing apparatus according to an embodiment 8 of the invention.

FIG. 33 shows a structure of a reproducing apparatus according to the embodiment. As shown in FIG. 33, the reproducing apparatus has a structure similar to that of the reproducing apparatus shown in FIG. 15, but differs therefrom in that the device in FIG. 33 includes an offset correction circuit 132.

Offset correction circuit 132 includes a first peak detecting circuit 133, a second peak detecting circuit 134, an amplifier 135 connected to first and second peak detecting circuits 133 and 134, and an amplifier 137 connected to amplifiers 241 and 135.

An offset correcting operation of this reproducing apparatus will now be described below. The light reflected by fine clock mark 20 is detected by photodetector 113 having the light receiving surface divided into four regions. The photodetector 113 issues signal (B+C) based on the reflected light which is detected on regions 113b and 113c, and also issues signal (A+D) based on the reflected light which is detected on regions 113a and 113d. First peak detecting circuit 113 detects intensity $I_A$ of signal (B+C), and second peak detecting circuit 134 detects intensity $I_B$ of signal (A+D). Amplifier 135 obtains a difference $(I_A-I_B)$ between detected intensities $I_A$ and $I_B$.

Signals (A+D) and (B+C) are supplied to amplifier 241 which obtains a difference [(A+D)−(B+C)] between them.

Amplifier 137 adds the difference [(A+D)+(B+C)] and the difference $(I_A-I_B)$ together, and sends the result to LPF 242. In the above manner, the offset of the tracking error signal is corrected.

According to the reproducing apparatus of the embodiment, the laser beam can be always applied to the center of land 4 or groove 3 so that data reproduction can be achieved more accurately.

The offset correction described above relates to data reproduction, but may be effectively employed in data recording.

More specifically, fine clock mark 20 is detected in the data recording operation, and offset correction circuit 132 corrects the offset of the tracking error signal, whereby the laser beam can be applied to the center of land 4 or groove 3, and the data can be recorded on the accurate position. A structure of a recording apparatus used for the above recording is similar to that of the reproducing apparatus shown in FIG. 33.

Embodiment 9

Figure 34:
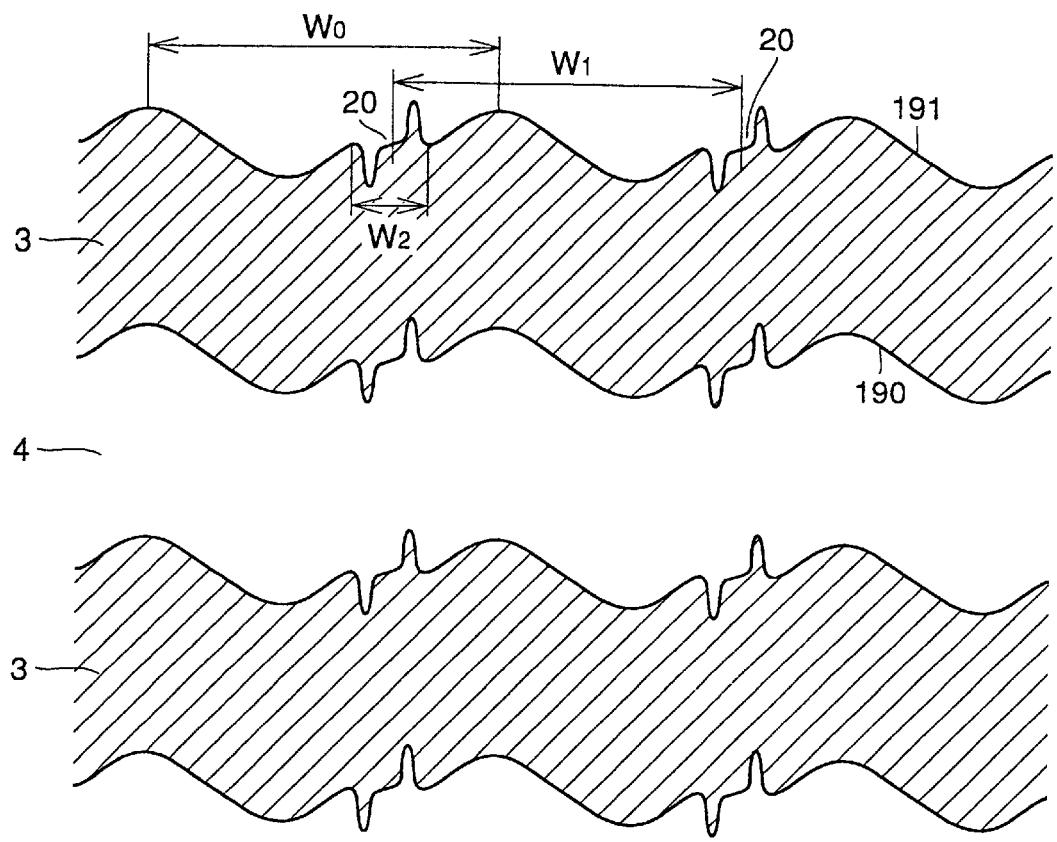
FIG. 34 is a plan showing a structure of a disk according to an embodiment 9 of the invention.

In the disk shown in FIG. 31, opposite sidewalls 190 and 191 of groove 3 are not wobbled. However, as shown in FIG. 34, a similar concept can be applied to a disk shown in FIG. 34, in which fine clock marks 20 are formed in the tracks on grooves 3, each of which has opposite sidewalls 190 and 191 provided with wobbles of the same phase and a constant cycle $W_0$.

The foregoing wobbles on sidewalls 190 and 191 are clocking wobbles 351 in the data portion.

Fine clock mark 20 is a wobble of a frequency higher than that of clocking wobble 351. Distance $W_1$ between fine clock marks $W_1$ is constant within a range from 50 to 300 μm, and a ratio $W_2/W_1$ between length $W_2$ of the region bearing fine clock mark 20 and distance $W_1$ is in a range from 1/300 to 1/50.

Embodiment 10

Figure 35:
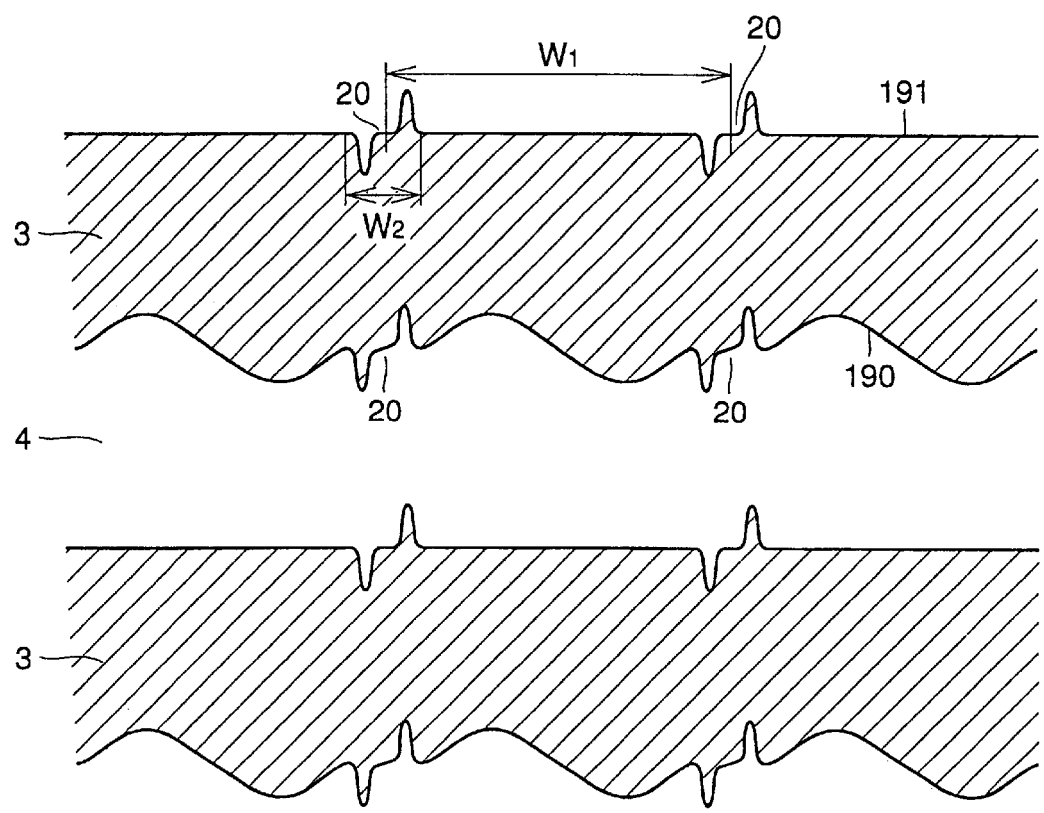
FIG. 35 is a plan showing a structure of a disk according to an embodiment 10 of the invention.

FIG. 35 shows a planar structure of a data portion in a disk according to an embodiment 10. As shown in FIG. 35, the data portion of the disk according to this embodiment includes grooves 3 each having clocking wobble 351 which is formed on only one sidewall 190 and fine clock marks 20 which are formed on opposite sidewalls 190 and 191, respectively.

Distance $W_1$ between fine clock marks 20 is constant within a range from 50 to 300 μm, and the ratio $W_2/W_1$ between length $W_2$ of the region bearing each fine clock mark 20 and distance $W_1$ is in a range from 1/300 to 1/50.

Embodiment 11

Figure 36:
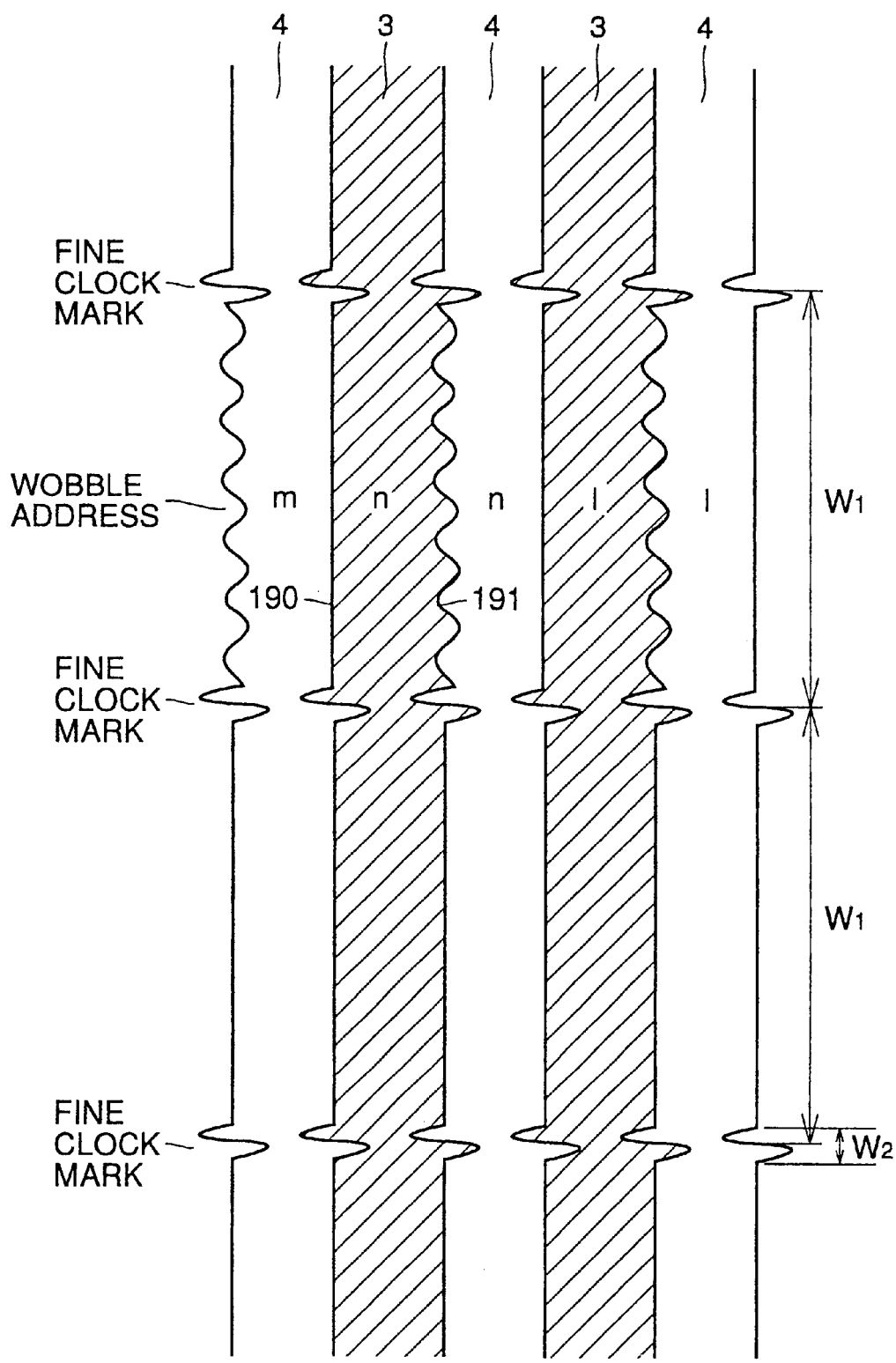
FIG. 36 is a plan showing a structure of a disk according to an embodiment 11 of the invention.

FIG. 36 shows a planar structure of a disk according to an embodiment 11. As shown in FIG. 36, the disk includes grooves 3 each having such a structure that fine clock marks 20 spaced by predetermined distance $W_1$ from each other are formed on each of sidewalls 190 and 191, and only one sidewall 191 in the address portion storing address information m, n or l is wobbled in accordance with address information n. Distance $W_1$ between fine clock marks 20 and length $W_2$ of the region bearing fine clock mark 20 are the same as those in the embodiment 10 already described. Address information n, which is recorded in the form of wobble on one sidewall 191 of groove 3, is used as address information for land 4 and groove 3 on the opposite sides of the same wobble.

Embodiment 12

As already described in connection with the embodiment 2 with reference to FIG. 20, a structure in which clocking wobbles 351 having the same phase are formed on the opposite sidewalls of groove 3 suffers from a problem that data cannot be reproduced accurately, because the reflected light coming from the disk contains not only a polarized wave component caused by the originally recorded data, which is defined by the directions of magnetization, but also a polarized wave component depending on the direction of groove 3.

In view of the above, this embodiment provides a disk which allows production of the synchronizing signal for data reproduction from the wobble formed on the data portion without causing the above problem.

Figure 37:
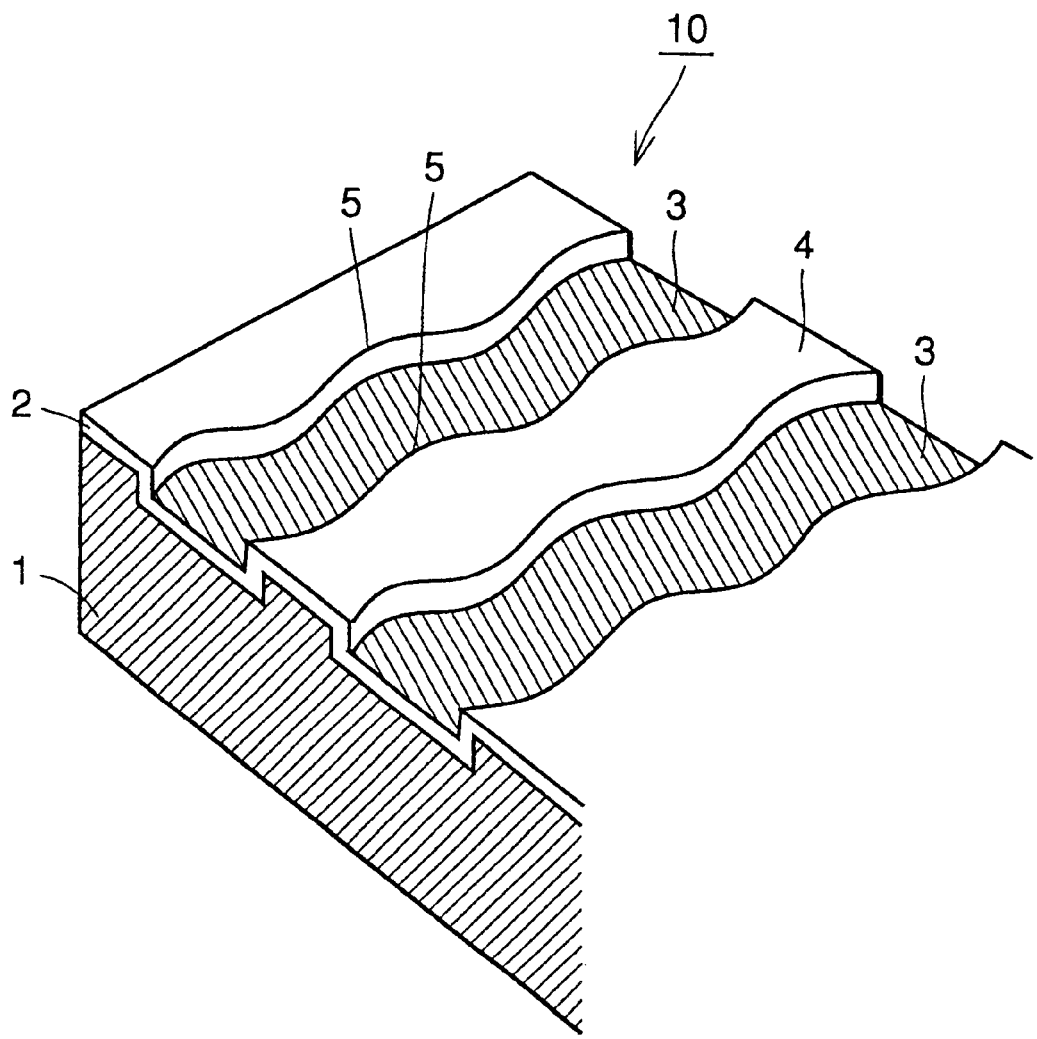
FIG. 37 is a plan showing a structure of a disk according to an embodiment 12 of the invention.

FIG. 37 is a perspective view showing a structure of a disk 10 according to this embodiment. As shown in FIG. 37, disk 10 includes a transparent substrate 1 made of polycarbonate or glass, and a magnetic film 2 formed on substrate 1. Magnetic film 2 includes a reproduction layer made of, e.g., GdFeCo and a record layer made of TbFeCo.

Disk 10 includes grooves 3 and lands 4. Wobbles 5 of which phases are shifted by 180 degrees from each other are formed on the opposite sidewalls of each groove 3, respectively. Thus, wobbles 5 are formed to change the width of each of grooves 3 and lands 4 in predetermined cycles with respect to the scanning direction of the laser beam.

Figure 38:
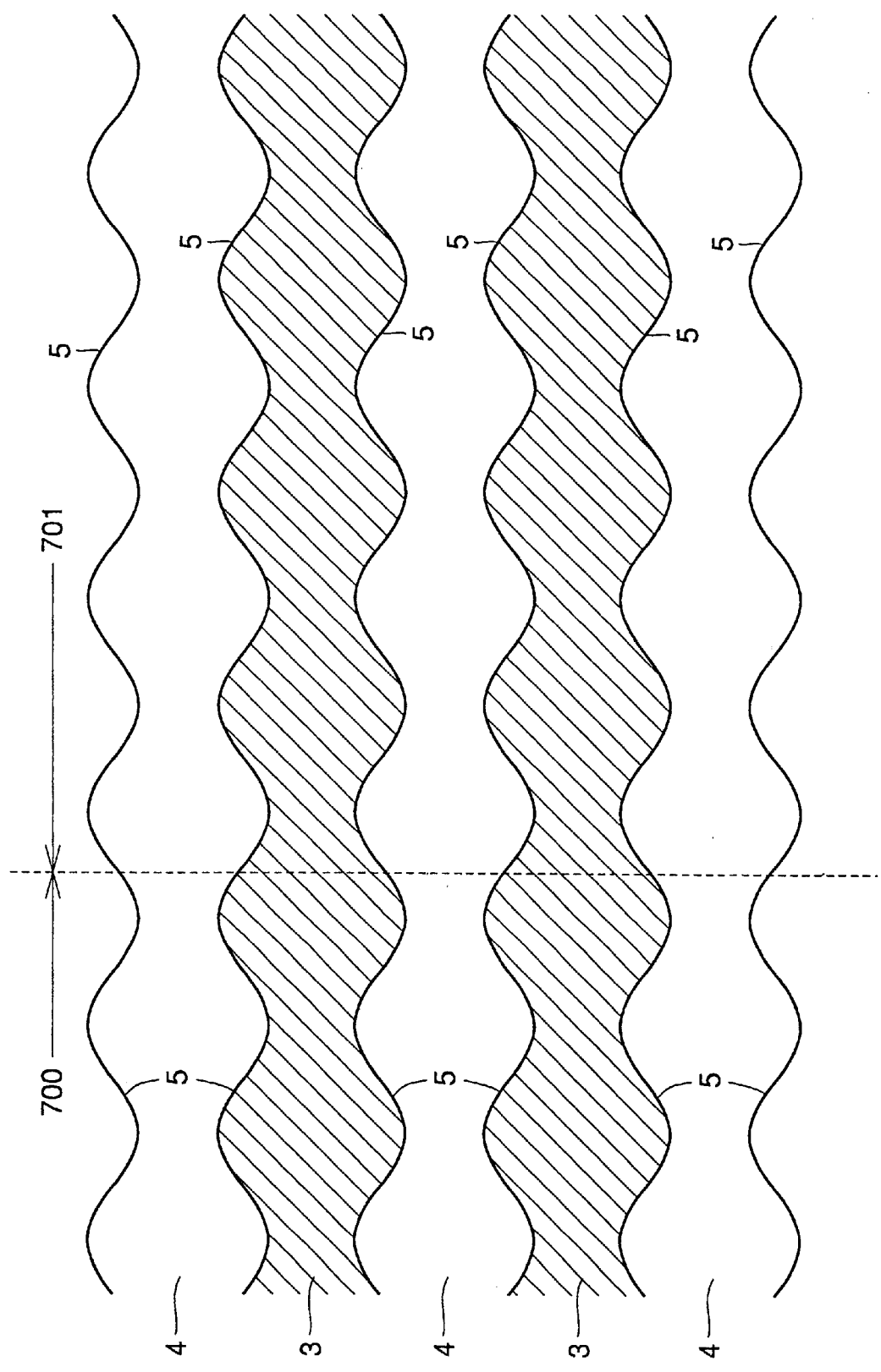
FIG. 38 is a plan showing a structure of a disk according to an embodiment 12 of the invention.

FIG. 38 shows a planar structure of disk 10.

Figure 39:
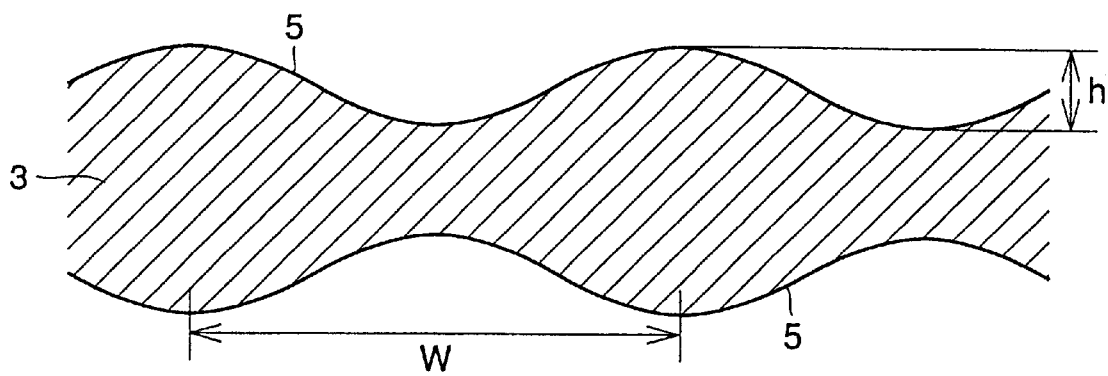
FIG. 39 is a plan showing a structure of wobbles shown in FIGS. 37 and 38.

As shown in FIG. 38, disk 10 includes an address portion 700 and a data portion 701. Wobbles 5 are formed on the opposite sidewalls of each groove 3 in address and data portions 700 and portion 701. The wavelength and amplitude of wobble 5 will now be described below with reference to FIG. 39.

The wavelength W of wobble 5 is in a range from 0.8 to 20 μm, and preferably in a range from 1.2 to 5 μm. Amplitude h/2 of wobble 5 is in a ranged from 5 to 100 nm, and preferably in a range from 10 to 30 nm. In disk 10 according to the embodiment, the data synchronizing signal used for recording and reproducing data is produced from wobble 5 formed in data portion 701.

In address portion 700, each groove 3 included in disk 10 according to this embodiment has opposite sidewalls, which are wobbled in accordance with the address information and are symmetrical with respect to the center line of groove 3.

The address information is recorded, e.g., in the biphase modulation method. The recording of address information in this method will now be described below with reference to FIGS. 40A–40D.

Figure 40A:
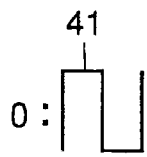
FIGS. 40A–40D show a manner of recording address information by a biphase modulation method.
Figure 40B:
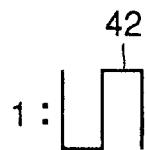

It is assumed that a waveform 41 shown in FIG. 40A represents "0" in the address information converted into the binary form, and a waveform 42 shown in FIG. 40B represents "1" in the same. In this case, a waveform 43 shown in FIG. 40C is formed when recording address information (10110) by biphase modulation.

Figure 40C:
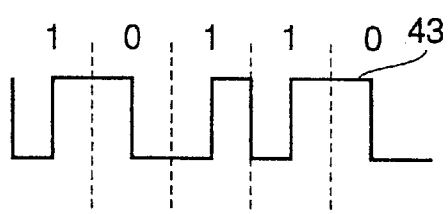
Figure 40D:
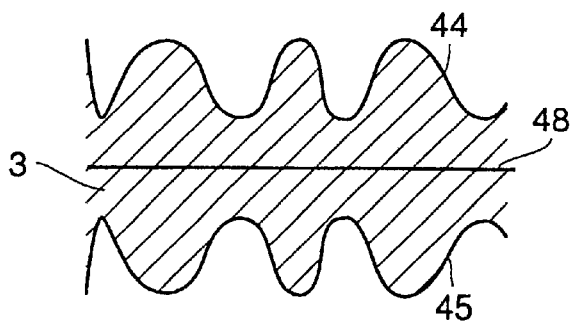

Accordingly, a wobble formed on one of the sidewalls of groove 3 in the address portion has a waveform 44 shown in FIG. 40C, and a wobble formed on the other sidewall of groove 3 has a waveform 45 shown in FIG. 40D. Waveforms 44 and 45 are symmetrical with respect to a center line 48 of groove 3.

Figure 41:
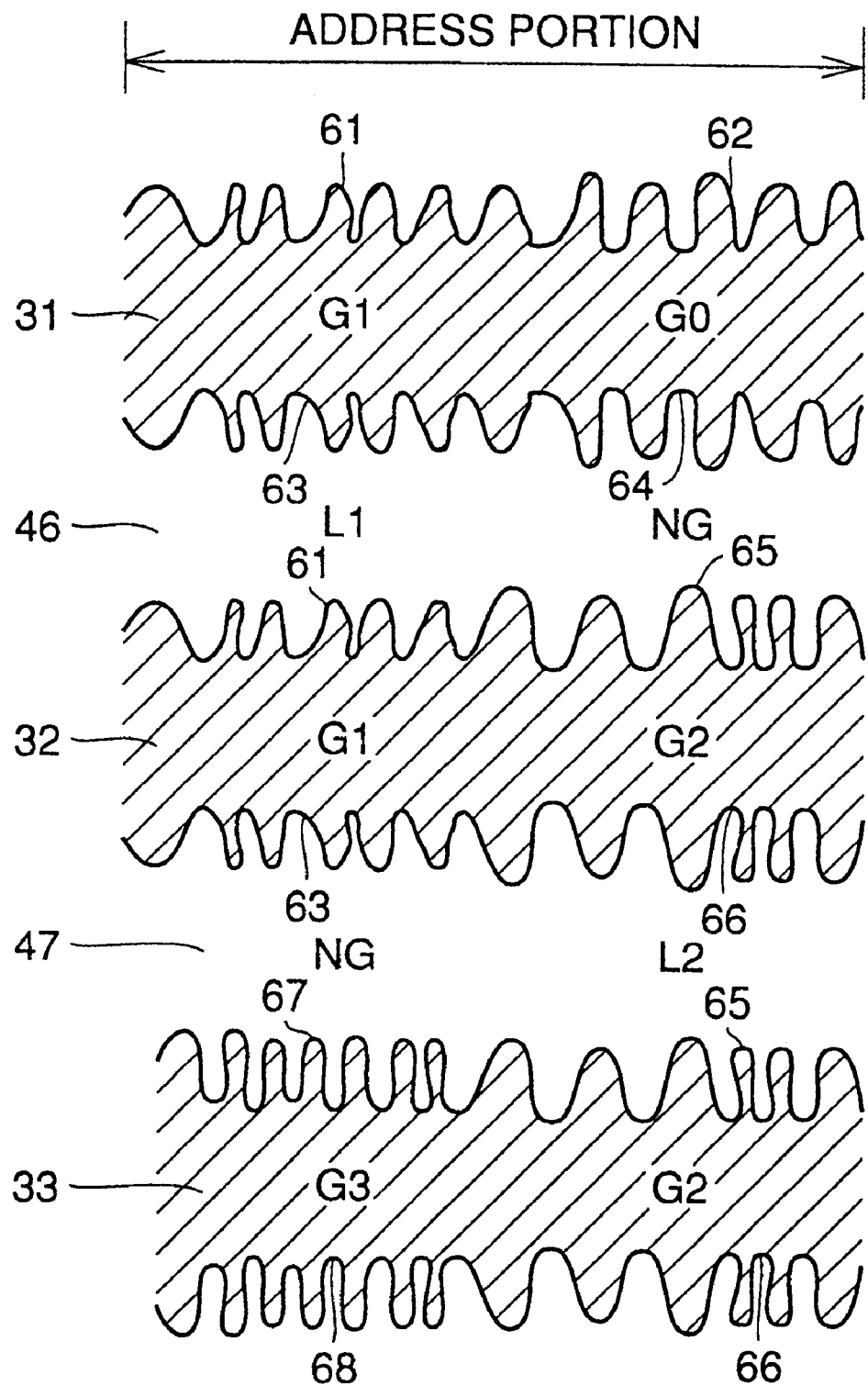
FIG. 41 is a plan showing a structure of an address portion of the disk of the disk according to the embodiment 12.

FIG. 41 shows a planar structure of the address portion storing addresses G0–G3, L1 and L2.

As shown in FIG. 41, wobbles 61 and 62 are formed on one of the sidewalls of a groove 31 included in the address portion, and wobbles 63 and 64 are formed on the other sidewall. Wobbles 61 and 63 are symmetrical with respect to the center line of groove 31, and wobbles 62 and 64 are symmetrical with respect to the center line of groove 31.

Wobbles 61 and 65 are formed on one of the sidewalls of a groove 32, and wobbles 63 and 66 are formed on the other sidewall. Wobbles 61 and 63 are symmetrical with respect to the center line of groove 32, and wobbles 65 and 66 are symmetrical with respect to the center line of groove 32.

Wobbles 67 and 65 are formed on one of the sidewalls of a groove 33, and wobbles 68 and 66 are formed on the other sidewall of groove 33. Wobbles 67 and 68 are symmetrical with respect to the center line of groove 33, and wobbles 65 and 66 are symmetrical with respect to the center line of groove 33.

In this structure including wobbles 61–68 formed on the opposite sidewalls of grooves 31, 32 and 33, the address portion of groove 31 stores an address G1 corresponding to wobbles 61 and 63 formed on the opposite sidewalls and an address G0 corresponding to wobbles 62 and 64. Likewise, addresses G1 and G2 are recorded on the address portion of groove 32, and addresses G3 and G2 are recorded on the address portion of groove 33. Further, as a result of formation of wobbles 61–68 on the opposite sidewalls of grooves 31, 32 and 33 described above, an address L1 is recorded on a land 46 by wobbles 63 and 61, and an address L2 is recorded on a land 47 by wobbles 65 and 66.

Since the address information on grooves 31, 32 and 33 as well as lands 46 and 47 are defined by the waveforms of wobbles 61–68 formed on the opposite sidewalls of the grooves, address G1 is the same as address L1, and address G2 is the same as address L2.

According to the above structure, addresses G1 and G0 are detected by scanning groove 31 with a laser beam, and address L1 is detected by scanning land 46. Likewise, addresses G1 and G2 are detected by scanning land 32, address L2 is detected by scanning land 47, and addresses G3 and G2 are detected by scanning groove 33.

Assuming that information NG which is not detected as the address is deemed as a kind of address, it can be considered that two addresses are detected from each of grooves 31, 32 and 33, and lands 46 and 47, and one of the detected two addresses is identified as the address of the data recorded on corresponding one of grooves 31, 32 and 33, and lands 46 and 47 by reproducing the address mark which is formed as already described in connection with the embodiment 1.

Figure 42:
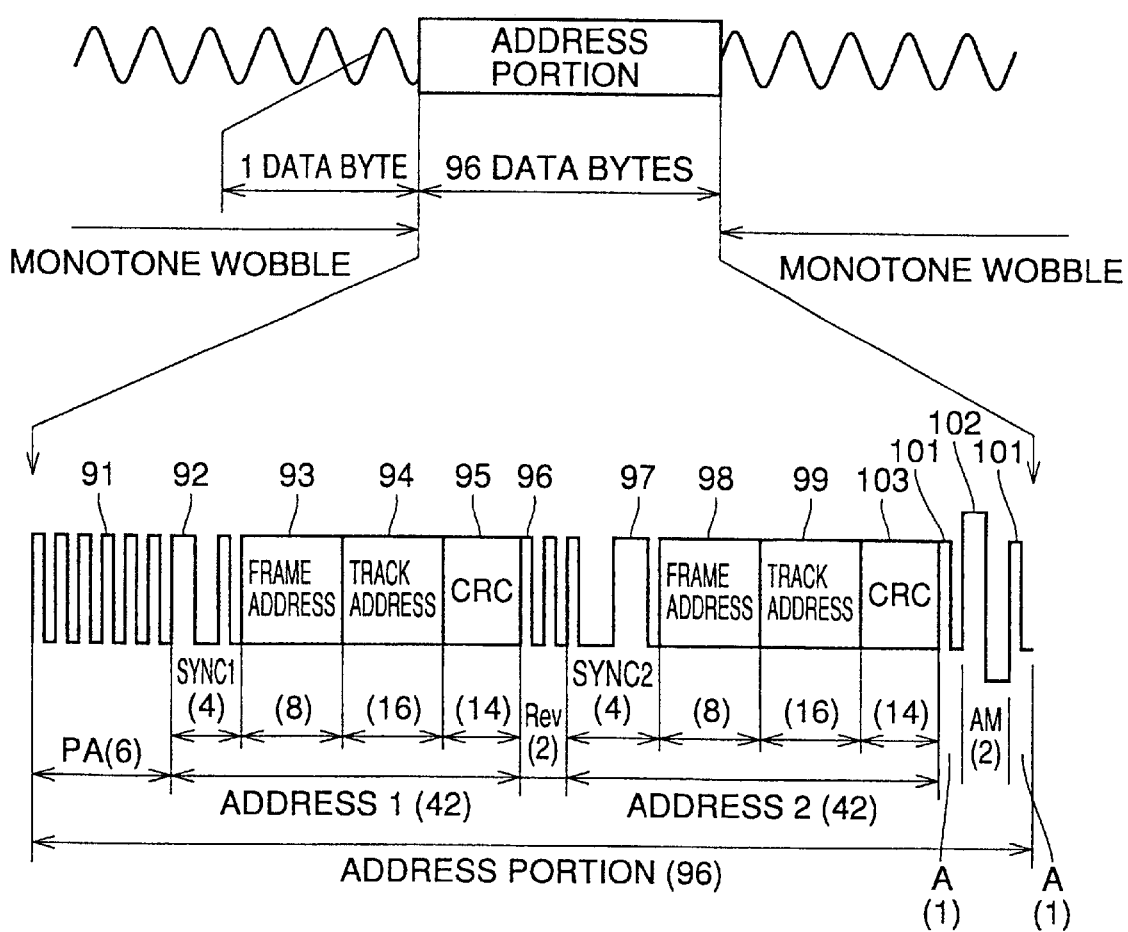
FIG. 42 shows a formation of the address portion of the disk according to the embodiment 12.

The above method of recording the address information will be referred to as a "stagger method" hereinafter. FIG. 42 shows a format of address information recorded on the address portion of the disk according to the embodiment. As shown in FIG. 42, the address portion has a region of 96 data byte length, and the data quantity of the address portion is 96 bits. Thus, the length corresponding to one bit in the address portion is eight times longer than that of the record bit. For example, if one record bit has a bit length of 0.22 µm, the length of data bit in the address portion corresponds to 1.76 µm.

The address portion includes a preamble (PA) 91 having a length of 6 data bytes, address 1 having a length of 42 data bytes, address 2 having a length of 42 data bytes, A-patterns 101 having a length of 2 data bytes and an address mark (AM) 102 having a length of 2 data bytes.

Address 1 includes a first synchronizing signal (SYNC1) 92 of 4 bits, a frame address 93 of 8 bits, a track address 94 of 16 bits and an error detection code (CRC) 95 of 14 bits.

Address 2 includes a second synchronizing signal (SYNC2) 97 of 4 bits, a frame address 98 of 8 bits, a track address 99 of 16 bits and a CRC 103 of 14 bits.

A signal of (101010101010) is recorded as preamble (PA) 91. Also, a signal of (11100010) is recorded as first synchronizing signal 92. A signal of (1010) is recorded in reserve region (Rev) 96. A signal of (10001110) is recorded as second synchronizing signal 97, a signal of (10) is recorded as A-pattern 101, and a signal of (1100) is recorded as address mark (AM) 102. In these recorded signals, "0" is represented by waveform 41 shown in FIG. 40A, and "1" is represented by waveform 42 shown in FIG. 40B.

Figure 43:
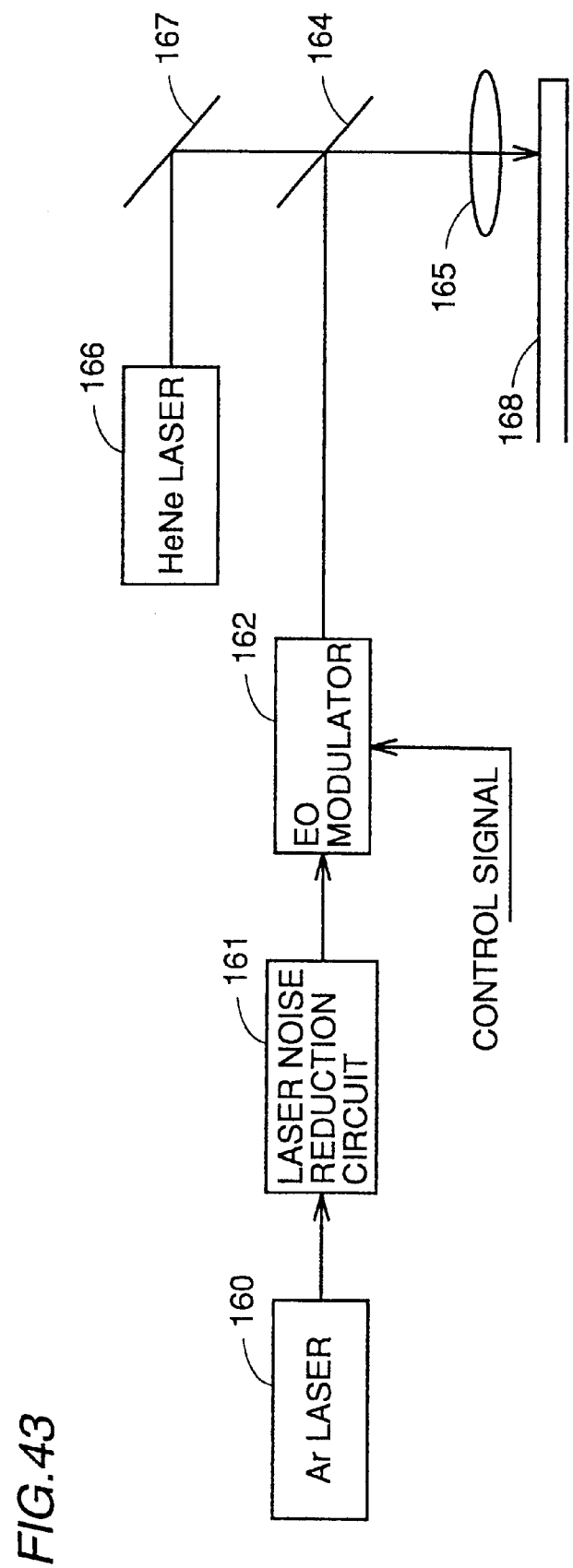
FIG. 43 is a block diagram showing a structure of a cutting device for manufacturing the disk according to the embodiment 12.

FIG. 43 shows a structure of a cutting device for producing the disk according to the embodiment. As shown in FIG. 43, the cutting device includes a helium-neon laser 166 producing a laser beam for focus servo having a wavelength of 633 nm, an argon laser 160 producing a laser beam of 458 nm, a laser noise reduction circuit 161 which is connected to argon laser 160 for removing noises in the laser beam, EO (Electro-Optical) modulator 162 which changes the power of laser beam in accordance with a control signal supplied thereto, a reflecting mirror 164 which reflects the laser beam of 458 nm and allows passing of the laser beam emitted from helium-neon laser 166, an objective lens 165 focusing the laser beam on a glass master 168, and a reflecting mirror 167 which reflects the laser beam emitted from helium-neon laser 166.

The control signal supplied to EO modulator 162 determines the intensity of the laser beam. By cyclically changing the intensity of the argon laser by this control signal, wobbles 5 shown in FIG. 37 are formed on the opposite sidewalls of groove 3. More specifically, EO modulator 162 issues the laser beam of which intensity changes in a predetermined cycle. The laser beam thus issued is reflected by reflecting mirror 164, and is focused by objective lens 165 onto glass master 168.

In this manner, the diameter of spot changes in accordance with the change in intensity of the laser beam applied onto glass master 168, whereby wobbles 5 shown in FIG. 37 are formed on the opposite sidewalls of groove 3.

Figure 44:
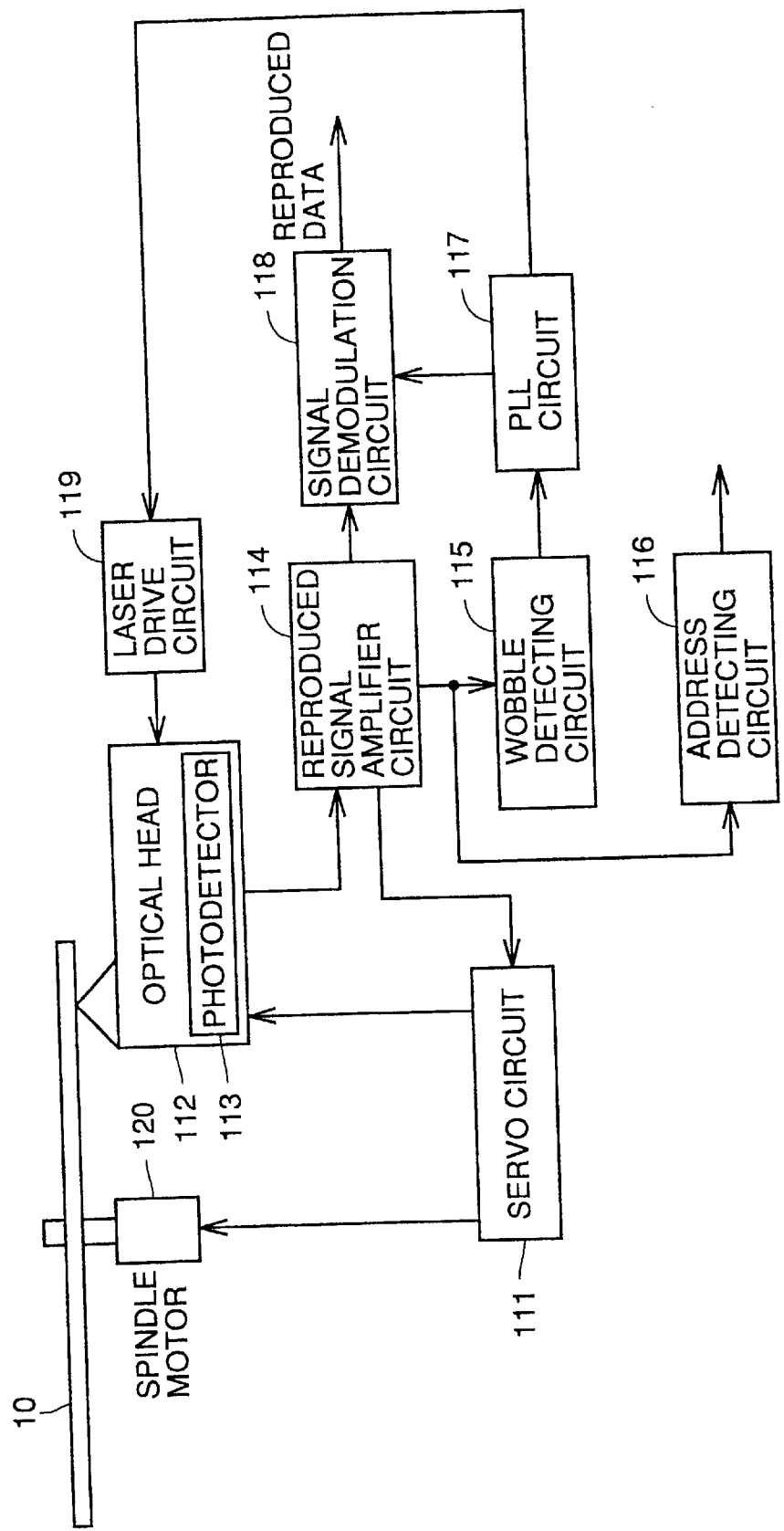
FIG. 44 is a block diagram showing a structure of a reproducing apparatus according to the embodiment 12.

FIG. 44 shows a whole structure of a reproducing apparatus reproducing data from the disk of the embodiment described above. The reproducing apparatus shown in FIG. 44 includes an optical head 112, a reproduced signal amplifier circuit 114 connected to optical head 112, a signal demodulator circuit 118 connected to reproduced signal amplifier circuit 114, wobble detecting circuit 115 connected to reproduced signal amplifier circuit 114, an address detecting circuit 116 connected to reproduced signal amplifier circuit 114, a PLL circuit 117 connected to wobble detecting circuit 115, a laser drive circuit 119 connected to PLL circuit 117, a servo circuit 111 connected to reproduced signal amplifier circuit 114, and a spindle motor 120 connected to servo circuit 111.

An operation of the above reproducing apparatus will now be described below.

Optical head 112 focuses the laser beam onto disk 10, and photodetector 113 included therein detects the reflected light coming from disk 10. Reproduced signal amplifier circuit 114 amplifies the reproduced signal sent from photodetector 113, and supplies the focus error signal, tracking error signal and others to servo circuit 111. Further, from reproduced signal amplifier circuit 114, data reproduction signal is supplied to signal demodulator circuit 118, the wobble signal produced from the data portion is supplied to wobble detecting circuit 115, and the wobble signal reproduced from the address portion is supplied to address detecting circuit 116.

Servo circuit 111 controls optical head 112 and spindle motor 120 based on the received focus error signal, tracking error signal and others. Signal demodulator circuit 118 demodulates the reproduced signal, which has been modulated in a predetermined modulating method, based on the synchronizing signal received from PLL circuit 117, and sends the demodulated signal as reproduced data to an output device (not shown). Wobble detecting circuit 115 converts the received wobble signal into a binary form through a comparator, and the supplies the converted binary signal to PLL circuit 117. Address detecting circuit 116 converts the received wobble signal into a binary form through a comparator, and demodulates the converted binary signal to detect and send the address information to a microcomputer (not shown). PLL circuit 117 produces a synchronizing signal based on the received binary signal, and supplies the same to signal demodulating circuit 118 and laser drive circuit 119. Laser drive device 119 drives the semiconductor laser (not shown) included in optical head 112 in response to the received synchronizing signal for reproducing the signals recorded on disk 10.

Figure 45:
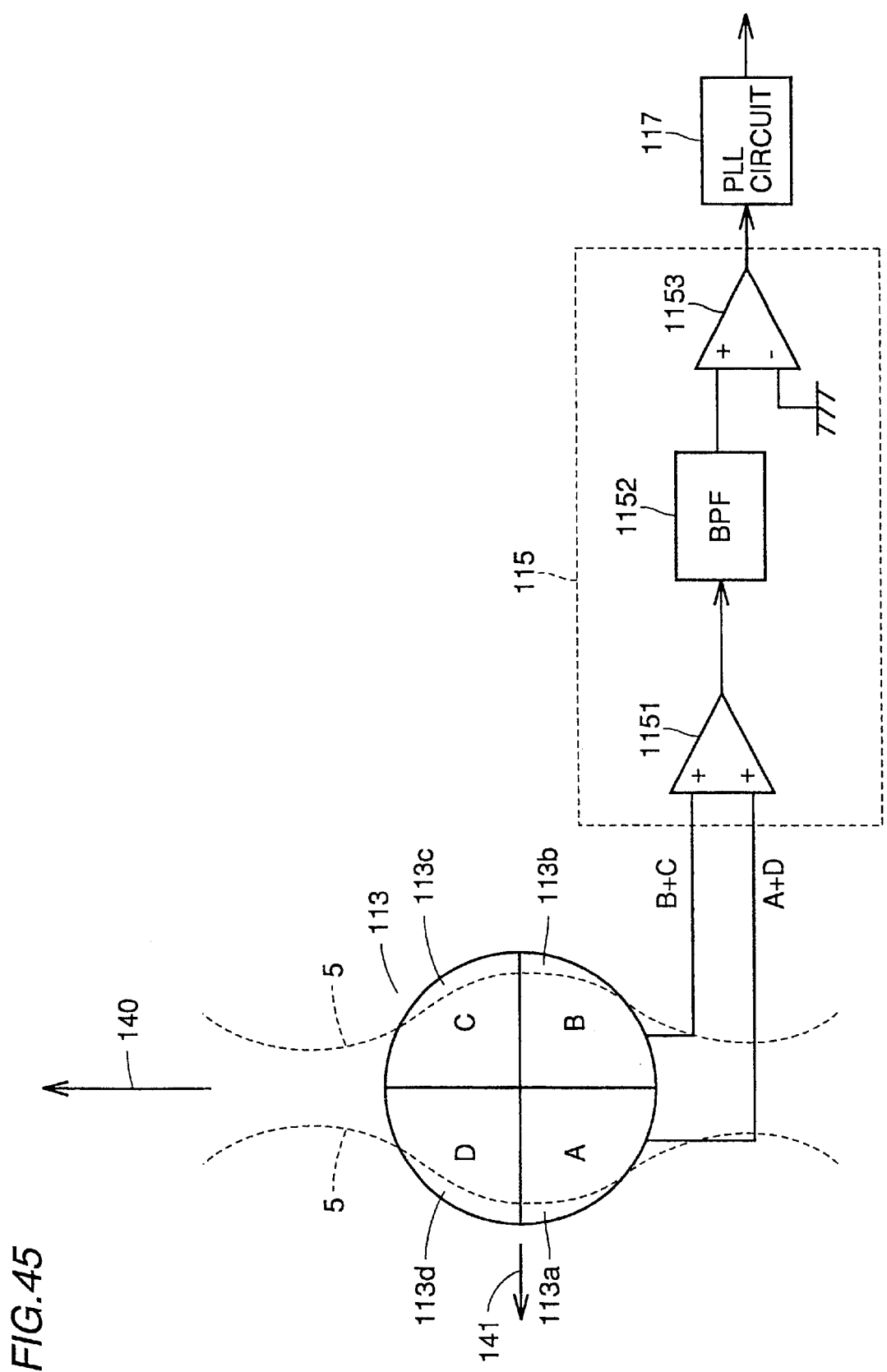
FIG. 45 shows a manner of detecting wobbles by the reproducing apparatus shown in FIG. 44.

FIG. 45 shows a manner of detecting wobbles 5, which are formed in the data portion, by wobble detecting circuit 115 shown in FIG. 44. As shown in FIG. 45, photodetector 113 has a light receiving surface divided into four regions 113a, 113b, 113c and 113d. Regions 113a and 113d are aligned in a moving direction 140 of the laser beam, and regions 113b and 113c are aligned in the same direction. In this structure, light intensity signal (A+D) detected on regions 113a and 113d as well as light intensity signal (B+C) detected on regions 113b and 113c are supplied to an adder 1151 included in wobble detecting circuit 115 through reproduced signal amplifier circuit 114. The light intensity signals are added together by an adder 1151. The signal produced by this addition passes through a band-pass filter 1152 for removing noises, and then is converted by a comparator 1153 into a binary form based the 0 level. The binary signal thus converted is supplied to PLL circuit 117.

FIG. 46A shows signals supplied to comparator 1153. More specifically, the signal in FIG. 46A is converted into a binary form by comparator 1153, and the binary signal shown in FIG. 46B is supplied to PLL circuit 117. PLL circuit 117 produces synchronizing signals at a rate of two signals per one cycle in response to rising 150 and falling 151 of the binary signal shown in FIG. 46. Since wobble 5 formed on the data portion has constant wavelength W in a range from 0.8 to 20 μm, the synchronizing signals can be produced at relatively short time intervals. Therefore, the data signal can be reproduced accurately.

The address information recorded in the address portion is also detected by address detecting circuit 116 having a structure similar to that shown in FIG. 45.

Figure 47:
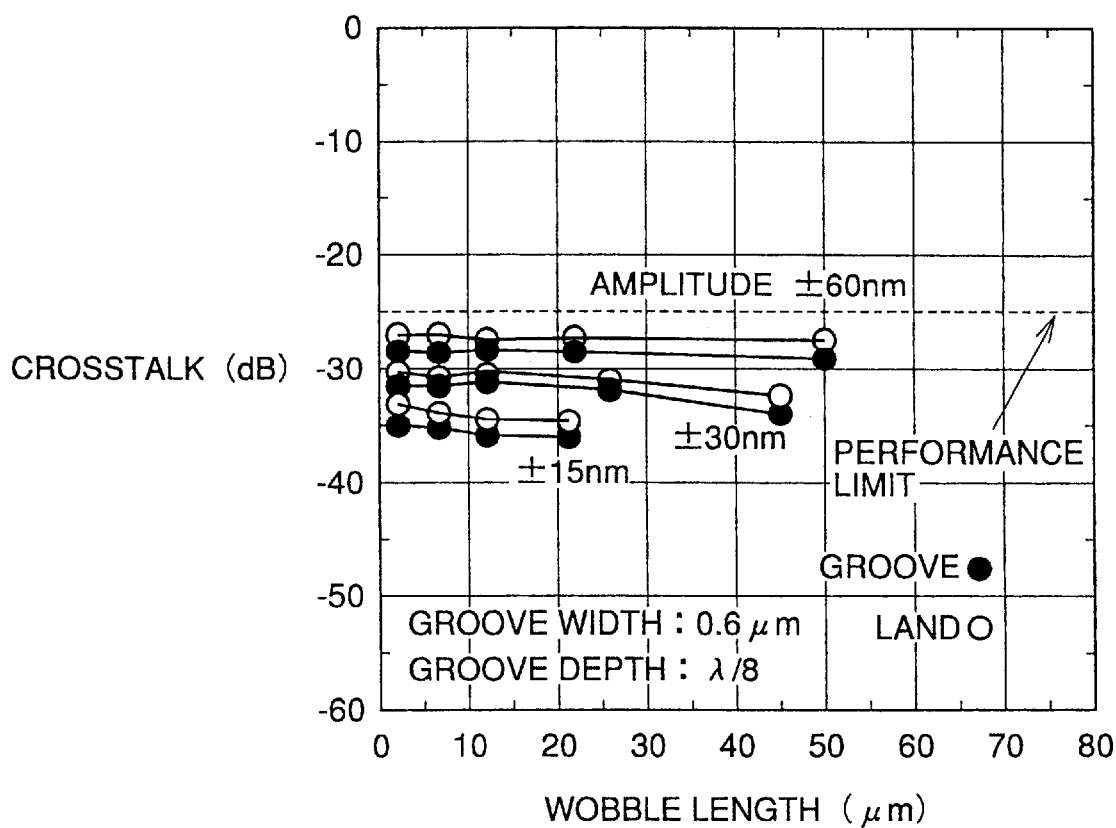
FIG. 47 is a graph showing reproduction characteristics of the disk according to the embodiment 12.

FIG. 47 is a graph showing a relationship between the wobble length and the crosstalk in the disk according to this embodiment. In this graph, groove 3 formed on the disk has a width of 0.6 μm and an amplitude of 60 nm.

In this case, reduction in wobble length does not increase the crosstalk as shown in FIG. 47. It has been recognized that the wobble length of 0.8 μm or less does not increase the crosstalk. Therefore, data reproduction having good characteristics can be performed by producing the synchronizing signals from the wobbles having a reduced wobble length.

According to the disk of the embodiment, as described above, the polarizing direction of the laser beam applied onto the disk is not affected by the form of groove 3. Therefore, recorded magneto-optical record signal (data) can be accurately reproduced. Further, the wobble formed on the data portion has a short wavelength of 20 μm. Therefore, the synchronizing signal of a high frequency can be produced, and data recorded at a high density can be reliably reproduced.

Embodiment 13

Figure 48:
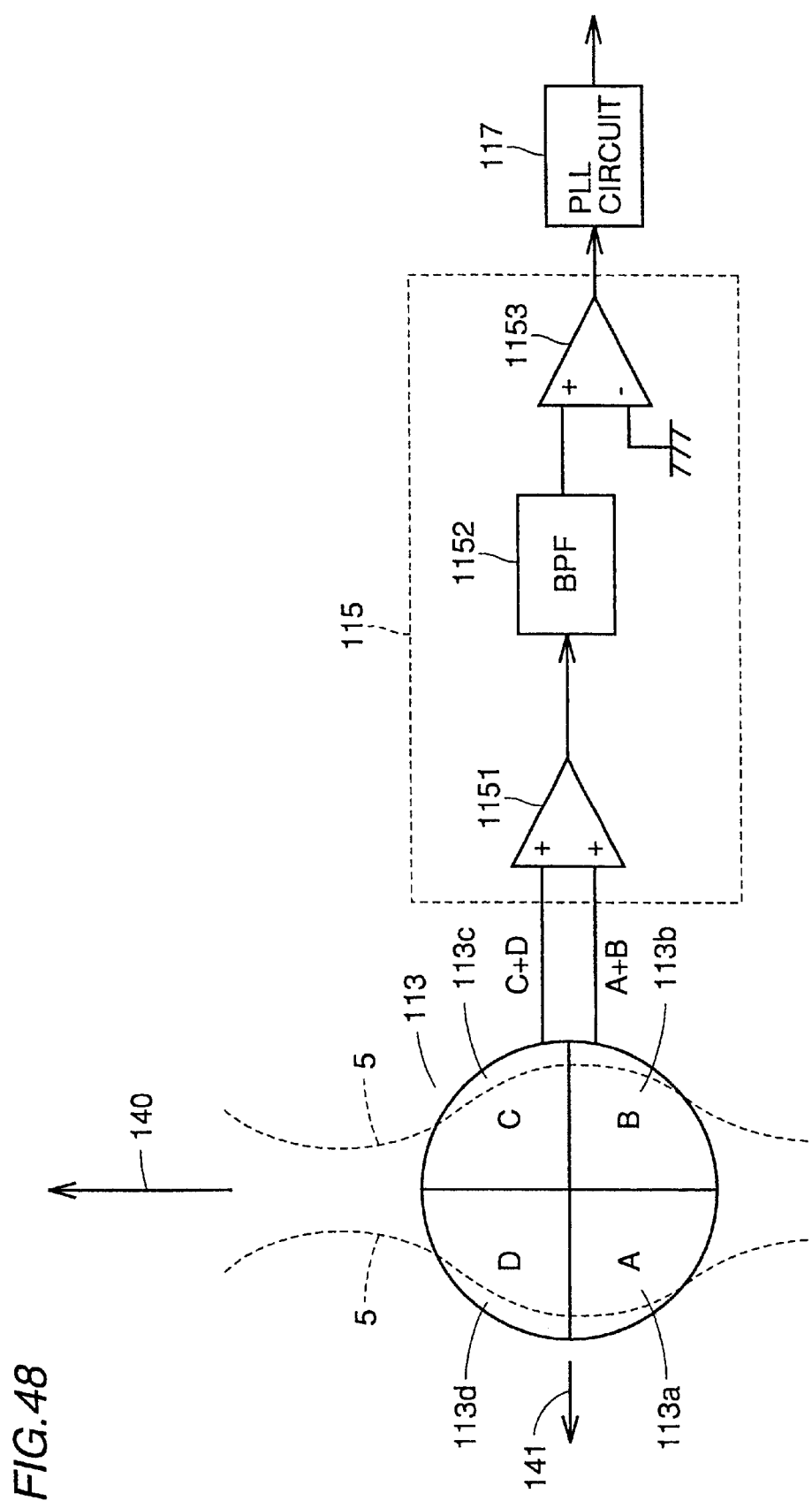
FIG. 48 shows a structure of a wobble detecting circuit according to the embodiment 13 of the invention.

FIG. 48 shows an embodiment 13 relating to photodetector 113 and wobble detector 115 different from those shown in FIGS. 44 and 45.

As shown in FIG. 48, photodetector 113 has the light receiving surface divided into four regions 113a, 113b, 113c and 113d. However, photodetector 113 and wobble detector 115 in FIG. 48 differs from those shown in FIG. 45 in that a light intensity signal detected by regions 113c and 113d, which are aligned in a direction 141 perpendicular to moving direction 140 of the laser beam, as well as a light intensity signal (A+B) aligned in the same direction are supplied to adder 1151. These photodetector 113 and wobble detector 115 can achieve an effect similar to that of the reproducing apparatus according to the foregoing embodiment 12.

Embodiment 14

Figure 49:
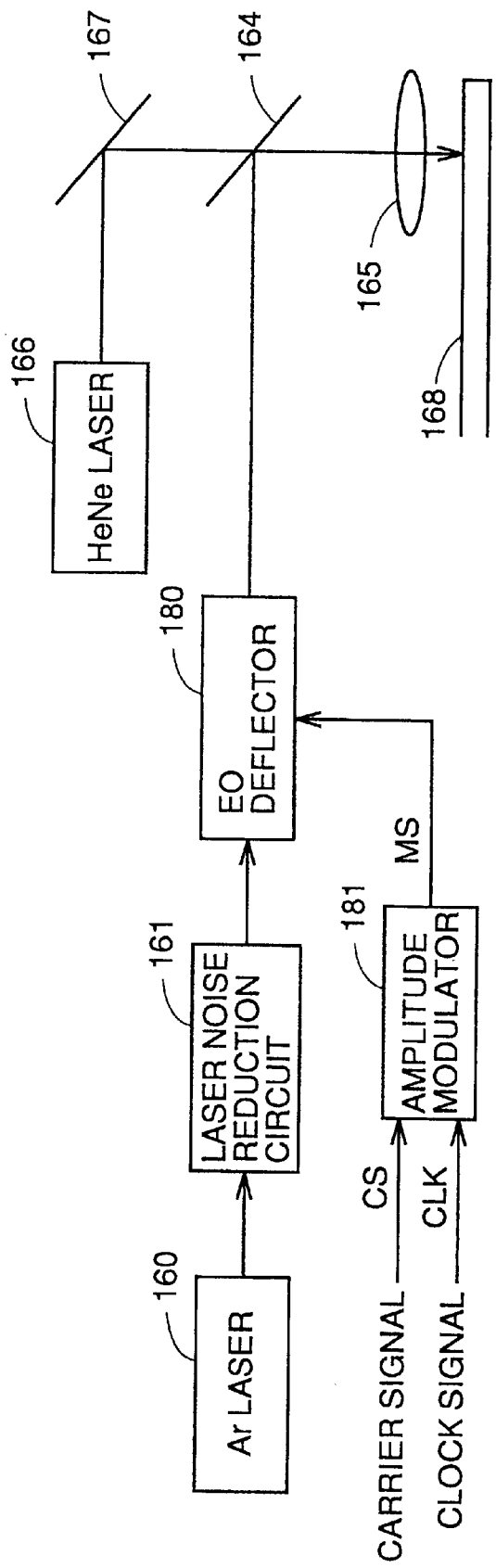
FIG. 49 is a block diagram showing a structure of a cutting device according to the embodiment 14 of the invention.

FIG. 49 shows an embodiment relating to a cutting device different from that in the embodiment 12.

The cutting device shown in FIG. 49 has a structure similar to that shown in FIG. 43, but differs therefrom in that the device in FIG. 49 includes an amplitude modulator 181 and an EO deflector 180 connected to amplitude modulator 181 and laser noise reduction circuit 161.

Figure 50:
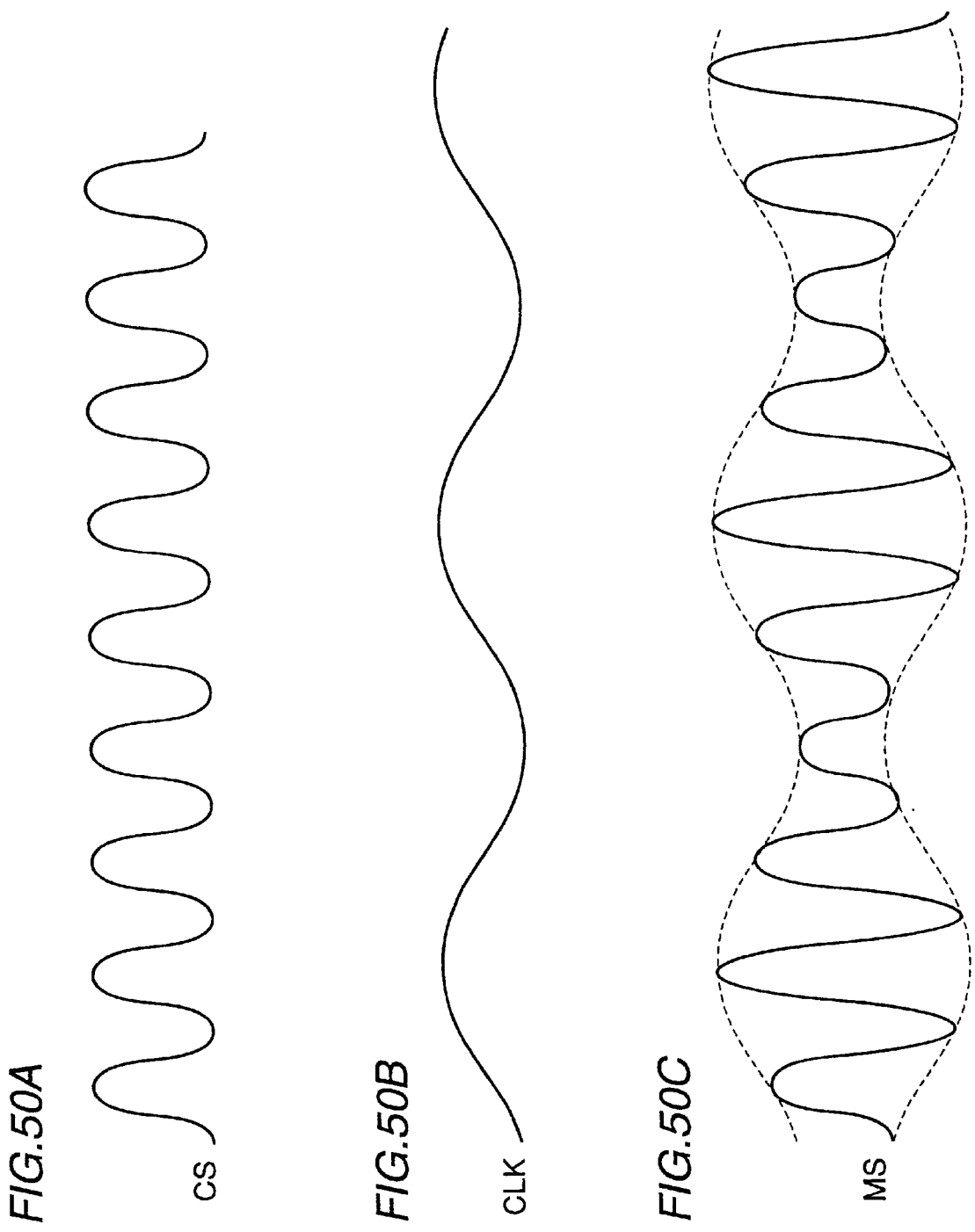
FIGS. 50A–50C are waveform diagrams showing an operation of the cutting device shown in FIG. 49.

Amplitude modulator 181 receives a carrier signal CS shown in FIG. 50A and a clock signal CLK shown in FIG. 50B, and supplies a control signal MS having an envelope, which corresponds to the waveform of wobble 5 as shown in FIG. 50C, to EO deflector 180. Thereby, the laser beam on glass master 168 repeats a reciprocating motion at a high frequency in the tracking direction, and thereby forms wobbles 5 on the opposite sidewalls of groove 3.

Embodiment 15

Figure 51:
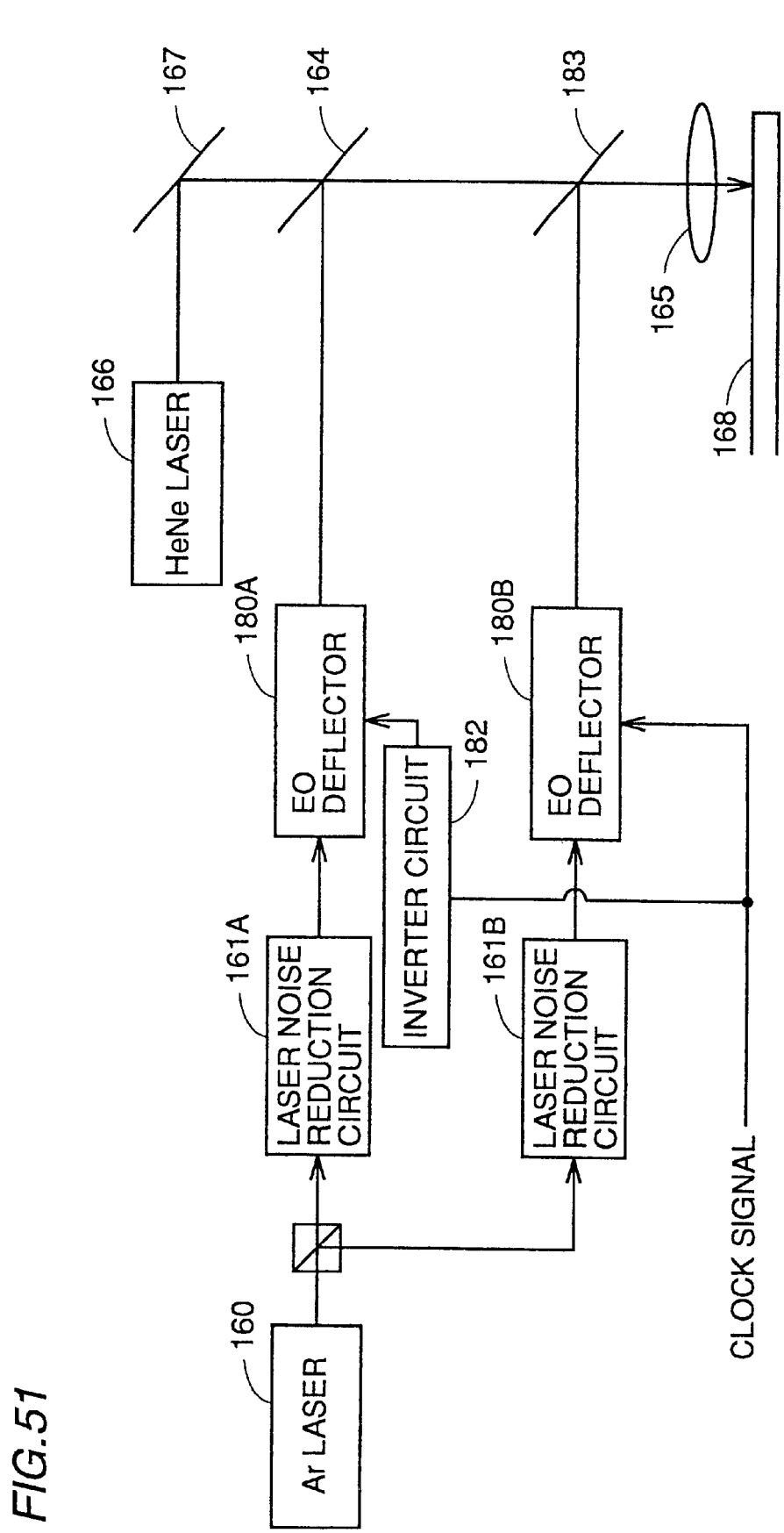
FIG. 51 is a block diagram showing a structure of a cutting device according to the embodiment 15 of the invention.

FIG. 51 shows another embodiment of the cutting device different from those in the foregoing embodiments 12 and 14.

As shown in FIG. 51, the cutting device has a structure similar to that of the cutting device shown in FIG. 49, but differs therefrom in that the device in FIG. 51 includes, in addition to a laser noise reduction circuit 161A and an EO deflector 180A, a laser noise reduction circuit 161B, an EO deflector 180B connected to laser noise reduction circuit 161B, a reflecting mirror 183 and an inverter circuit 182 inverting the supplied clock signal.

The cutting device splits the laser beam produced by argon laser 160 into two, which are used for the wobbles formed on one and the other sidewalls of groove 3, respectively.

One of EO deflectors 180B is supplied with a clock signal controlling movement of the laser beam in the tracking direction, and the other EO deflector 180A is supplied with a signal formed by inverting the clock signal by inverter circuit 182. Therefore, the laser beam issued from EO deflector 180A and the laser beam issued from EO deflector 180B move symmetrically with respect to the center of groove 3, and wobbles 37 shown in FIG. 37 are formed on the opposite sidewalls of groove 3, respectively.

Embodiment 16

Figure 52:
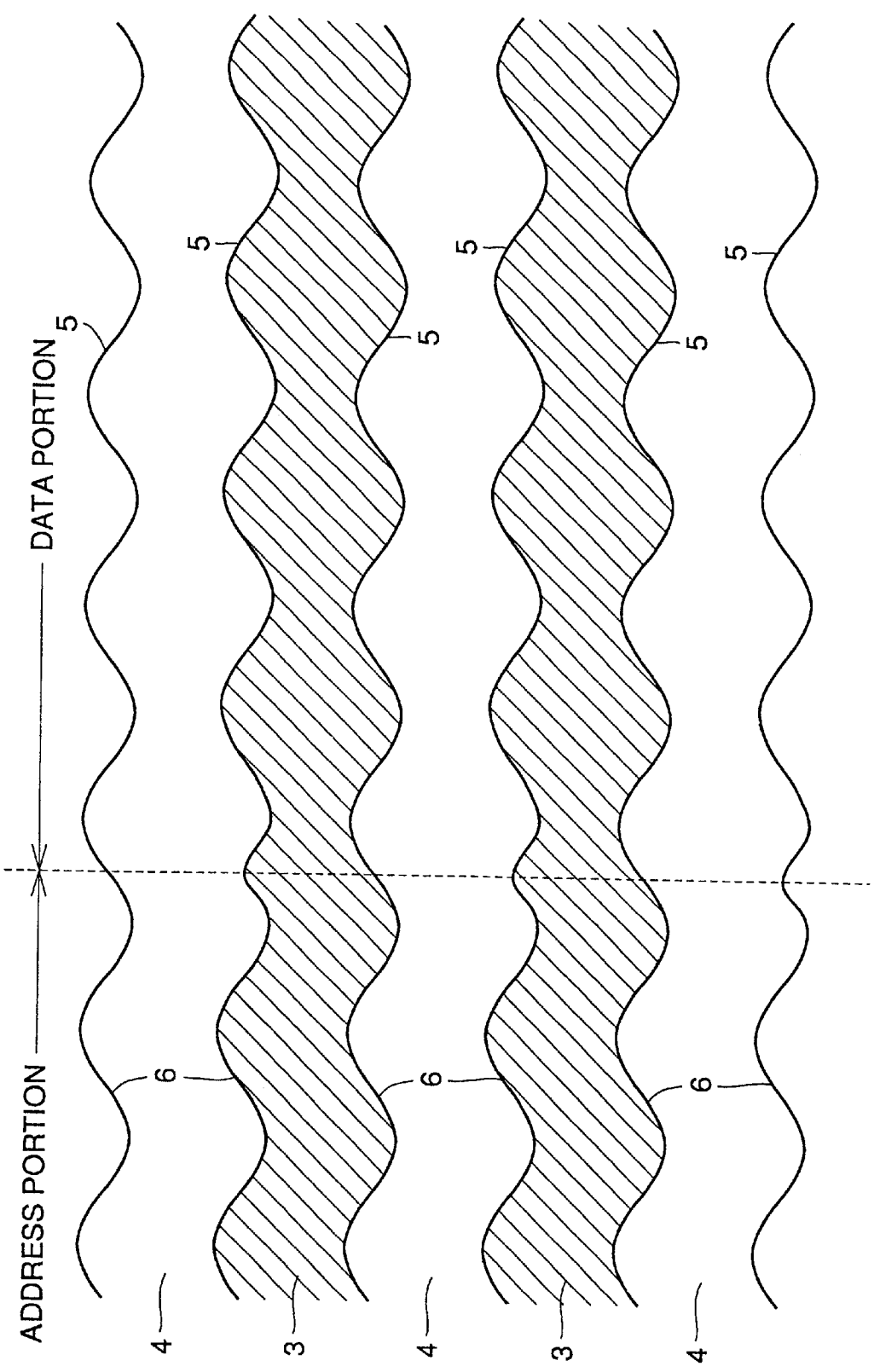
FIG. 52 is a plan showing a structure of a disk according to an embodiment 16.

FIG. 52 shows a planar structure of a disk according to an embodiment 16.

As shown in FIG. 52, the disk has the planar structure similar to that of the disk of the embodiment 12 shown in FIG. 38, but differs from the structure shown in FIG. 38 in that wobbles 6 of the same phase are formed on the opposite sidewalls of groove 3 in the address portion.

More specifically, the address portion stores, in the stagger method, the address which is recorded by wobbles 6 of the same phase in the biphase modulation method.

Embodiment 17

Figure 53:
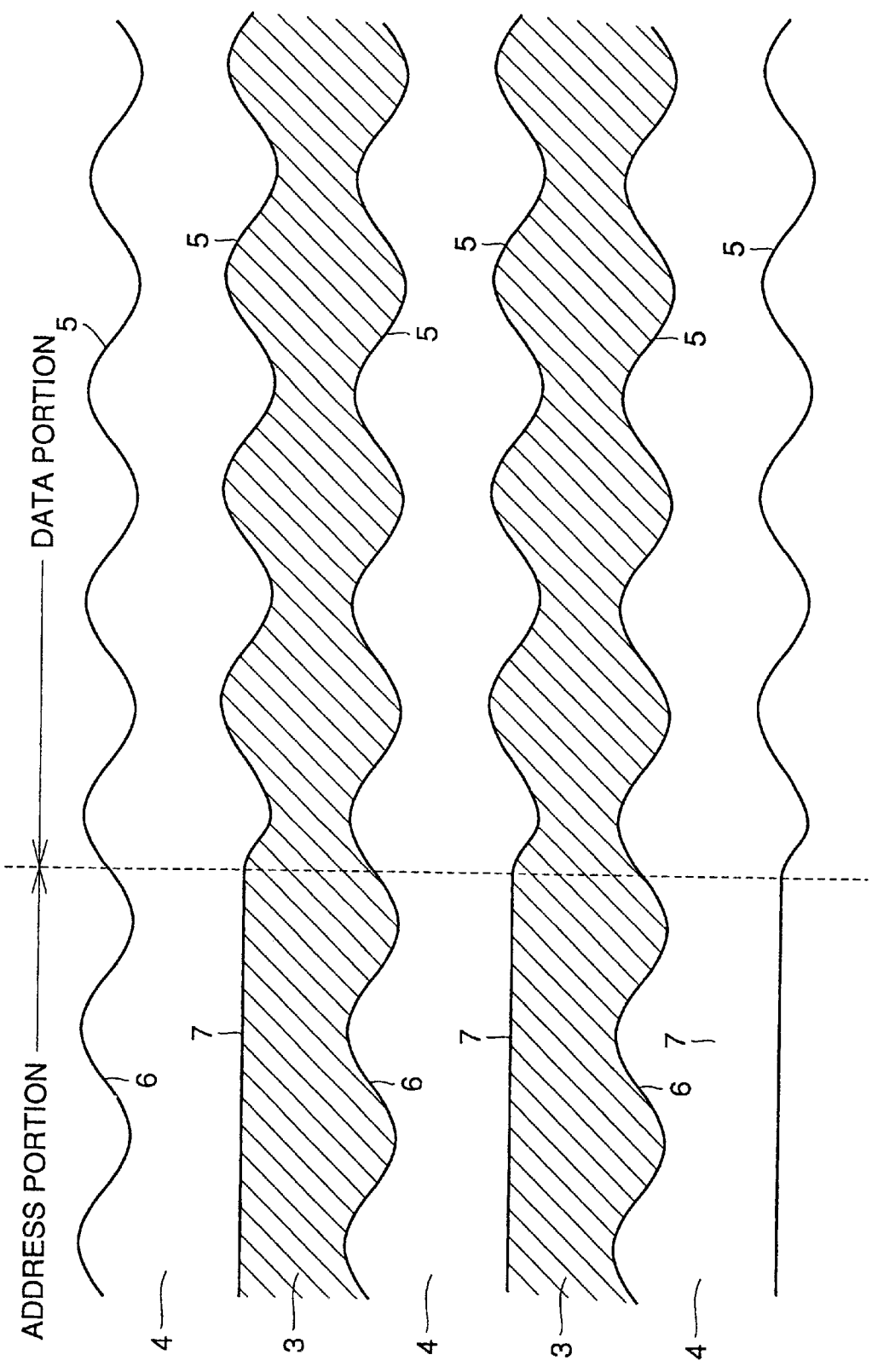
FIG. 53 is a plan showing a structure of a disk according to an embodiment 17 of the invention.

FIG. 53 shows a planar structure of a disk according to an embodiment 17.

As shown in FIG. 53, the disk has the planar structure similar to that of the disk of the embodiment 12 shown in FIG. 38, but differs therefrom in that one of the opposite sidewalls 7 of groove 3 is not wobbled in the address portion. In this disk, the addresses on land 4 and groove 3 are recorded by the wobble formed on the other sidewall 6 of groove 3 in the address portion. This can improve the record density of the address information.

Embodiment 18

Figure 54:
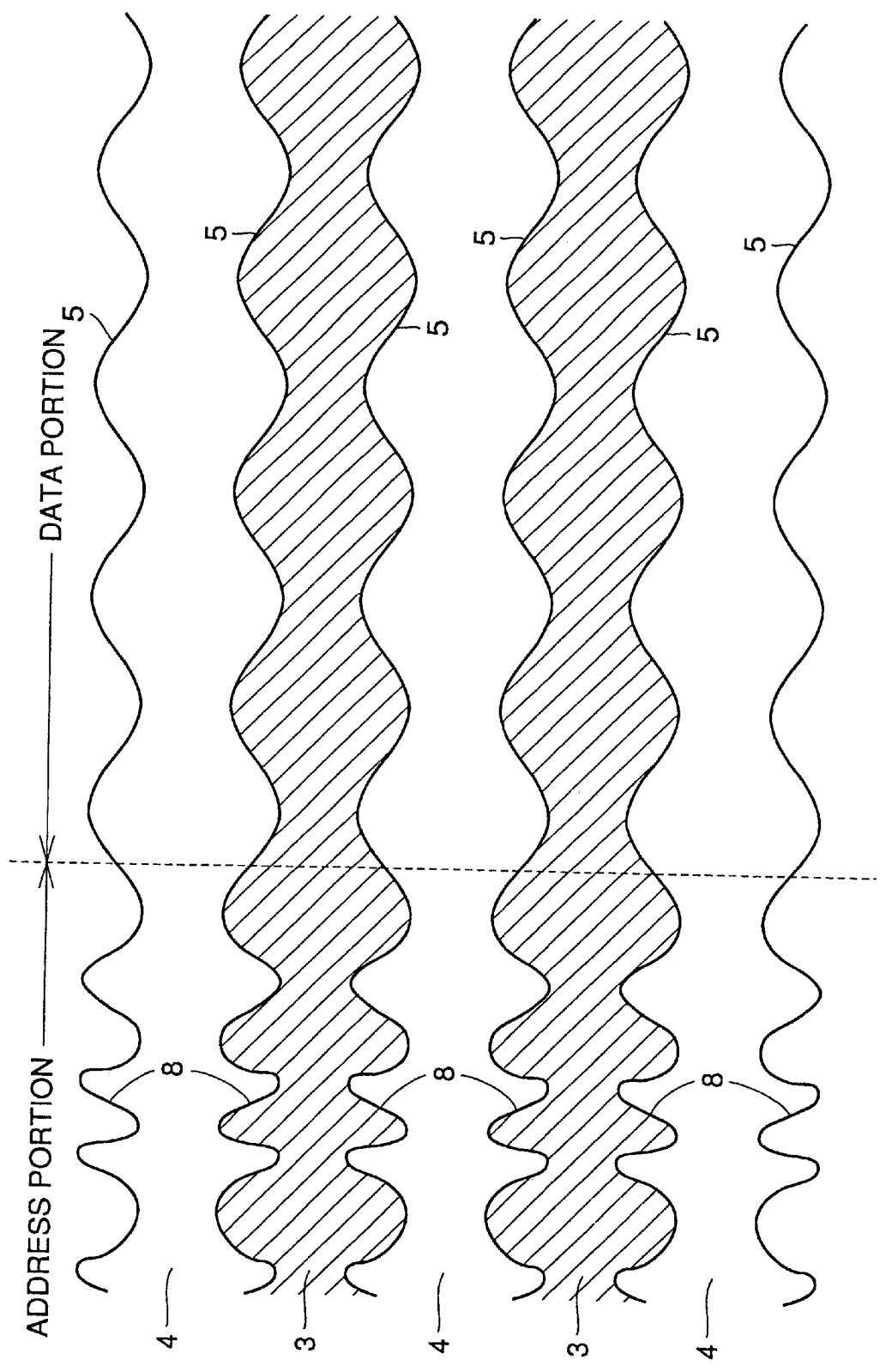
FIG. 54 is a plan showing a structure of a disk according to an embodiment 18 of the invention.

FIG. 54 shows a planar structure of a disk according to an embodiment 18.

As shown in FIG. 54, the disk has the planar structure similar to that of the disk of the embodiment 12 shown in FIG. 38, but differs therefrom in that frequency-modulated wobbles 8 which are symmetrical with respect to the center line of groove 3 are formed on the opposite sidewalls of groove 3 in the address portion, respectively.

Embodiment 19

Figure 55:
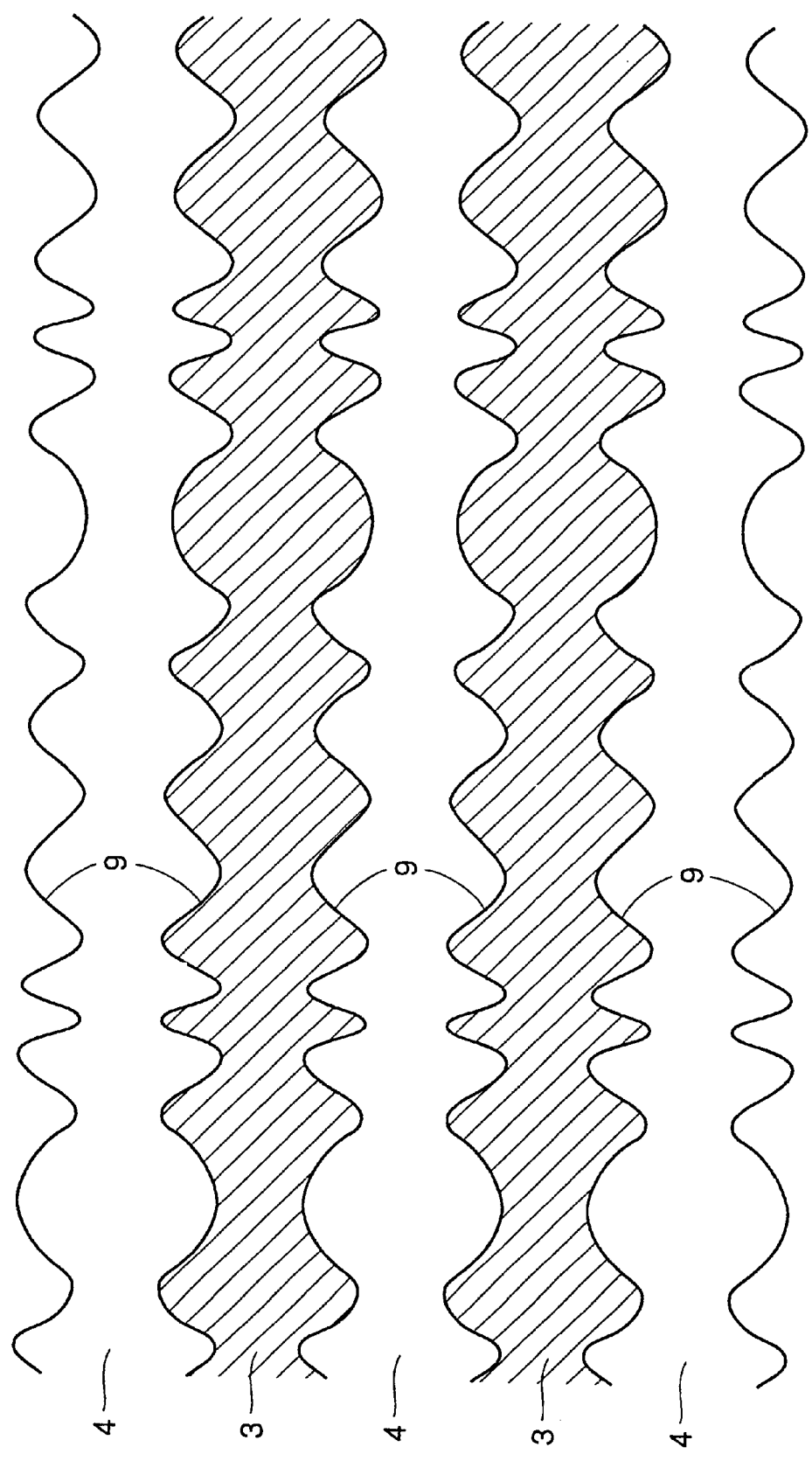
FIG. 55 is a plan showing a structure of a disk according to an embodiment 19 of the invention.

FIG. 55 shows a planar structure of the disk according to an embodiment 19.

In the disk shown in FIG. 55, frequency-modulated wobbles 9 which are based on the address and are symmetrical with respect to the center line of groove 3 are formed on the opposite sidewalls of groove 3 in the address and data portions, respectively.

In the disk having the above structure, recording of the address corresponding to the data recorded on the data portion is accomplished by wobbles 9.

Embodiment 20

Figure 56:
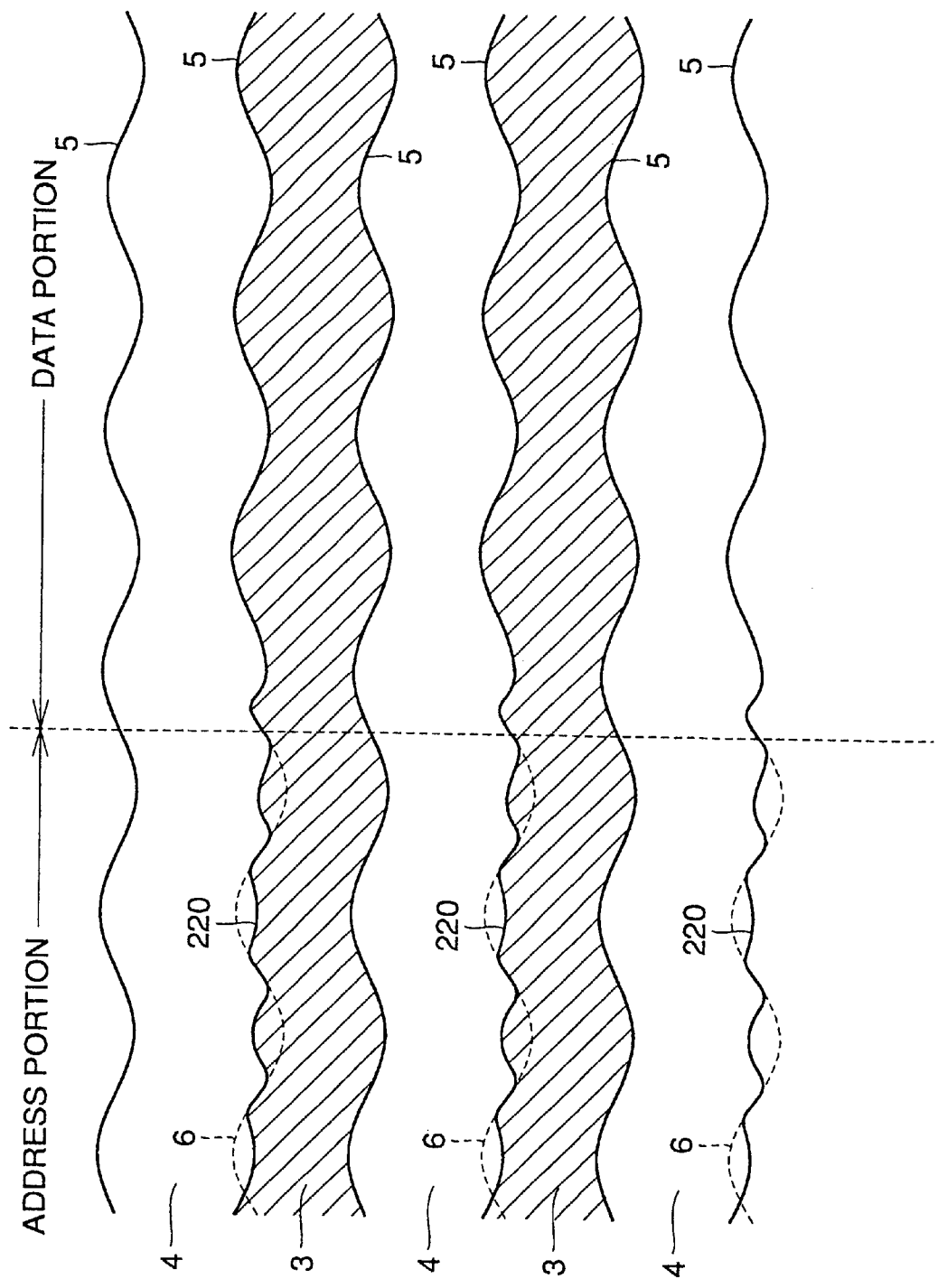
FIG. 56 is a plan showing a structure of a disk according to an embodiment 20 of the invention.

FIG. 56 shows a planar structure of a disk according to an embodiment 20.

As shown in FIG. 56, the disk has a structure similar to that shown in FIG. 52, but differs from the structure shown in FIG. 52 in that groove 3 in the address portion is provided at one of its sidewalls with a wobble 220 formed of a combination of wobble 6 having the same phase as wobble 5 as depicted by broken line and a wobble having a phase opposite to that of wobble 5 and superimposed on wobble 5.

This disk can achieve an effect similar to that of the disk according to the embodiment 12.

Embodiment 12

In a structure wherein wobbles 5 having opposite phases are formed on the opposite sidewalls of groove 3 in the data portion, respectively, it is possible to reduce the leak-in quantity of magneto-optical signals (data), which are reproduced from wobbles 5, in the reproduction characteristics. This is true when the tracking is performed on the center of groove 3. If the tracking is shifted from the center of groove 3, e.g., due to a tilt of the substrate and the beam sport moves closer to wobble 5 formed on the sidewall of groove 3, the leak-in occurs in the reproduction characteristics due to an influence by wobble 5.

Accordingly, it is necessary to provide a reproducing apparatus, which can remove the leak-in quantity from the reproduction characteristic in the disk provided at the data portion with wobbles 5 of the mutually opposite phases.

FIGS. 57A–57D show a relationship between the position of laser light applied to groove 3 and the data reproduction signal obtained thereby.

Figure 57:
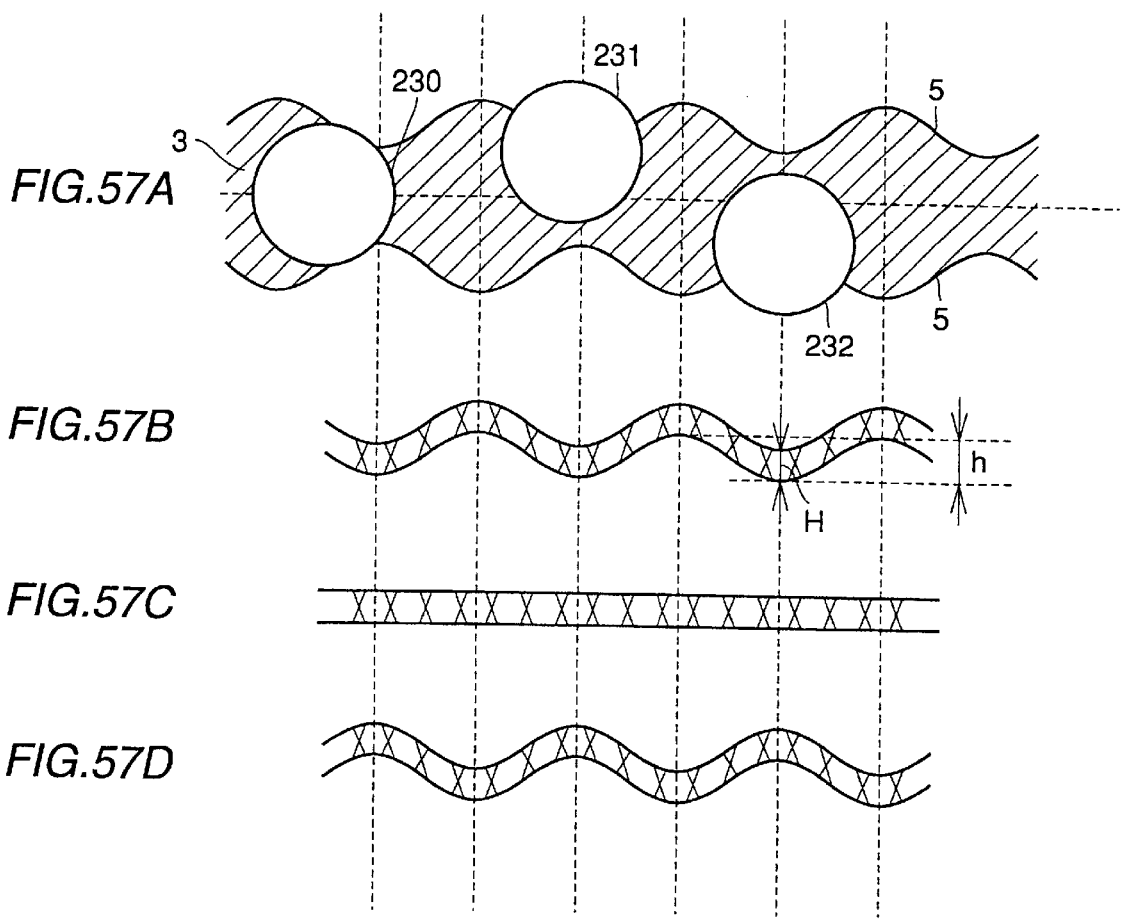
FIGS. 57A–57D show a relationship between positions of applied laser light on grooves and an obtained data reproduction signal.

When the laser light is applied onto the center line of groove 3 and thus forms a beam spot 230 as shown in FIG. 57A, a data reproduction signal shown in FIG. 57C is obtained. Although data reproduction signals have a high frequency, FIGS. 57B–57D show envelopes of such data reproduction signals, respectively.

When the laser light is applied to a position shifted upward in the figure from the center line of groove 3 and thus forms a beam spot 231, the data reproduction signal has an envelope shown in FIG. 57B. When the laser light forms a laser beam sport 232, the data reproduction signal has an envelope shown in FIG. 57D. The waveform of the envelope shown in FIG. 57D is shifted by a half cycle from the waveform of the envelope shown in FIG. 57B. When the data reproduction signals having the envelopes shown in FIGS. 57B and 57D are produced, respectively, the leak-in quantity in the reproduction characteristics is detected as (h/2)/H where H and h/2 represent a width and an amplitude of the envelope, respectively. It can be understood from the above that the leak-in quantity can be removed by tracking the center of groove 3 with the laser light.

FIGS. 58A–58F show a tracking control method for removing the leak-in quantity.

Figure 58:
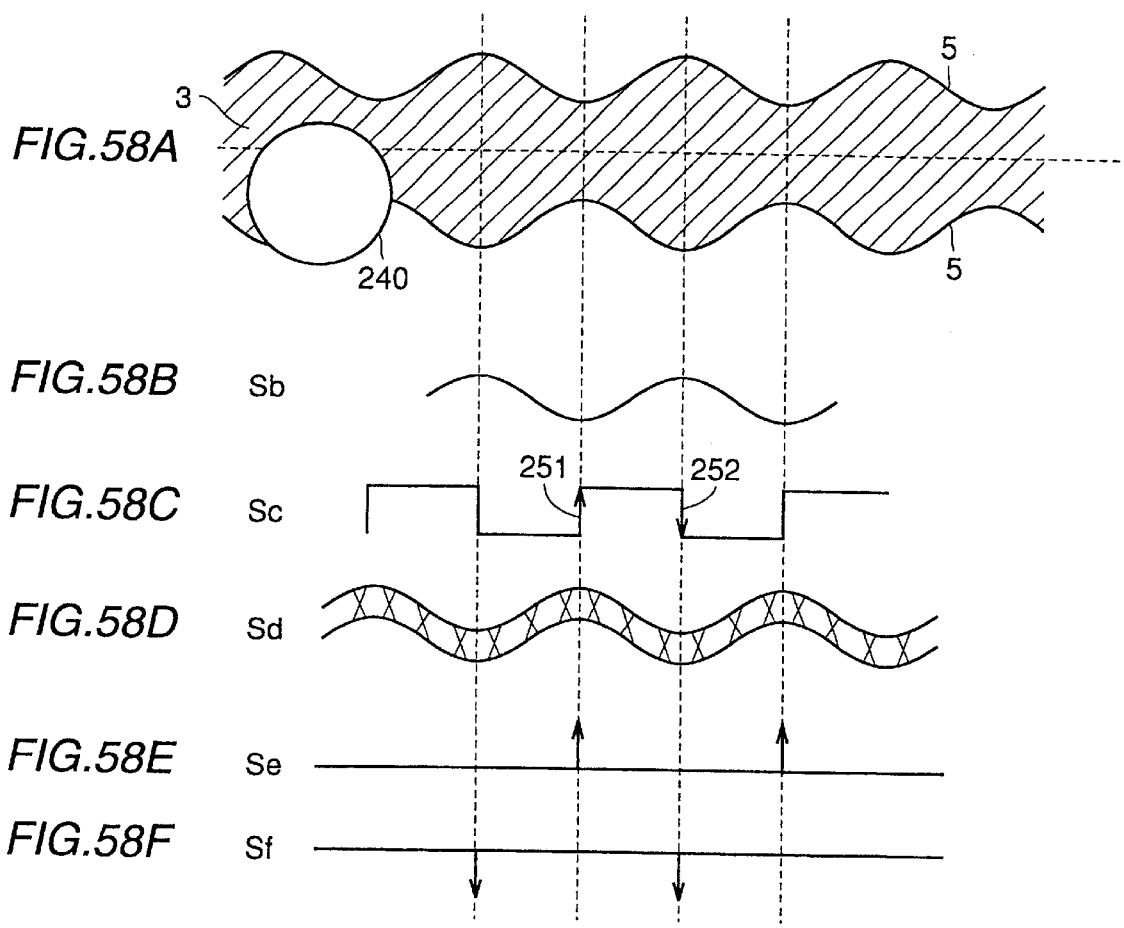
FIGS. 58A–58F show a tracking control method for removing a leak-in quantity.

When the emitted laser light forms a spot 240 at a position shown in FIG. 58A, a data reproduction signal Sd has an envelope shown in FIG. 58D. A reproduced signal Sb obtained from wobbles 5 formed on the opposite sidewalls of groove 3 have a waveform shown in FIG. 58B. When the wobble waveform shown in FIG. 58B is converted into a binary form by a comparator, a rectangular wave Sc shown in FIG. 58C is obtained.

Differences are obtained between magnitudes of data reproduction signal Sd, which has the envelope shown in FIG. 58D, at rising 251 of rectangular wave Sc shown in FIG. 58E and magnitudes of the same at falling 252 of rectangular wave Sc shown in FIG. 58F, and a signal is produced by subtracting a signal corresponding to this differences from the tracking signal. By using the signal thus produced as a new tracking signal, the laser light can track the center of groove 3.

The above difference in magnitude of data reproduction signal Sd having the above envelope increases in proportion to an amount of shift of the position of laser light on groove 3 from the center line of groove 3. Therefore, by correcting the tracking signal in accordance with this amount of shift, tracking on the center line of groove 3 can be performed.

Figure 59:
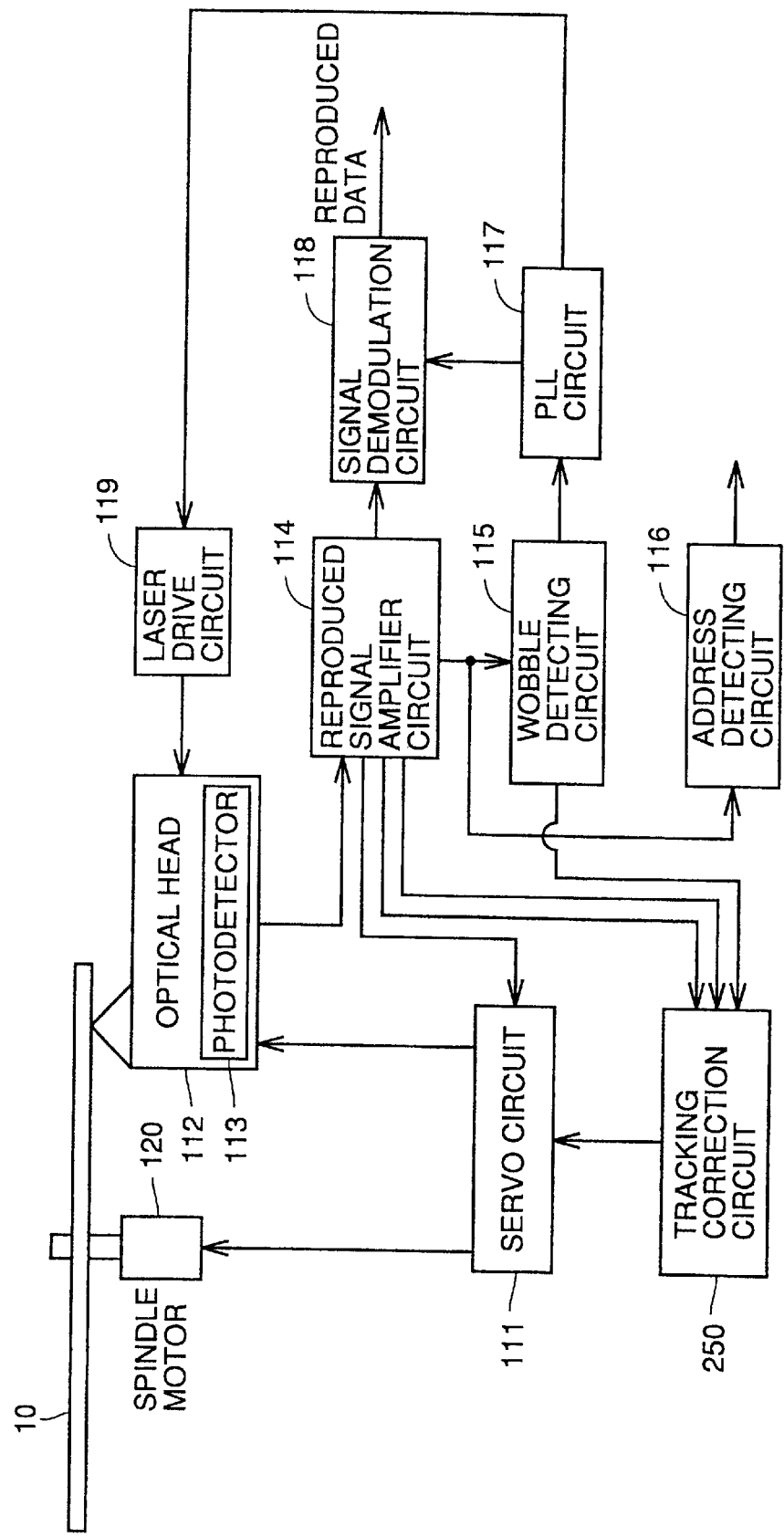
FIG. 59 is a block diagram showing a structure of a reproducing apparatus according to an embodiment 21 of the invention.

FIG. 59 is a block diagram showing a whole structure of the reproducing apparatus which removes the leak-in quantity in the foregoing method.

As shown in FIG. 59, the reproducing apparatus has a structure similar to that shown in FIG. 44, but differs therefrom in that the apparatus in FIG. 59 further includes a tracking correction circuit 250 supplying the tracking signal to servo circuit 111.

An operation of the reproducing apparatus will now be described below. The reproduced signal detected by photodetector 113 included in optical head 112 is supplied to reproduced signal amplifier circuit 118. A signal, which is included in this reproduced signal and is reproduced from a magneto-optical signal, is supplied to signal demodulating circuit 118 and tracking correction circuit 250, and further the tracking error signal is supplied to tracking correction circuit 250. Further, the focus error signal included in the above reproduced signal is supplied to servo circuit 111 and is used for focusing of an objective lens (not shown) included in optical head 112. A signal which is included in the reproduced signal and is reproduced from the wobbles formed on the opposite sidewalls of groove 3 is supplied to wobble detecting circuit 115. Wobble detecting circuit 115 detects reproduced signal Sb obtained from wobbles 5 shown in FIG. 58B, and reproduced signal Sb obtained from wobbles 5 is supplied to tracking correction circuit 250. Tracking correction circuit 250, which received the reproduced signal of the magneto-optical signal and reproduced signal Sb of wobble 5, detects a shift amount of the tracking from these received signal, and corrects the tracking error signal in accordance with the detected shift amount.

The tracking error signal thus corrected is supplied to servo circuit 111, and is used for tracking of the objective lens included in optical head 112.

Figure 60:
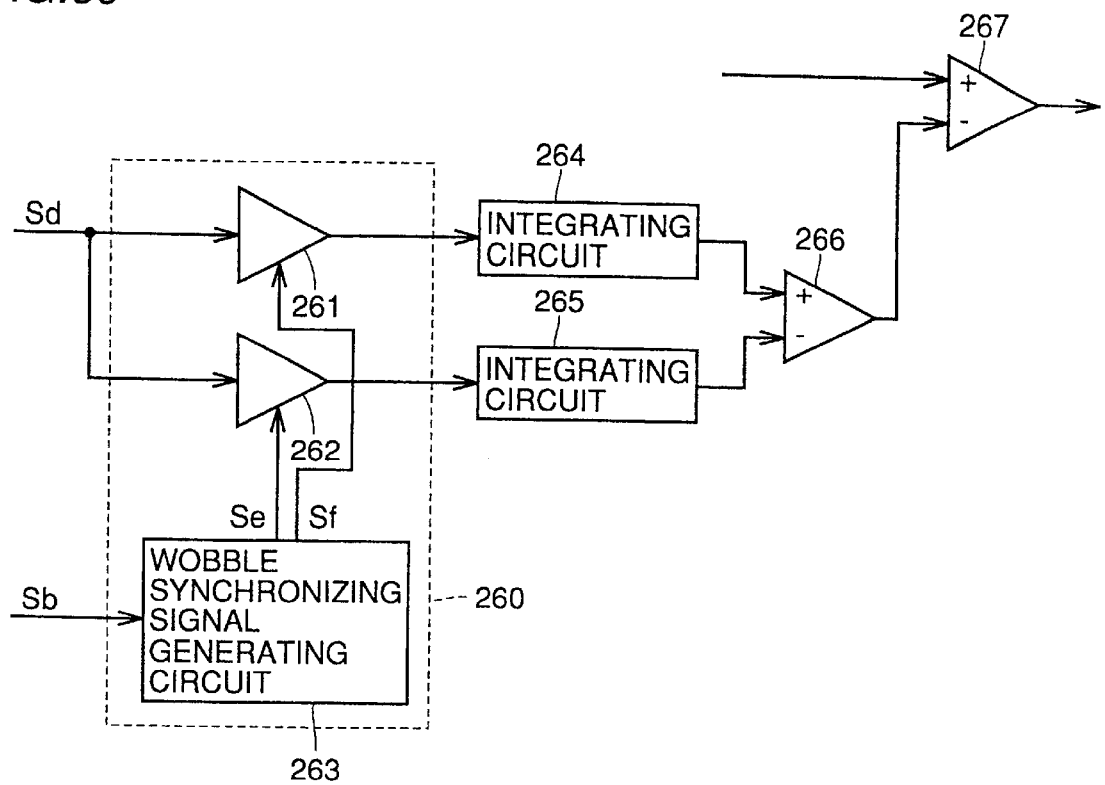
FIG. 60 shows a structure of a tracking correction circuit shown in FIG. 59.

FIG. 60 shows a structure of tracking correction circuit 250. As shown in FIG. 60, tracking correction circuit 250 includes a synchronous detector circuit 260, integrating circuits 264 and 265 connected to synchronous detector 260, a subtracter 266 connected to integrating circuits 264 and 265, and a subtracter 267 connected to subtracter 266.

Synchronous detector circuit 260 includes sample hold circuits 261 and 262, and a wobble-synchronized signal generating circuit 263.

An operation of tracking correction circuit 250 will now be described below. Data reproduction signal Sd shown in FIG. 58D is supplied to sample hold circuits 261 and 262 included in synchronous detector circuit 260.

In wobble-synchronized signal generating circuit 263, reproduced signal Sb of wobble 5, which is shown in FIG. 58B and is supplied thereto, is processed by a comparator to produce rectangular wave Sb shown in FIG. 58C. From rectangular wave Sc, a first timing signal Se in FIG. 58E, which is synchronized with the rising, is produced and supplied to sample hold circuit 262, and second timing signal Sf in FIG. 58F, which is synchronized with the falling, is produced and supplied to sample hold circuit 261. Sample hold circuit 261 detects the magnitude of data reproduction signal Sd, which is supplied from reproduced signal amplifier circuit 114, in synchronization with second timing signal Sf supplied from wobble-synchronized signal generating circuit 263, and holds the value of the detected magnitude for supplying the same to integrating circuit 264. Likewise, sample hold circuit 262 detects the magnitude of data reproduction signal Sd, which is supplied from reproduced signal amplifier circuit 114, in synchronization with first timing signal Se supplied from wobble-synchronized signal generating circuit 263, and holds the value of the detected magnitude for supplying the same to integrating circuit 265.

Integrating circuits 264 and 265 integrate the supplied values, and supply signals representing results of the integration to subtracter 266. Subtracter 266 obtains a difference between integration values supplied from integrating circuits 264 and 265, and supplies the result to a negative (−) terminal of subtracter 267. Subtracter 267 receives on its positive (+) terminal the tracking signal used for tracking, and subtracts the above difference between the integration values, i.e., an oscillation width of data reproduction signal Sd from the tracking signal. The result of this subtraction is issues, as the corrected tracking signal, to servo circuit 111. Thereby, the shift in tracking can be corrected so that leaking into data reproduction signal Sd can be removed.

Figure 61:
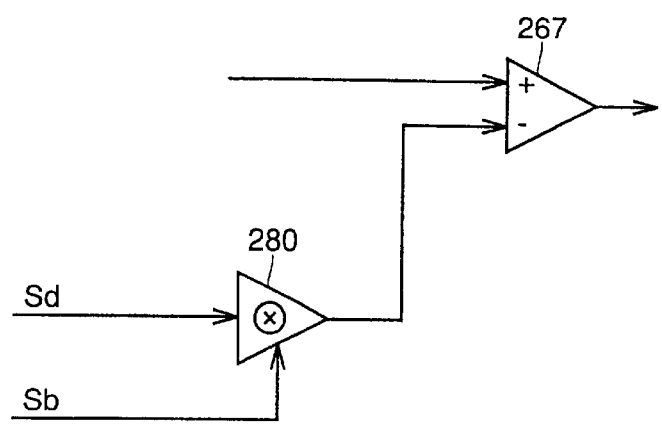
FIG. 61 shows another example of a structure of the tracking correction circuit shown in FIG. 59.
Figure 62:
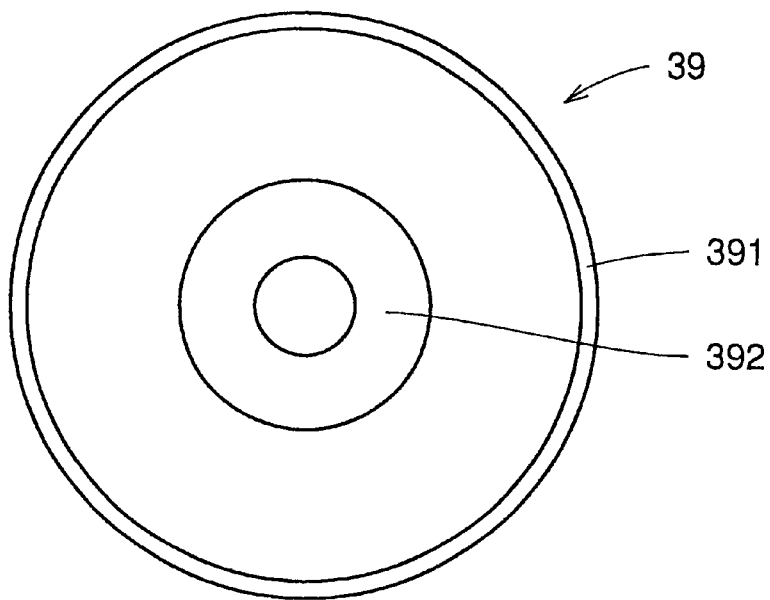
FIG. 62 is a plan showing a structure of a disk according to an embodiment 22 of the invention.

Tracking correction circuit 250 may have a structure shown in FIG. 61. Tracking correction circuit 250 in FIG. 61 includes a multiplier 280 and subtracter 267.

Multiplier 280 receives reproduced signal Sb of wobble 5 shown in FIG. 58B and data reproduction signal Sd shown in FIG. 58D, and issues a result of multiplication of these signals to the negative terminal of subtracter 267.

Subtracter 267 subtracts the above result of subtraction from the tacking signal received on its positive terminal, and issues the result, as the corrected tracking signal, to servo circuit 111.

According to tracking correction circuit 250 described above, the tracking signal is always corrected by the detected data reproduction signal, and the tracking control is performed based on the corrected tracking signal. Therefore, leak-in does not occur in the detected reproduced signal.

Embodiment 22

An embodiment 22 will now be discussed in connection with a disk and circuits for removing leak-in which may occur in the reproduction characteristics of magneto-optical signals due to wobbles formed on the sidewalls of wobble 3.

A disk 39 according to the embodiment 22 is provided at its inner and outer peripheral portions 392 and 391 with TOC regions, respectively. Information relating to the leak-in quantity is recorded on both or either the TOC regions formed on inner and outer regions 392 and 391, and this information is detected during reproduction for removing the leak-in from the reproduced signal.

Figure 63:
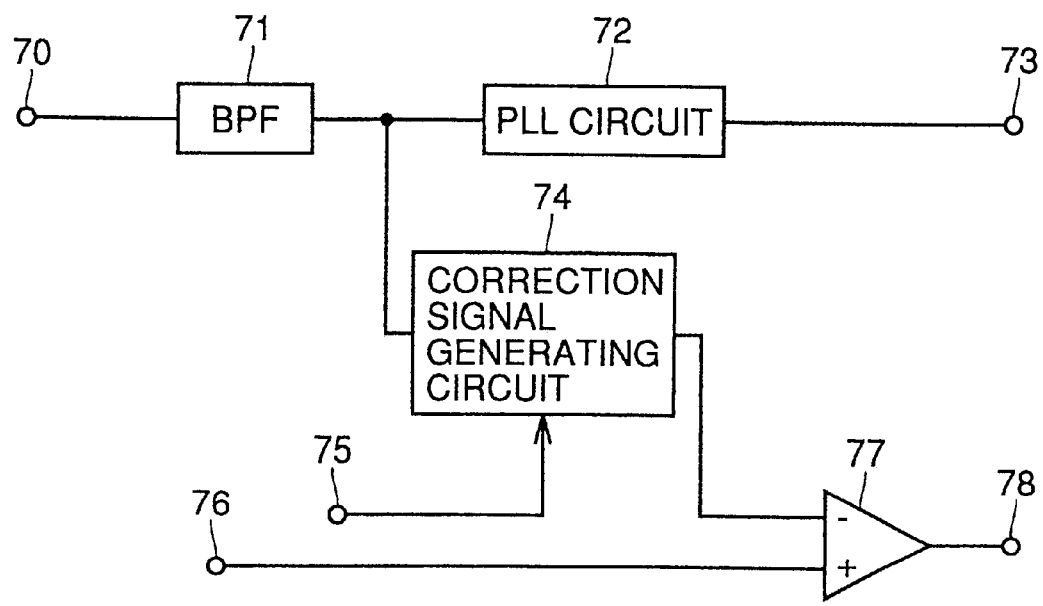
FIG. 63 shows a structure of a leak-in removing circuit according to the embodiment 22.

FIG. 63 shows a structure of a circuit removing the leak-in. A reproduced signal supplied to terminal 70 passes through a band-pass filter (BPF) 71 for removing noises, and then is supplied to a PLL circuit 72 and a correction signal generating circuit 74. PLL circuit 72 is supplied with the wobble signal shown in FIG. 64A, and produces a synchronizing signal.

This synchronizing signal is supplied through a terminal 73 to a laser drive circuit and a demodulator (not shown) for reproducing the magneto-optical signal in synchronization with the synchronizing signal.

Figure 64A:
FIGS. 64A–64C are waveform diagrams showing an operation of the circuit shown in FIG. 63.
Figure 64B:
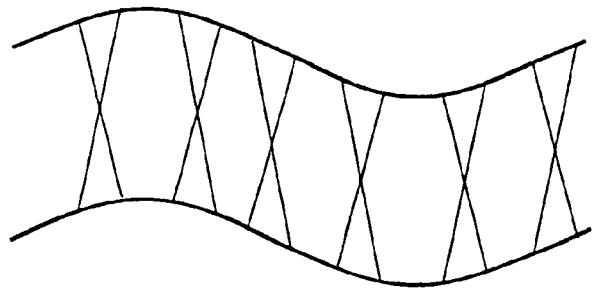

Correcting signal generating circuit 74 receives from a terminal 75 the information, which relates to the leak-in quantity and is recorded on the TOC region of disk 39, and corrects the wobble signal shown in FIG. 64A based on the received information so that the phase and amplitude of the wobble signal in FIG. 64A may be equal to those of the wobble waveform of the magneto-optical signal shown in FIG. 64B. The wobble signal thus corrected is supplied to a negative terminal of a subtracter 77. From a terminal 76, subtracter 77 receives on its positive terminal a magneto-optical signal on which the wobble waveform shown in FIG. 64B is superimposed.

Figure 64C:
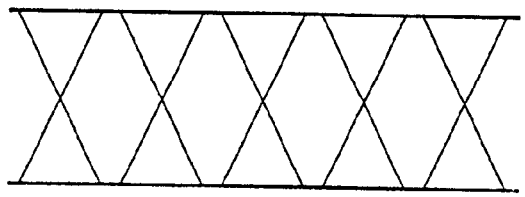

Subtracter 77 subtracts the corrected wobble signal from the magneto-optical signal shown in FIG. 64B, and thereby produces a signal shown in FIG. 64C. The signal thus produced is supplied to a demodulator, and will be taken out as the data reproduction signal after predetermined demodulation.

In this manner, it is possible to remove the leak into the reproduced signal due to the wobble formed on the sidewall of groove 3.

Embodiment 23

In this embodiment, the correction quantity to be changed is determined based on the correction quantity recorded on the TOC region of disk 39, and the error rate of the reproduced signal with respect to the respective changed correction quantities is detected. The correction quantity minimizing the error rate is determined, and the signal corresponding to the determined correction quantity is obtained as the reproduced signal.

Figure 65:
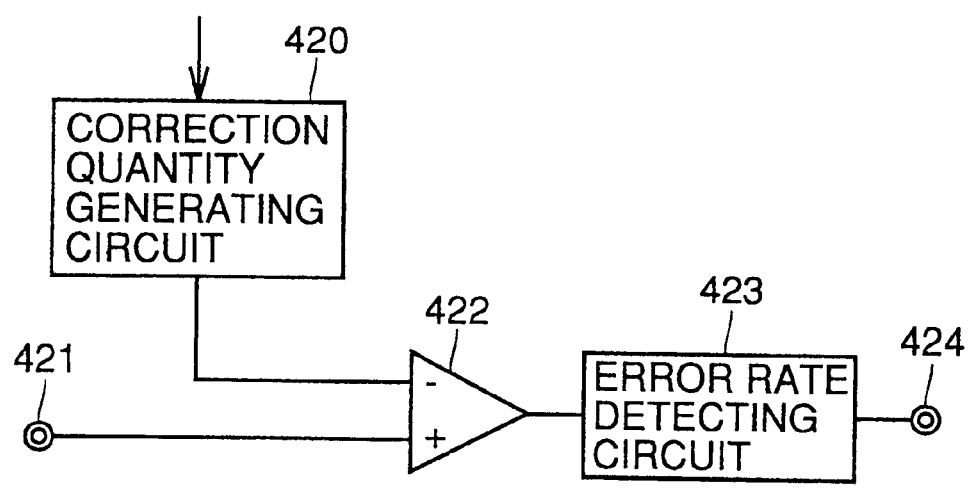
FIG. 65 shows a structure of a leak-in removing circuit according to an embodiment 23 of the invention.

FIG. 65 shows a structure of a leak-in removing circuit according to this embodiment. A correction quantity generating circuit 420 is supplied with a correction quantity based on the information reproduced from the TOC region, and a range of the correction quantity to be changed is determined based on the supplied correction quantity. Also, a subtracter 442 receives the reproduced signal from a terminal 421, and subtracts the respective correction quantities, which are determined by correction quantity generating circuit 420, from the reproduced signal.

Figure 66:
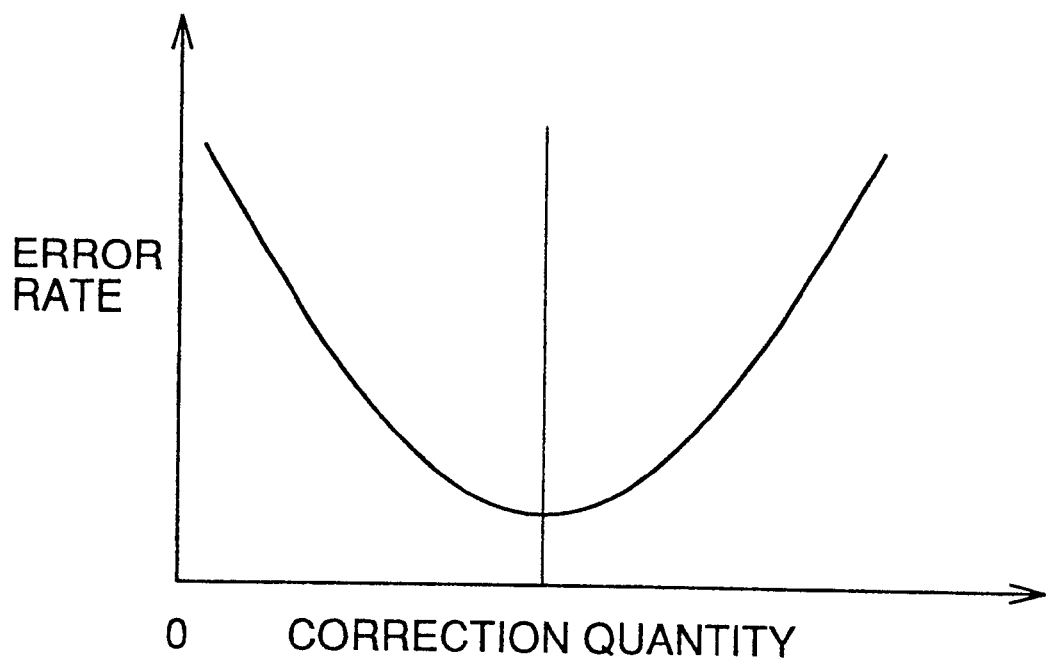
FIG. 66 is a graph showing an operation of the circuit shown in FIG. 65.

The result of subtraction is sent to an error rate detecting circuit 423, which detects the error rates for the respective correction quantities. The error rate with respect to the correction quantity has a relationship having a minimum point as shown in FIG. 66. Therefore, error rate detecting circuit 423 determines the correction quantity minimizing the error rate, and issues the reproduced signal corresponding to the determined correction quantity from a terminal 424. In this case, a range of change of the correction quantity is 0.2 to 3 times larger than the correction quantity.

Embodiment 24

Figure 67:
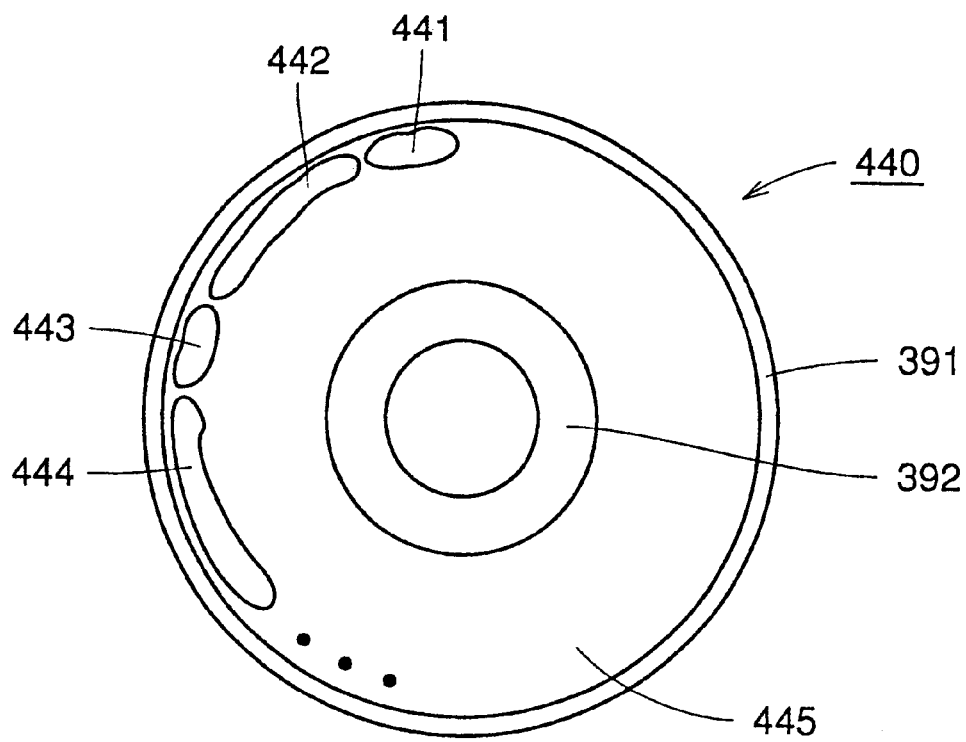
FIG. 67 is a plan showing a structure of a disk according to an embodiment 24 of the invention.

FIG. 67 shows a planar structure of a disk 440 according to the embodiment. As shown in FIG. 67, disk 440 has TOC regions on inner and outer peripheral portions 392 and 391, and a signal record region 445 is provided with regions 441 and 443, which store information relating to the reproduction signals and will be referred to as "specific regions" hereinafter, as well as signal regions 442 and 444 which are related to specific regions 441 and 443, respectively.

In each of specific regions 441 and 443, one of signals [11111 . . . ], [00000 . . . ] and [1010101 . . . ] is recorded, and will be reproduced prior to reproduction of the data signal. Since these signals are recorded by regularly arranging the directions of magnetic domains, reproduction of these signals provide signals equivalent to reproduced signals obtained in the case where data is not recorded. Thus, the reproduction provides the reproduced signal having only the component which is based on the wobble formed on the side wall of groove 3. Accordingly, the leak-in quantity can be removed by subtracting the above signal from the reproduced signal.

Figure 68:
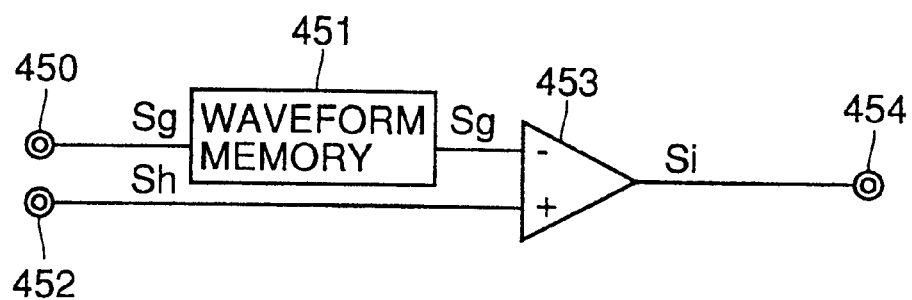
FIG. 68 shows a structure of a leak-in removing circuit according to an embodiment 25 of the invention.

FIG. 68 shows a structure of the leak-in removing circuit according to this embodiment.

A reproduced signal Sg, which is shown in FIG. 69A and is obtained from one of the signals [11111 . . . ], [00000 . . . ] and [1010101 . . . ], is sent to a waveform memory 451 through a terminal 450, and is stored therein.

From a terminal 452, a reproduced signal Sh shown in FIG. 69B is sent to a positive terminal of a subtracter 453 and, in synchronization with this, reproduced signal Sg shown in FIG. 69A is sent from waveform memory 451 to a negative terminal of subtracter 453. Subtracter subtracts reproduced signal Sg shown in FIG. 69A from reproduced signal Sh shown in FIG. 69B, and sends to a terminal 454 a signal Si which contains no leak-in and is shown in FIG. 69C. This signal is supplied to a demodulator for obtaining the data reproduction signal.

In the above case, the leak-in quantity is detected by recording the signals [11111 . . . ], [00000 . . . ] and [1010101 . . . ]. Alternatively, the leak-in quantity can likewise be detected if the reproduction layer of the disk is magnetized in a single direction by a magnetic head or the like applying an external magnetic field.

Embodiment 25

FIG. 70 shows a structure of a leak-in removing circuit according to an embodiment 25.

Figure 71:
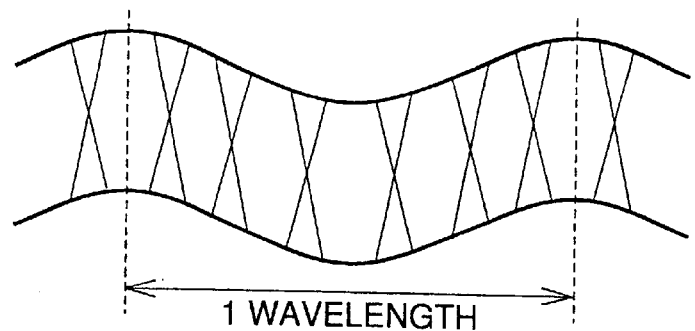
FIG. 71 is a waveform diagram showing an operation of the circuit shown in FIG. 70.

A reproduced signal supplied through a terminal 470 is A/D-converted by an A/D converter 471, and then is supplied to a subtracter 475 and a synchronous detection circuit 472. Synchronous detection circuit 472 detects a reproduced signal of a wobble waveform shown in FIG. 71 from the supplied reproduced signal, and sends the same to an adder 473. Adder 473 performs additions of the reproduced signal corresponding to one wavelength. The additions are performed appropriate times, which are in a range from 100 times to 10000 times. Further, adder 473 obtains an average from the result of addition, and supplies the average to a waveform memory 474. As already described, the A/D-converted reproduced signal is sent to the positive terminal of subtracter 475 and, in synchronization with this, the averaged signal is sent from waveform memory 474 to a negative terminal thereof. Subtracter 475 removes the leak-in by subtracting the averaged signal from the received reproduced signal.

Embodiment 26

FIGS. 72A–72D are waveform diagrams showing a principle of removing the leak-in according to an embodiment 26.

Figure 72A:
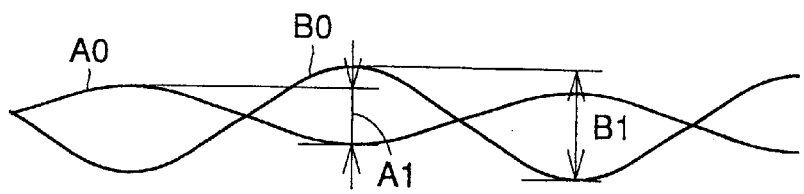
FIGS. 72A–72D are waveform diagrams showing a principle of a leak-in removing method according to an embodiment 26 of the invention.
Figure 72B:
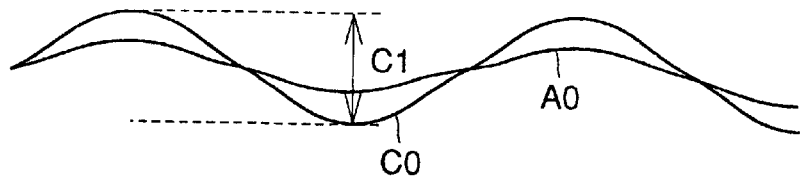
Figure 72C:
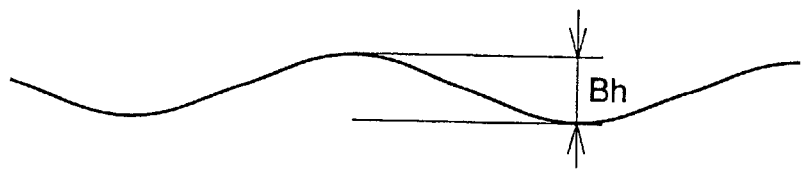

A waveform B0 shown in FIG. 72A represents a signal of 4 bytes, and a waveform C0 shown in FIG. 72B represents a signal of following 4 bytes. A waveform A0 shown in FIGS. 72A and 72B represents a wobble waveform caused by the wobble formed on the sidewall of groove 3. A waveform shown in FIG. 72C is obtained by subtracting waveform A0 from waveform B0 shown in FIG. 72A.

Figure 72D:
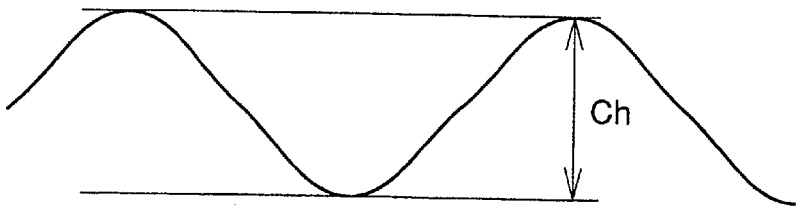

A waveform shown in FIG. 72D is obtained by adding waveform A0 to waveform C0 shown in FIG. 72B. It is assumed that A1 is double the amplitude of waveform A0 (double the amplitude will be referred to as a "total amplitude" hereinafter), and B1 and C1 represent total amplitudes of waveforms B0 and C0, respectively. It is also assumed that the waveform shown in FIG. 72C has a total amplitude of Bh, and the waveform shown in FIG. 72D has a total amplitude of Ch. In this case, a total amplitude A1 of the wobble waveform can be accurately obtained from a formula of (Ch−Bh)/2=[(C1+A1)−(B1−A1)]/2=A1, where C1=B1. Therefore, by obtaining a difference with respect to total amplitude B1 or C1 which is obtained from waveform B0 or C0 shown in FIGS. 72A or 72B, it is possible to obtain the total amplitude of the reproduced signal from which the leak-in quantity is removed.

Embodiment 27

Figure 73:
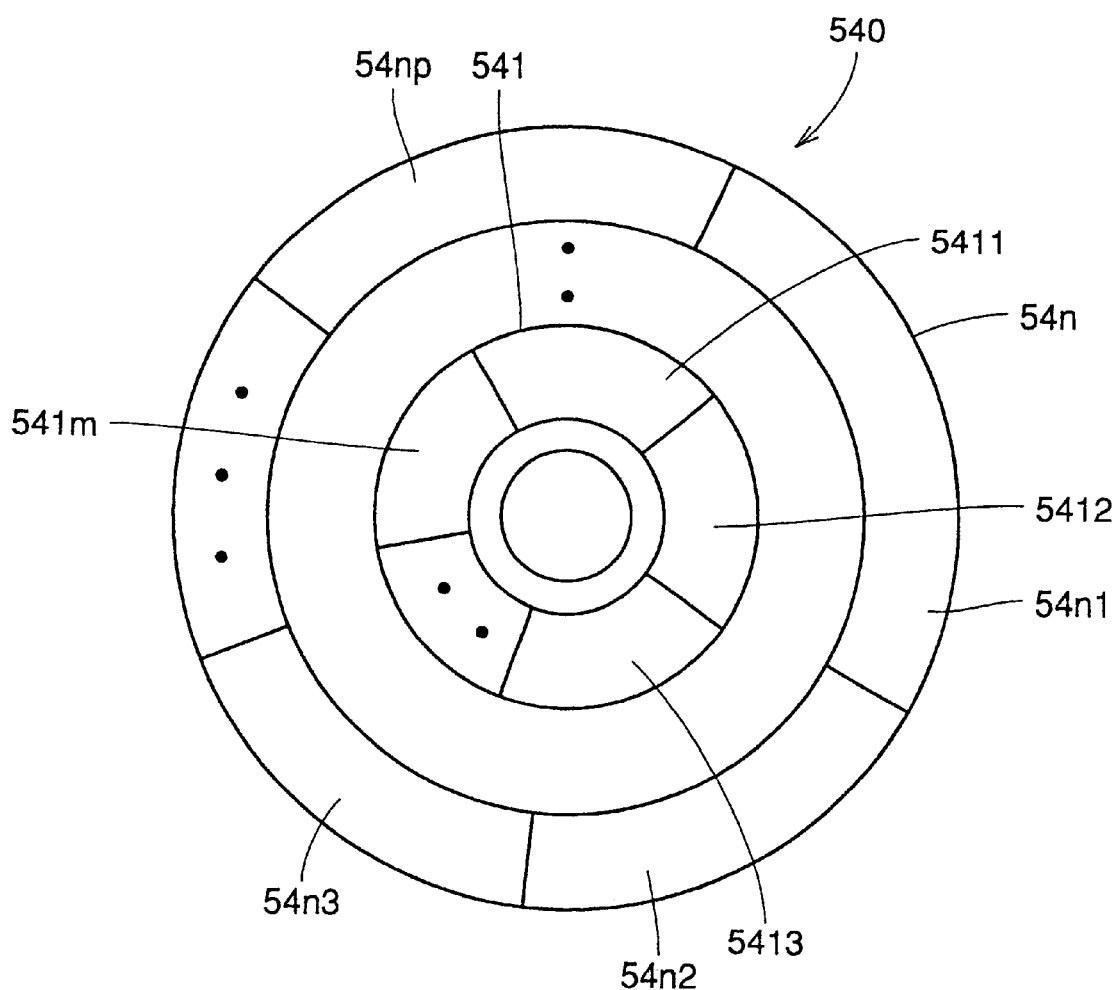
FIG. 73 is a plan showing a structure of a disk according to an embodiment 27 of the invention.

FIG. 73 shows a planar structure of a disk according to an embodiment 27. As shown in FIG. 73, a disk 540 is divided into zones 541, . . . and 54n, which are n in number and arranged in this order from the radially inner portion to the radially outer portion. Radially inner zone 541 includes m sectors 5411, 5412, 5413, . . . and 541m. Radially outer zone 54n includes p sectors 54n1, 54n2, 54n3, and 54np.

The numbers of sectors included in the respective zones may not be equal to each other, and are determined to maximize an information record density.

Figure 74:
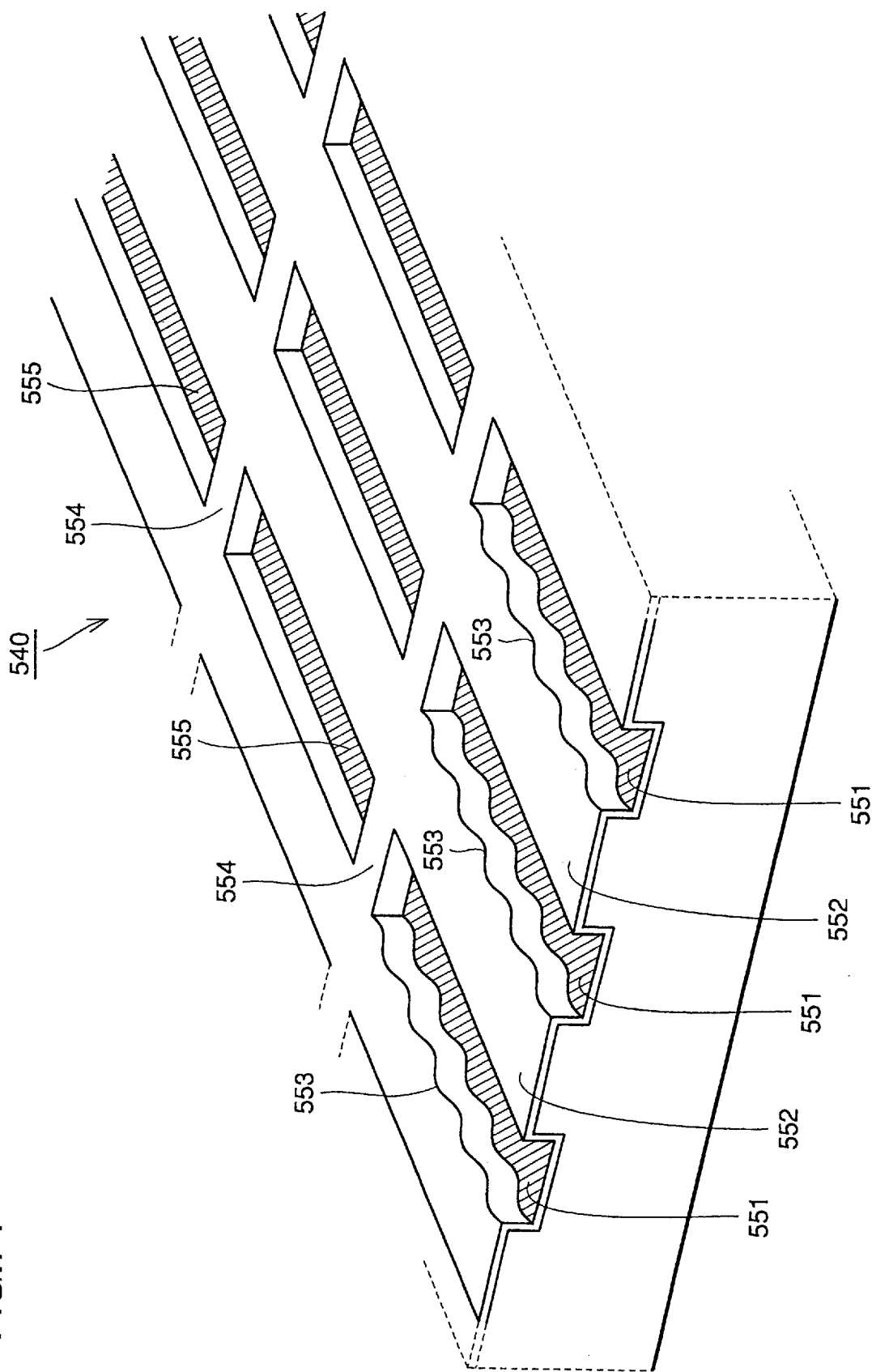
FIG. 74 is a perspective view of the structure of the disk according to the embodiment 27.

FIG. 74 is a perspective view of a structure of disk 540 according to this embodiment. As shown in FIG. 74, disk 540 includes grooves 551 each provided at one of its sidewalls with a wobble 553, regions 554 which neighbor to grooves 551 and are not provided with grooves 551 and 555, grooves 555 each having opposite sidewalls which are not wobbled, and lands 552. Regions 554 and grooves 555 are alternately formed in an area following grooves 551.

In land 552, therefore, a portion having the opposite sidewalls which are not wobbled extends from a portion provided at one of its sidewalls with wobble 553.

Figure 75:
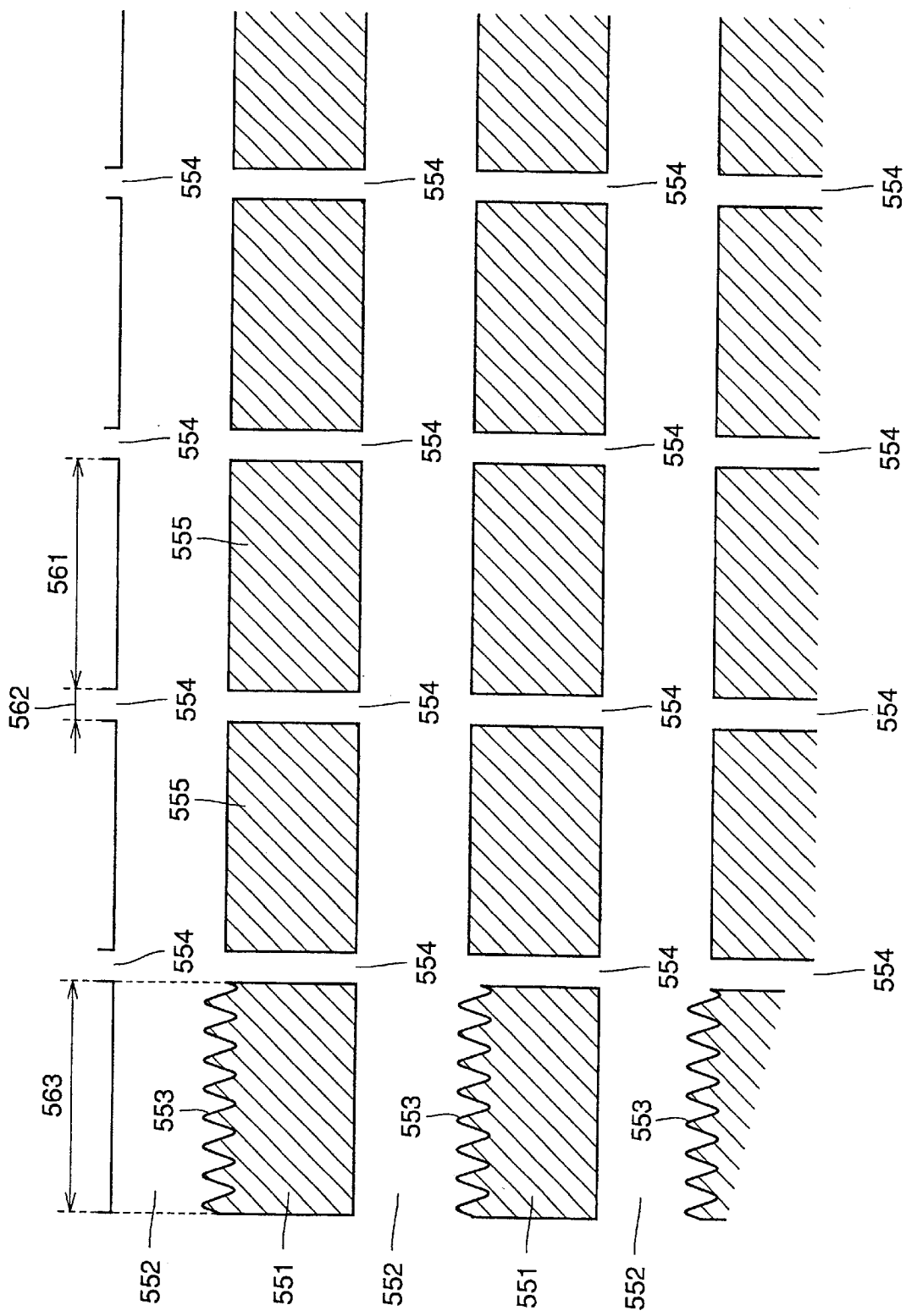
FIG. 75 is a plan view of the structure of the disk according to the embodiment 27.

FIG. 75 shows a planar structure of disk 540 shown in FIG. 74. In the planar structure of disk 540 shown in FIG. 75, each of groove 551 and land 552 is provided at one of its sidewalls with wobble 553, and regions 554 which are not wobbled are repetitively arranged on an area following grooves 551 at constant intervals 561.

More specifically, regions 554 included in one sector are 43 in number. Therefore, each of sectors 5411, 5412, 5413, . . . shown in FIG. 73 has a structure, in which groove 551 provided with wobble 553 is formed in the leading position, and 43 regions 554 are formed in the following region.

Groove 555 has a length 561 ranging from 50 to 150 μm, and region 554 has length 562 ranging from 0.5 to 4 μm. A length 563 of groove 551 is equal to length 561 of groove 555. The total amplitude of wobble 553 is in a range from 60 to 150 nm.

Accordingly, disk 540 according to the embodiment described above has such a feature that address information for the groove and land is recorded in the form of wobbles 553 by biphase modulation, and regions 554 are formed at the predetermined intervals.

Accordingly, wobble 553 has the meaning as the address information which is common to land 552 and groove 551 arranged at the opposite sides thereof, and regions 554 are used for producing the synchronizing signal used for recording or reproducing the data reproduction signal.

Before a laser beam, which is emitted for radially inwardly scanning disk 540, reaches the region provided with sectors 5411, 5412, 5413, . . . , regions 554 which appear cyclically are detected, and the synchronizing signal is produced from signals obtained by detection of regions 554.

Although wobble 553 is formed on one of the sidewalls of groove 551, it may be formed on each of the sidewalls, in which case each wobble 553 is formed as address information of either land 552 or groove 551.

Disk 540 is not restricted to a magneto-optical media, but may be another record media having a similar structure.

Figure 76:
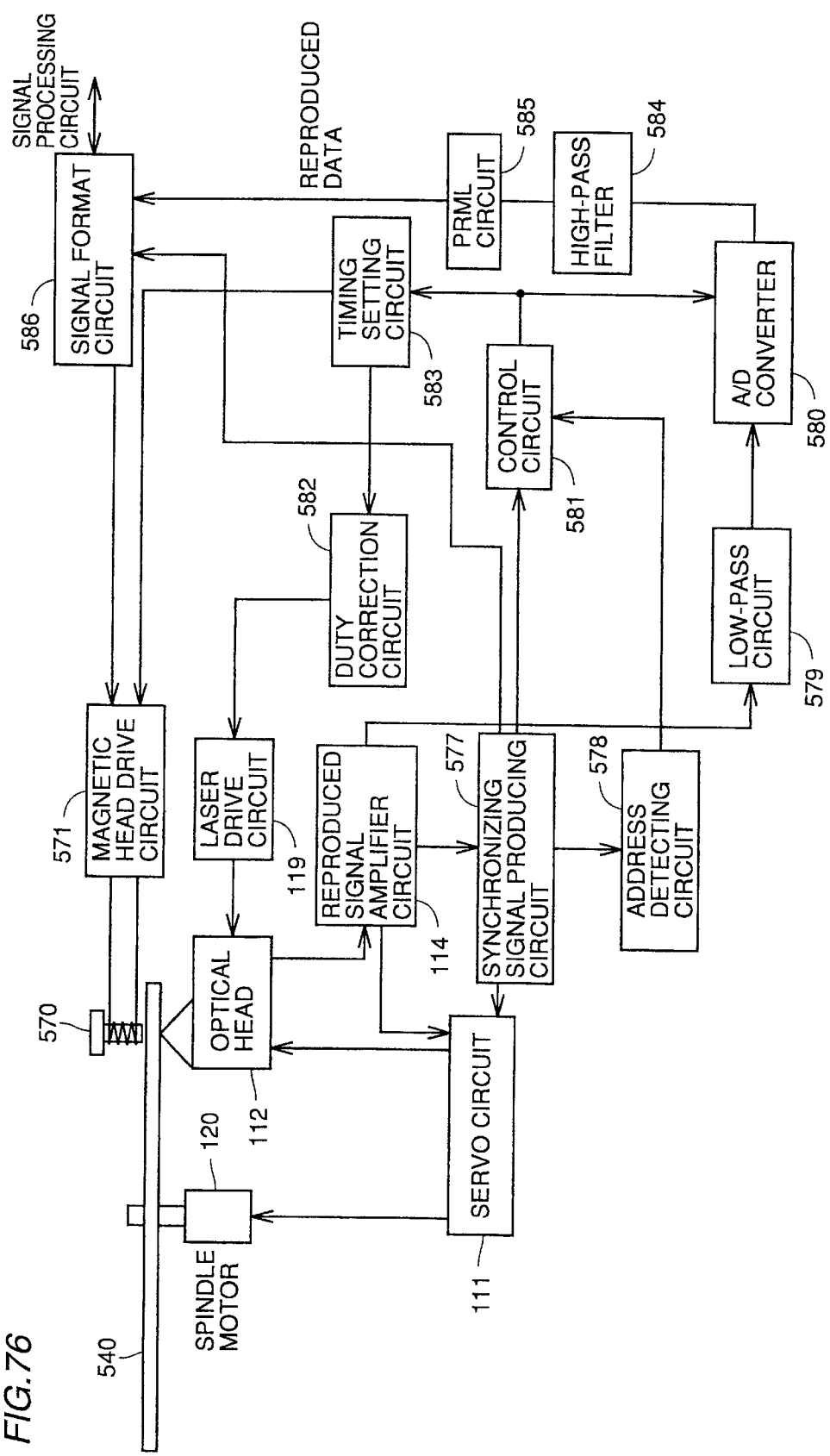
FIG. 76 is a block diagram showing a structure of a data recording/reproducing apparatus according to the embodiment 27.

FIG. 76 is a block diagram showing a structure of an apparatus recording or reproducing data on or from disk 540 according to the embodiment. As shown in FIG. 76, the data recording/reproducing apparatus has a structure similar to that of the reproducing apparatus shown in FIG. 44, but differs therefrom in that the apparatus in FIG. 76 includes a magnetic head 570, a magnetic head driving circuit 571, a signal format circuit 586 and others.

First, a data recording operation of this apparatus will be described below. Optical head 112 irradiates disk 540 with a laser beam having a wavelength of 650 nm (allowable error =±15 μm, which is also true hereinafter), and a reproduced signal and an error signal obtained by optical reproduction from region 554 are supplied to reproduced signal amplifier circuit 114. After being amplified by reproduced signal amplifier circuit 114, the error signal is sent to servo circuit 111, and the reproduced signal is sent to a synchronizing signal producing circuit 577.

Figure 77:
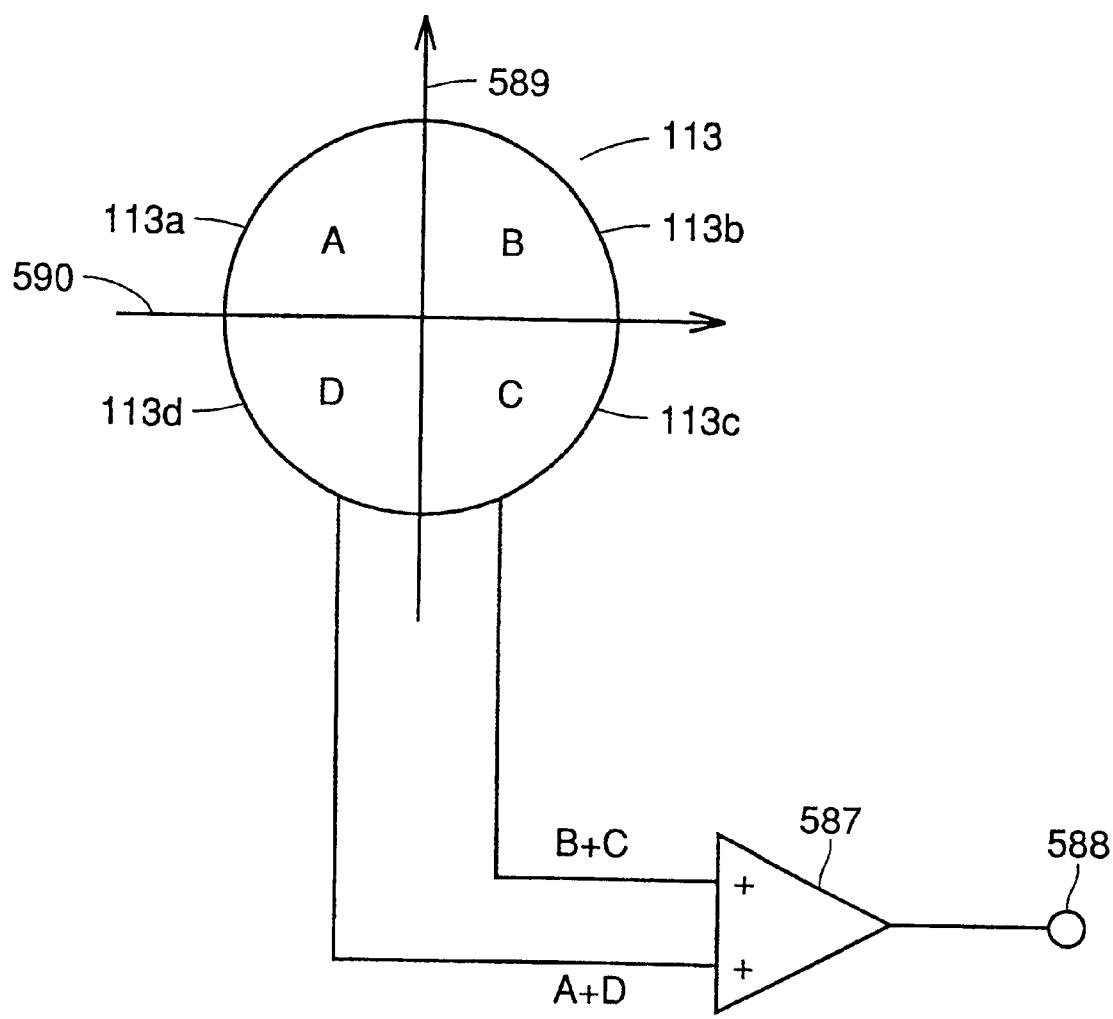
FIG. 77 shows reproduction from disk according to the embodiment 27.

FIG. 77 shows optical reproduction of signals from regions 554 by photodetector 113 included in optical head 112. As shown in FIG. 77, photodetector 113 has the light receiving surface divided into four regions 113a, 113b, 113c and 113d. An arrow 589 indicates a radial direction of disk 540, and an arrow 590 indicates a tangential direction of the same. The reflected light coming from disk 540 is detected on four regions 113a, 113b, 113c and 113d. An adder 587 receives signal (A+D) produced by detection on regions 113a and 113d as well as signal (B+C) produced by detection on regions 113b and 113c. Adder 587 adds signal (A+D) to signal (B+C), and supplies the result, as the reproduced signal of the region 544, to reproduced signal amplifier circuit 114 through a terminal 588. The reproduced signal may be obtained from region 554 by subtracting signal (B+C) from signal (A+D).

Figure 78:
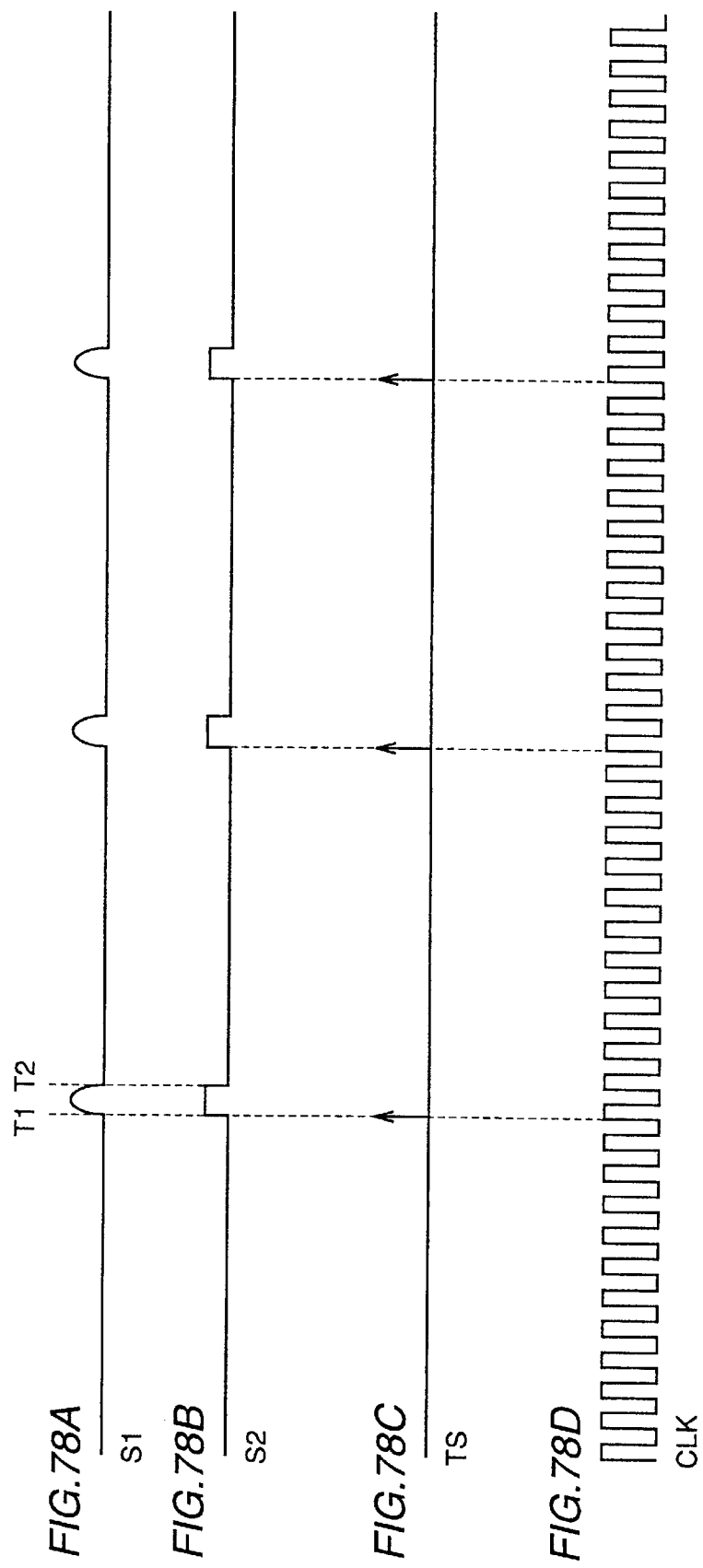
FIGS. 78A–78D are timing diagrams showing an operation of the data recording/reproducing apparatus shown in FIG. 76.

FIG. 78A is a waveform diagram showing a reproduced signal S1 of region 554. As shown in FIG. 78A, while region 554 is being irradiated with the laser beam from time T1 to time T2, the intensity of reflected light is large so that the reproduced signal has a maximum intensity during this period, and such maximum intensities can be obtained at predetermined time intervals.

The spot of laser beam applied to disk 540 and the light receiving surface of photodetector 113 have diameters larger than the width of land 552. Therefore, reproduced signal S1 having the waveform shown in FIG. 78A is used for optical reproduction from grooves 551 and 555 as well as land 552.

The focus error signal included in the error signal obtained by subtracting signal (B+D), which is obtained by detection of the reflected light coming from regions 113b and 113d, from signal (A+C), which is obtained by detection of the reflected light coming from regions 113a and 113c, by a subtracter (not shown). Also, the tracking error signal in the error signal is obtained by subtracting signal (B+C) from signal (A+D) by a subtracter (not shown). The signals thus obtained are supplied to reproduced signal amplifier circuit 114.

Reproduced signal amplifier circuit 114 separates the reproduced signal of region 554 from the received signals, i.e., the reproduced signal of region 554, the tracking error signal and the focus error signal, and supplies the reproduced signal to synchronizing signal producing circuit 577. Also, reproduced signal amplifier circuit 114 supplies the tracking error signal and the focus error signal to servo circuit 111.

Further, synchronizing signal producing circuit 577 produces the synchronizing signal from the reproduced signal of region 554 supplied thereto.

Figure 79:
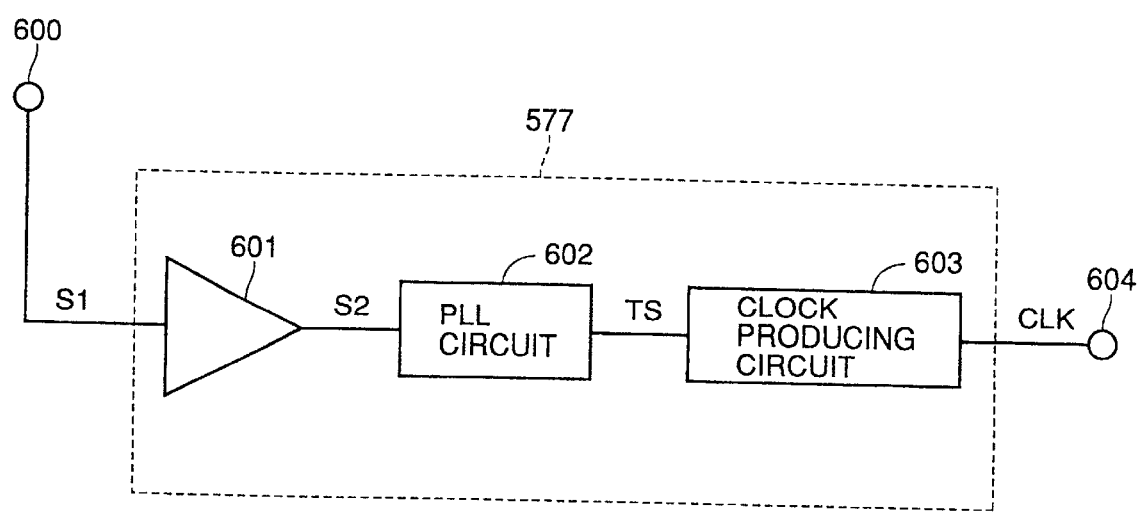
FIG. 79 shows a structure of a synchronizing signal producing circuit shown in FIG. 76.

FIG. 79 shows production of the synchronizing signal by synchronizing signal generating circuit 577. As shown in FIG. 79, synchronizing signal producing circuit 577 includes a comparator 601, a PLL circuit 602 and a clock producing circuit 603. The reproduced signal of region 544, which is shown in FIG. 78A and is supplied to comparator 601 through a terminal 600 in FIG. 79, is compared with a reference voltage by comparator 601, and a signal S2 shown in FIG. 78B is supplied from comparator 601 to PLL circuit 602. PLL circuit 602, which receives signal S2 shown in FIG. 78B, supplies to clock producing circuit 603 a timing signal TS, which is shown in FIG. 78C and is synchronized with rising of signal S2. Clock producing circuit 603 produces synchronizing signal CLK of a predetermined frequency shown in FIG. 78D in response to timing signal TS supplied thereto, and supplies synchronizing signal CLK to servo circuit 111, control circuit 581 and signal format circuit 586 through a terminal 604.

More specifically, since data of 68 bytes is recorded between neighboring regions 554 in this embodiment, synchronizing signal CLK corresponding to 544 bits must be produced. Accordingly, synchronizing signal CLK shown in FIG. 78D is a signal having 544 clocks between timing signals TS shown in FIG. 78C.

Figure 80A:
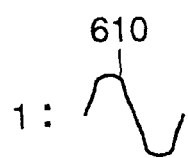
FIGS. 80A–80C show address information recorded on the disk according to the embodiment 27.
Figure 80B:
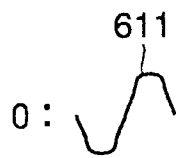

After synchronizing signal CLK is produced as described above, the laser beam reaches sectors 5411, 5412, 5413, on disk 540, and thereby address information recorded in the form of wobble 553 on the leading position of each sector is detected. The address information was recorded by biphase demodulation handling a waveform 610 shown in FIG. 80A as "1" and a waveform 611 shown in FIG. 80B as "0". Accordingly, the wobble for recording address information of [1011010] have a waveform 612 shown in 80C.

Figure 82:
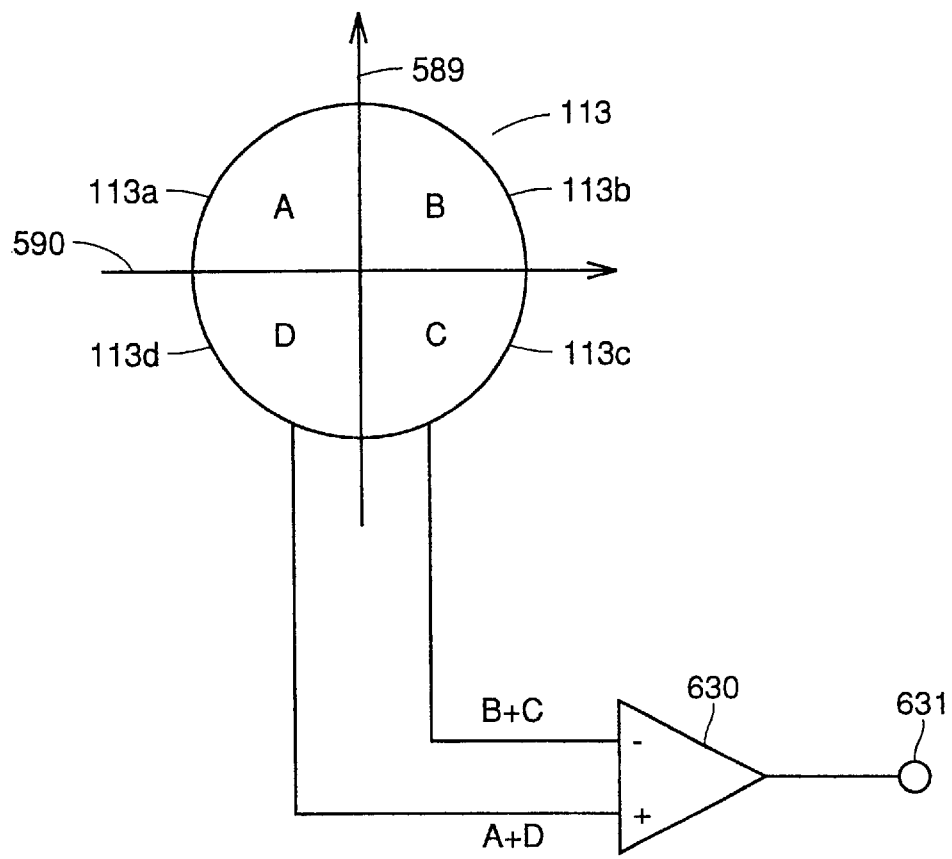

FIGS. 81A, 81B and 82 show detection of the address information recorded in the form of wobble 533.

Figure 80C:
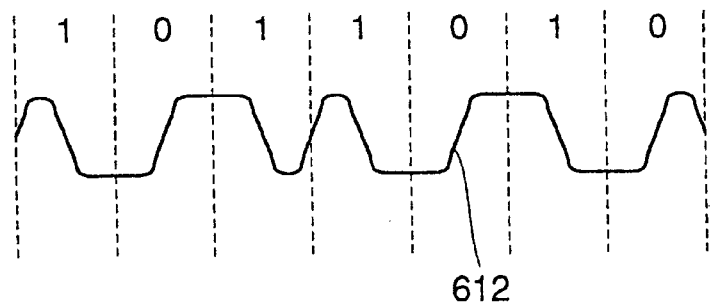

As shown in FIG. 82, photodetector 113 included in optical head 112 is similar to that shown in FIG. 77, and supplies signals (A+D) and (B+C) to subtracter 630. Subtracter 630 subtracts signal (B+C) from signal (A+D), and supplies the result, as the reproduced signal of wobble 553, to reproduced signal amplifier circuit 114 through a terminal 631. For example, a reproduced signal SA1 shown in FIG. 81A is obtained from waveform 612 of wobble shown in FIG. 80C, and is supplied to reproduced signal amplifier circuit 114.

Reproduced signal amplifier circuit 114 sends the received reproduced signal to an address detecting circuit 578.

Figure 83:
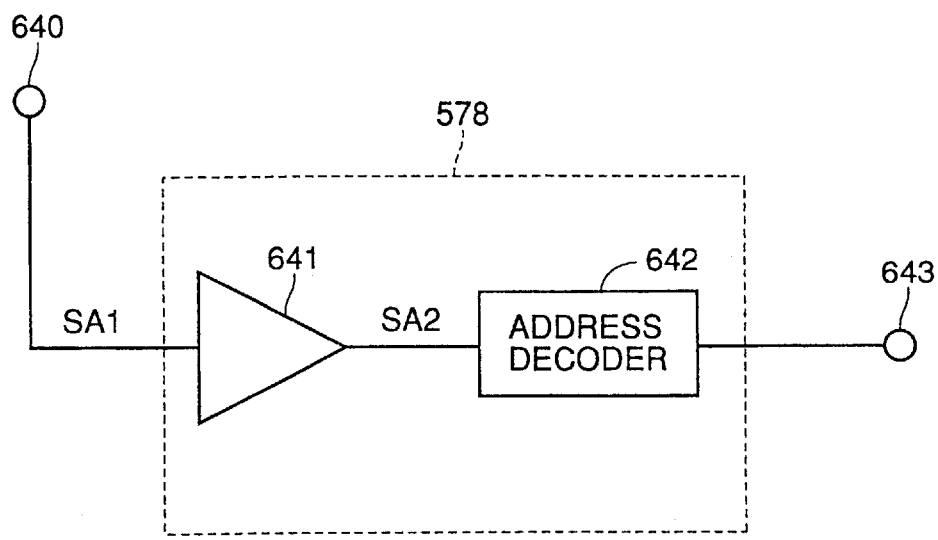
FIG. 83 shows a structure of an address detecting circuit shown in FIG. 76.
Figure 84:
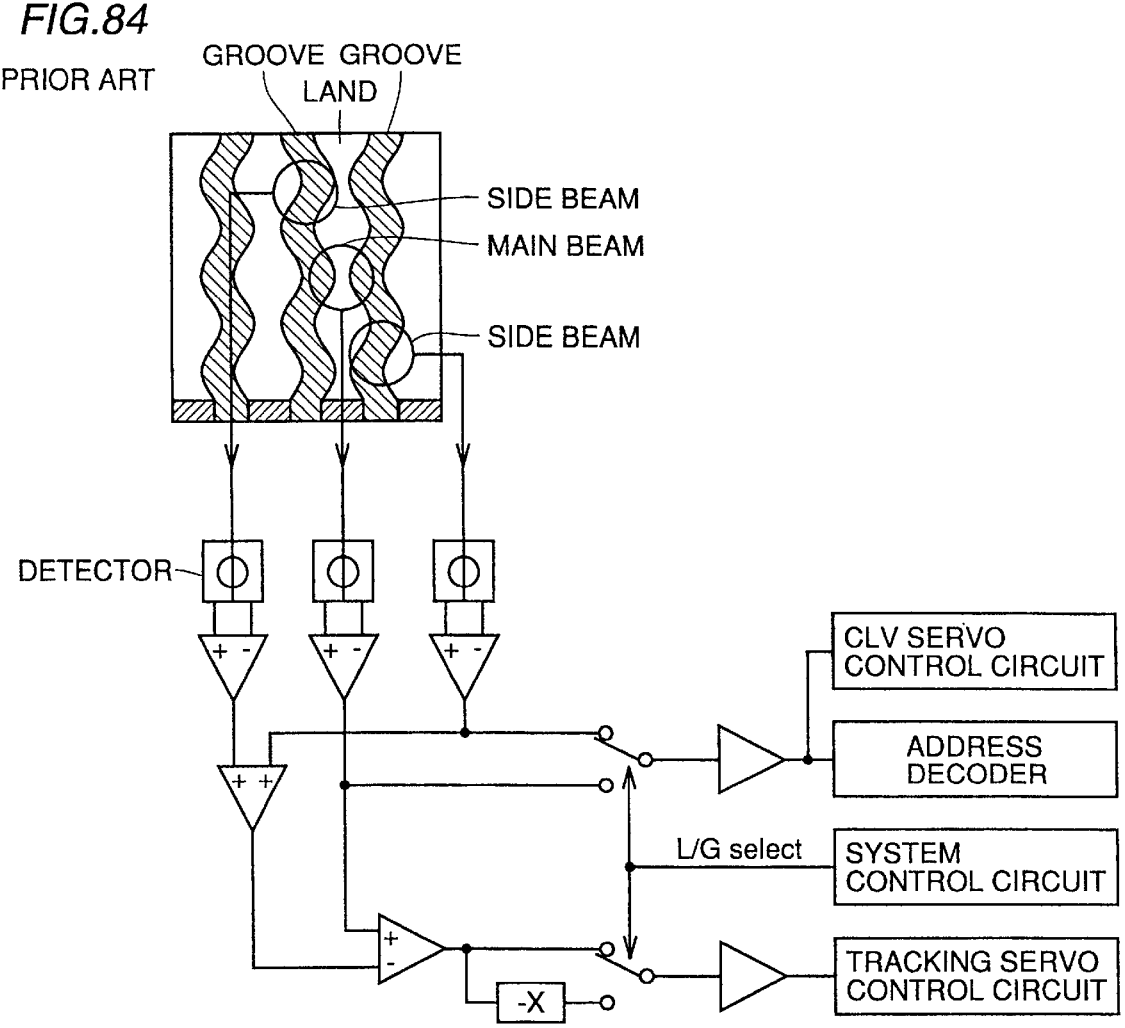
FIG. 84 shows a structure of a disk and a reproducing apparatus in the prior art.

FIG. 83 shows address detecting circuit 578. As shown in FIG. 83, address detecting circuit 578 includes a comparator 641 and an address decoder 642, and compares, e.g., a reproduced signal SA1, which is supplied through a terminal 640 and is shown in FIG. 81A, with a reference voltage to convert the same into a binary signal SA2 shown in FIG. 81B. Binary signal SA2 is sent to address decoder 642, which reads the address information of [1011010] from this binary signal. The detected address information is supplied to control circuit 581 through a terminal 643.

Servo circuit 111 drives a spindle motor 120 at a predetermined rotation speed in synchronization with received synchronizing signal CLK shown in FIG. 78D, and also performs tracking servo control and focus servo control of the objective lens included in optical head 112 in accordance with the tracking error signal and focus error signal.

Control circuit 581 supplies synchronizing signal CLK shown in FIG. 78D to a timing setting circuit 588 based on the address information supplied from address detecting circuit 578.

Timing setting circuit 583 produces a first timing pulse for providing appropriate timing, according to which the laser beam produced by the semiconductor laser in optical head 112 is converted into a pulse form and is applied to disk 540, as well as a second timing pulse, which determines a duty ratio and application timing for applying a pulse magnetic field from magnetic head 570 to disk 540 and for switching its SIN polarities. These first and second timing pulses are produced in response to synchronizing signal CLK supplied from control circuit 581. The first timing pulse is supplied to a duty correction circuit 582, and the second timing pulse is supplied to magnetic head drive circuit 571. The first and second timing pulses have such a phase relationship that the laser is not turned on when the second timing pulse switches the S/N polarities. This is because data cannot be recorded correctly if the disk is irradiated when the magnetic field is switched from the S-polarity to N-polarity due to presence of a certain transition time during this switching.

Signal format circuit 586 formats and supplies the data to be recorded to magnetic head drive circuit 571 in synchronization with the synchronizing signal supplied from synchronizing signal producing circuit 577.

Magnetic head drive circuit 571 obtains a logical sum of the second timing pulse supplied from timing setting circuit 583 and the data signal supplied from signal format circuit 586, and drives magnetic head 570 based on the obtained logical sum for recording the data.

Duty correction circuit 582 adds a predetermined duty for turning on or off the laser beam to the first timing pulse supplied from timing setting circuit 583, and supplies the same to laser drive circuit 119. Laser drive circuit 119 drives the semiconductor laser included in optical head 112 in response to the first timing pulse supplied thereto. In this manner, disk 540 is irradiated with the laser beam taking the form of pulses.

A data reproducing operation will now be described below with reference to FIG. 76. Optical head 112 irradiates disk 540 with the laser beam having a wavelength of 650 nm, and the data signal is reproduced from of region 554 in a manner similar to that for recording the data signal. The reproduced signals of region 554 and wobble 553 as well as the error signal and the data reproduction signal which are optically reproduced are supplied to reproduced signal amplifier circuit 114. After these signals are amplified by reproduced signal amplifier circuit 114, the error signal is supplied to servo circuit 111, and the data reproduction signal is supplied to a low-pass filter 579. The reproduced signal of region 554 is supplied to a synchronizing signal producing circuit 577, and the reproduced signal obtained from wobble 553 is supplied to address detecting circuit 578.

Control circuit 581 supplies synchronizing signal CLK shown in FIG. 78D to timing setting circuit 583 and A/D converter 580 based on the address information supplied to address detecting circuit 578.

Timing setting circuit 583 produces the first timing pulse determining timing, according to which the laser beam produced by the semiconductor laser in optical head 112 is applied to disk 540, in accordance with synchronizing signal CLK supplied from control circuit 581, and supplies the same to duty correction circuit 582.

Duty correction circuit 582 adds the predetermined duty for turning on or off the laser beam to the received first timing pulse, and supplies the same to laser drive circuit 119. Laser drive circuit 119 drives the semiconductor laser included in optical head 112 in accordance with the first timing pulse, and the laser beam in the pulse form is applied to disk 540. During data reproduction, a magnetic field is not applied to disk 540.

Low-pass circuit 579 removes noises of a high frequency component from the data reproduction signal supplied from reproduced signal amplifier circuit 114, and supplies to A/D converter 580 the data reproduction signal not containing noises.

A/D converter 580 performs A/D conversion on this data reproduction signal in synchronization with synchronizing signal CLK sent from control circuit 581, and supplies the digital reproduced signal to a high-pass filter 584.

High-pass filter 584 removes noises of a low frequency, which are caused by double refraction on disk 540 and others, from the digital reproduced signal, and supplies the digital reproduced signal to a PRML (Partial Response Maximum Likely hood) circuit 585.

PRML circuit 585 performs ternary (3-level) determination of the digital reproduced signal for demodulating the reproduced data more accurately.

In the foregoing data reproducing operation, synchronizing signal producing circuit 577, address detecting circuit 578 and servo circuit 111 operate in manners similar to those in the data recording operation, respectively.

According to the disk of the embodiment, a wobble is formed on neither of the opposite sidewalls of groove 555 in the region for recording and reproducing the data signal. Therefore, such leak-in does not occur that the polarizing direction of reflected light on groove 555 is affected by the wobble and thereby the data reproduction characteristics are adversely affected. Accordingly, good reproduction characteristics can be achieved. Since regions 554 not provided with grooves 551 and 555, which are utilized for producing the synchronizing signals, are arranged at intervals of 68 bytes, the synchronizing signal can be produced reliably, and the characteristics for recording or reproducing the data signals can be improved.

In disk 540 according to this embodiment, regions 554 are cyclically formed between grooves 551 and 555 for producing the synchronizing signal. The structure is not restricted to this, and a similar effect can be achieved by a record medium having a structure in which the intensity of reflected light of the laser beam cyclically changes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk apparatus for recording and/or reproducing data to and/or from an optical disk having a land and a groove each with two sides, said land or said groove having fine clock marks formed at both sides respectively, said apparatus comprising:

optical means guiding a laser beam toward said optical disk;

detecting means detecting said fine clock marks;

a tracking error circuit determining a tracking error signal; and an offset correction circuit detecting two peaks of the detected fine clock mark, calculating a difference between peak intensities of the detected two peaks, and adding the calculated difference to said tracking error signal.

* * * * *